United States Patent
Carey, II et al.

(10) Patent No.: US 6,811,891 B2
(45) Date of Patent: Nov. 2, 2004

(54) CORROSION-RESISTANT COATED METAL AND METHOD FOR MAKING THE SAME

(75) Inventors: Jay F. Carey, II, Follansbee, WV (US); Mehrooz Zamanzadeh, Pittsburgh, PA (US); Nicholas R. Hesske, Weirton, WV (US)

(73) Assignee: The Louis Berkman Company, Steubenville, OH (US)

(*) Notice: Subject to any disclaimer, the term of this patent is extended or adjusted under 35 U.S.C. 154(b) by 44 days.

(21) Appl. No.: 10/346,262

(22) Filed: Jan. 17, 2003

(65) Prior Publication Data

US 2003/0170485 A1 Sep. 11, 2003

Related U.S. Application Data

(63) Continuation of application No. 10/144,148, filed on May 10, 2002, now Pat. No. 6,652,990, which is a continuation of application No. 09/634,828, filed on Aug. 9, 2000, now abandoned, which is a continuation-in-part of application No. 08/929,623, filed on Sep. 15, 1997, now abandoned, which is a continuation-in-part of application No. 08/604,074, filed on Feb. 20, 1996, now Pat. No. 5,667,849, which is a division of application No. 08/551,456, filed on Nov. 1, 1995, now Pat. No. 5,616,424, which is a division of application No. 08/402,925, filed on Mar. 13, 1995, now Pat. No. 5,491,036, which is a continuation-in-part of application No. 08/165,085, filed on Dec. 10, 1993, now Pat. No. 5,397,652, which is a continuation-in-part of application No. 08/000,101, filed on Jan. 4, 1993, now abandoned, which is a continuation-in-part of application No. 07/858,662, filed on Mar. 27, 1992, now Pat. No. 5,314,758, application No. 10/346,262, which is a continuation of application No. 10/144,148, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/260,333, filed on Jun. 15, 1994, now Pat. No. 5,429,882, (List continued on next page.)

(51) Int. Cl.⁷ .................................................. B32B 15/01
(52) U.S. Cl. ...................... 428/646; 428/647; 428/648; 428/939; 220/562; 220/567.2; 206/524.3
(58) Field of Search .................................. 428/646, 647, 428/648, 939, 679; 220/562, 567.2; 206/524.3

(56) References Cited

U.S. PATENT DOCUMENTS

| 84,205 A | 11/1868 | Mills |
|---|---|---|
| 169,810 A | 11/1875 | Holden |

(List continued on next page.)

FOREIGN PATENT DOCUMENTS

| CA | 674003 | 11/1963 |
|---|---|---|
| DE | 139925 | 12/1934 |

(List continued on next page.)

OTHER PUBLICATIONS

Standard Specification for Solder Metal; American Society for Testing and Materials; pp. 1 & 9, Nov. 1986.
Soldering Manual; American Welding Society; 1959; pp. 21–23.
The Making, Shaping and Treating of Steel, U.S. Steel Corporation, 1957, pp. 655–659.
Constitution of Binary Alloys; McGraw–Hill Book Company; 1958; pp. 1217–1219.

(List continued on next page.)

Primary Examiner—John J. Zimmerman
(74) Attorney, Agent, or Firm—Fay, Sharpe, Fagan, Minnich & McKee LLP

(57) ABSTRACT

A corrosion-resistant coated brass metal coated with a corrosion resistant alloy. The corrosion resistant alloy is a tin metal alloy or a tin and zinc metal alloy. The corrosion resistant metal alloy may also include one or more metal additives to improve the coating process and/or to alter the properties of the tin or tin and zinc metal alloy.

37 Claims, 9 Drawing Sheets

Related U.S. Application Data which is a continuation-in-part of application No. 08/209,400, filed on Mar. 14, 1994, now abandoned, which is a continuation-in-part of application No. 08/175,523, filed on Dec. 30, 1993, now Pat. No. 5,401,586, which is a continuation-in-part of application No. 08/154,376, filed on Nov. 17, 1993, now abandoned, which is a continuation of application No. 08/042,649, filed on Apr. 5, 1993, now abandoned, application No. 10/346,262, which is a continuation of application No. 10/144,148, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/341,365, filed on Nov. 17, 1994, now Pat. No. 5,489,490, which is a continuation-in-part of application No. 08/175,523, which is a continuation-in-part of application No. 08/154,376, which is a continuation of application No. 08/042,649, application No. 10/346,262, which is a continuation of application No. 10/144,148, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/347,261, filed on Nov. 30, 1994, now Pat. No. 5,491,035, which is a continuation-in-part of application No. 08/175,523, which is a continuation-in-part of application No. 08/154,376, which is a continuation of application No. 08/042,649, application No. 10/346,262, which is a continuation of application No. 10/144,148, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/175,523, which is a continuation-in-part of application No. 08/154,376, which is a continuation of application No. 08/042,649, application No. 10/346,262, which is a continuation of application No. 10/144,148, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/373,533, filed on Jan. 17, 1995, now Pat. No. 5,455,122, which is a continuation of application No. 08/254,875, filed on Jun. 6, 1994, now abandoned, which is a division of application No. 08/209,400, filed on Mar. 14, 1994, now abandoned, which is a continuation-in-part of application No. 08/175,523, which is a continuation-in-part of application No. 08/154,376, which is a continuation of application No. 08/042,649, application No. 10/346,262, which is a continuation of application No. 10/144,148, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/338,337, filed on Nov. 14, 1994, now abandoned, which is a division of application No. 08/229,097, filed on Apr. 18, 1994, now Pat. No. 5,395,702, which is a continuation of application No. 08/000,101, filed on Jan. 4, 1993, now abandoned, which is a continuation-in-part of application No. 07/858,662, filed on Mar. 27, 1992, now Pat. No. 5,314,758, application No. 10/346,262, which is a continuation of application No. 10/144,148, which is a continuation of application No. 09/634,828, which is a continuation-in-part of application No. 08/929,623, which is a continuation-in-part of application No. 08/604,078, filed on Feb. 20, 1996, now Pat. No. 5,695,822, which is a division of application No. 08/438,042, filed on May 8, 1995, now Pat. No. 5,597,656, which is a continuation-in-part of application No. 08/338,386, filed on Nov. 14, 1994, now Pat. No. 5,470,667, which is a continuation of application No. 08/175,523, which is a continuation-in-part of application No. 08/154,376, which is a continuation of application No. 08/042,649, application No. 10/346,262, which is a continuation of application No. 10/144,148, which is a continuation of application No. 09/634,828, which is a continuation-in-part of application No. 08/929,623, which is a continuation-in-part of application No. 08/604,078, which is a division of application No. 08/438,042, which is a continuation-in-part of application No. 08/260,333, filed on Jun. 15, 1994, now Pat. No. 5,429,882, which is a continuation-in-part of application No. 08/209,400, filed on Mar. 14, 1994, now abandoned, which is a continuation-in-part of application No. 08/175,523, which is a continuation-in-part of application No. 08/154,376, which is a continuation of application No. 08/042,649, application No. 10/346,262, which is a continuation of application No. 10/144,148, which is a continuation of application No. 09/634,828, which is a continuation-in-part of application No. 08/929,623, which is a continuation-in-part of application No. 08/604,078, which is a division of application No. 08/438,042, which is a continuation-in-part of application No. 08/341,365, filed on Nov. 17, 1994, now Pat. No. 5,489,490, which is a continuation-in-part of application No. 08/175,523, which is a continuation-in-part of application No. 08/154,376, which is a continuation of application No. 08/042,649, application No. 10/346,262, which is a continuation of application No. 09/634,828, which is a continuation-in-part of application No. 08/929,623, which is a continuation-in-part of application No. 08/604,078, which is a division of application No. 08/438,042, which is a continuation-in-part of application No. 08/347,261, which is a continuation-in-part of application No. 08/175,523, which is a continuation-in-part of application No. 08/154,376, which is a continuation of application No. 08/042,649, application No. 10/346,262, which is a continuation of application No. 10/144,148, which is a continuation of application No. 09/634,828, which is a continuation-in-part of application No. 08/980,985, filed on Oct. 20, 1997, now abandoned, which is a continuation of application No. 08/636,179, filed on Apr. 22, 1996, now abandoned, which is a continuation-in-part of application No. 08/551,456, which is a division of application No. 08/402,925, which is a continuation-in-part of application No. 08/380,372, filed on Jan. 30, 1995, now Pat. No. 5,480,731, which is a continuation of application No. 08/153,026, filed on Nov. 17, 1993, now Pat. No. 5,395,703, which is a division of application No. 07/858,662, application No. 10/346,262, which is a continuation of application No. 10/144,148, which is a continuation of application No. 09/634,828, which is a continuation-in-part of application No. 09/071,316, filed on May 1, 1998, now Pat. No. 6,080,497, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/165,085, which is a continuation-in-part of application No. 08/000,101, which is a continuation-in-part of application No. 07/967,407, filed on Oct. 26, 1992, now abandoned, which is a continuation-in-part of application No. 07/913,209, filed on Jul. 15, 1992, now abandoned, which is a continuation-in-part of application No. 07/858,662, application No. 10/346,262, which is a continuation of application No. 10/144,148, which is a continuation of application No. 09/634,828, which is a continuation-in-part of application No. 09/100,578, filed on Jun. 19, 1998, now abandoned, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/380,372, which is a continuation of application No. 08/153,026, which is a division of application No. 07/858,662, application No. 10/346,262, which is a continuation of application No. 10/144,148, which is a continuation of application No. 09/634,828, which is a continuation-in-part of application No. 09/131,219, filed on Aug. 7, 1998, now abandoned, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/380,372, which is a continuation of application No. 08/153,026, which is a division of application No. 07/858,662, application No. 10/346,262, which is a continuation of application No. 10/144,148, which is a continuation of application No. 09/634,828, which is a continuation-in-part of application No. 09/161,573, filed on Sep. 28, 1998, now abandoned, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/380,372, which is a continuation of application No. 08/153,026, which is a division of application No. 07/858,662, application No. 10/346,262, which is a continuation of application No. 10/144,148, which is a continuation of application No. 09/634,828, which is a continuation-in-part of application No. 09/161,580, filed on Sep. 28, 1998, now abandoned, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/380,372, which is a continuation of application No. 08/153,026, which is a division of application No. 07/858,662, application No. 10/346,262, which is a continuation of application No. 10/144,148, which is a continuation of application No. 09/634,828, which is a continuation-in-part of application No. 09/420,165, filed on Oct. 18, 1999, now abandoned, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/380,372, which is a continuation of application No. 08/153,026, which is a division of application No. 07/858,662, application No. 10/346,262, which is a continuation of application No. 10/144,148, which is a continuation of application No. 09/634,828, which is a continuation-in-part of application No. 09/420,165, filed on Oct. 8, 1999, now abandoned, which is a continuation-in-part of application No. 09/161,580, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/373,533, which is a continuation of application No. 08/254,875, which is a division of application No. 08/209,400, which is a continuation-in-part of application No. 08/154,376, which is a continuation of application No. 08/042,649, application No. 10/346,262, which is a continuation of application No. 10/144,148, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/373,533, which is a continuation of application No. 08/254,875, which is a division of application No. 08/209,400, which is a continuation-in-part of application No. 08/154,376, which is a continuation of application No. 08/042,649, application No. 10/346,262, which is a continuation of application No. 10/144,148, which is a continuation of application No. 09/634,828, which is a continuation-in-part of application No. 08/929,623, which is a continuation-in-part of application No. 08/604,074, which is a division of application No. 08/551,456, which is a division of application No. 08/402,925, which is a continuation-in-part of application No. 08/347,261, which is a continuation-in-part of application No. 08/254,875, which is a division of application No. 08/209,400, which is a continuation-in-part of application No. 08/154,376, which is a continuation of application No. 08/042,649.

U.S. PATENT DOCUMENTS

| | | |
|---|---|---|
| 347,928 A | 8/1886 | Farmer |
| 616,613 A | 12/1898 | Griffith |

| | | | | | | |
|---|---|---|---|---|---|---|
| 863,058 A | 8/1907 | Ellis | | 5,049,202 A | 9/1991 | Willis et al. |
| 941,835 A | 11/1909 | Wirgovits | | 5,053,112 A | 10/1991 | Jones et al. |
| 1,156,169 A | 10/1915 | Monnot | | 5,094,813 A | 3/1992 | Kale |
| 1,239,785 A | 9/1917 | Gardiner | | 5,113,174 A | 5/1992 | Wake |
| 1,939,925 A | 12/1933 | Hoover | | 5,134,039 A | 7/1992 | Alexander et al. |
| 2,004,372 A | 3/1935 | Luschenowsky | | 5,175,026 A | 12/1992 | Bertol et al. |
| 2,069,658 A | 2/1937 | Renkin | | 5,202,002 A | 4/1993 | Tsuchinaga et al. |
| 2,210,593 A | 11/1940 | McCullough | | 5,203,985 A | 4/1993 | Nishimura et al. |
| 2,233,578 A | 3/1941 | Boak | | 5,272,849 A | 12/1993 | Zahner, III |
| 2,252,414 A | 8/1941 | Riesmeyer | | 5,314,758 A | 5/1994 | Carey, II et al. |
| 2,258,327 A | 10/1941 | Kramer | | 5,354,624 A | 10/1994 | Carey, II |
| 2,374,926 A | 5/1945 | Fink | | 5,395,702 A | 3/1995 | Carey, II et al. |
| 2,472,402 A | 6/1949 | Bovie | | 5,395,703 A | 3/1995 | Carey, II et al. |
| 2,533,048 A | 12/1950 | Rodgers | | 5,397,652 A | 3/1995 | Carey, II et al. |
| 2,703,766 A | 3/1955 | Ellis | | 5,401,586 A | 3/1995 | Carey, II et al. |
| 2,806,622 A | 9/1957 | Leirer | | 5,429,882 A | 7/1995 | Carey, II et al. |
| 2,863,766 A | 12/1958 | Larkins | | 5,433,839 A | 7/1995 | Amelot et al. |
| 2,864,733 A | 12/1958 | Kranich | | 5,455,122 A | 10/1995 | Carey et al. |
| 2,884,350 A | 4/1959 | Saubestre | | 5,470,667 A | 11/1995 | Carey, II et al. |
| 3,012,310 A | 12/1961 | Godfrey | | 5,480,731 A | 1/1996 | Carey, II et al. |
| 3,058,856 A | 10/1962 | Miller | | 5,489,490 A | 2/1996 | Carey, II et al. |
| 3,105,022 A | 9/1963 | Boggs | | 5,491,035 A | 2/1996 | Carey, II et al. |
| 3,231,127 A | 1/1966 | Virzi | | 5,491,036 A | 2/1996 | Carey, II et al. |
| 3,331,230 A | 7/1967 | Bentz | | 5,492,772 A | 2/1996 | Carey, II et al. |
| 3,630,792 A | 12/1971 | Smyth | | 5,492,776 A | 2/1996 | Paz-Pujalt et al. |
| 3,728,144 A | 4/1973 | Poucke | | 5,496,652 A | 3/1996 | Sasaki et al. |
| 3,791,801 A | 2/1974 | Ariga et al. | | 5,520,964 A | 5/1996 | Carey, II et al. |
| 3,860,438 A | 1/1975 | Shoemaker | | 5,597,656 A | 1/1997 | Carey et al. |
| 3,962,501 A | 6/1976 | Ohbu et al. | | 5,614,328 A | 3/1997 | Suzuki et al. |
| 3,966,564 A | 6/1976 | Hyner et al. | | 5,616,424 A | 4/1997 | Carey et al. |
| 4,015,950 A | 4/1977 | Galland et al. | | 5,666,644 A | 9/1997 | Tanaka et al. |
| 4,026,728 A | 5/1977 | Yoshida et al. | | 5,667,849 A | 9/1997 | Carey, II et al. |
| 4,045,869 A | 9/1977 | Hartmann et al. | | 5,695,822 A | 12/1997 | Carey et al. |
| 4,049,481 A | 9/1977 | Morisaki | | 5,755,950 A | 5/1998 | Bell |
| 4,126,450 A | 11/1978 | Lathrop et al. | | 5,827,618 A | 10/1998 | Oyagi et al. |
| 4,152,471 A | 5/1979 | Schnedler et al. | | 5,916,695 A | 6/1999 | Fister et al. |
| 4,173,663 A | 11/1979 | Bostroem | | 6,080,497 A | 6/2000 | Carey, II et al. |
| 4,177,326 A | 12/1979 | Windal et al. | | 6,534,195 B1 * | 3/2003 | Takikawa et al. ............ 428/646 |
| 4,184,928 A | 1/1980 | Hoije | | | | |

FOREIGN PATENT DOCUMENTS

| | | |
|---|---|---|
| DE | 2713196 | 10/1978 |
| DE | 4309500 | 9/1993 |
| EP | 12437 | 6/1979 |
| EP | 261078 | 9/1987 |
| EP | 269006 | 11/1987 |
| EP | 0 413 261 A2 | 2/1991 |
| EP | 480122 | 4/1992 |
| EP | 0 763 608 A1 | 3/1997 |
| ES | 40-6969 | 4/1965 |
| FR | 704909 | 5/1931 |
| FR | 746337 | 5/1933 |
| FR | 1130210 | 4/1955 |
| FR | 1457769 | 9/1966 |
| FR | 2052324 | 3/1971 |
| FR | 2314949 | 4/1974 |
| FR | 2281995 | 8/1974 |
| FR | 2514673 | 4/1983 |
| FR | 2554831 | 5/1985 |
| FR | 2 689 142 | 12/1994 |
| FR | 2 714 677 | 4/1996 |
| FR | 2 721 327 | 11/1996 |
| FR | 2 713 665 | 1/1999 |
| GB | 2812 | 11/1857 |
| GB | 131299 | 8/1919 |
| GB | 228995 | 2/1925 |
| GB | 237224 | 12/1925 |
| GB | 244523 | 12/1925 |
| GB | 528558 | 10/1932 |
| GB | 546179 | 12/1942 |
| GB | 581604 | 10/1946 |
| GB | 601029 | 4/1948 |

Additional entries (left column continued):

| | | |
|---|---|---|
| 4,190,504 A | 2/1980 | Usui |
| 4,202,921 A | 5/1980 | Enghag |
| 4,216,250 A | 8/1980 | Nakayama et al. |
| 4,321,289 A | 3/1982 | Bartsch |
| 4,330,574 A | 5/1982 | Pierson et al. |
| 4,339,284 A | 7/1982 | Hashimoto et al. |
| 4,357,027 A | 11/1982 | Zeitlow |
| 4,413,039 A | 11/1983 | Higuchi et al. |
| 4,416,920 A | 11/1983 | Pierson et al. |
| 4,441,118 A | 4/1984 | Fister et al. |
| 4,451,541 A | 5/1984 | Beal |
| 4,461,679 A | 7/1984 | Higuchi et al. |
| 4,576,657 A | 3/1986 | Satoh et al. |
| 4,599,279 A | 7/1986 | Mirra et al. |
| 4,695,428 A | 9/1987 | Ballentine et al. |
| 4,713,144 A | 12/1987 | Schiller |
| 4,731,301 A | 3/1988 | Higuchi et al. |
| 4,758,407 A | 7/1988 | Ballentine et al. |
| 4,778,733 A | 10/1988 | Lubrano et al. |
| 4,806,309 A | 2/1989 | Tulman |
| 4,814,049 A | 3/1989 | Helton et al. |
| 4,862,825 A | 9/1989 | Fontaine |
| 4,879,096 A | 11/1989 | Vaton |
| 4,883,723 A | 11/1989 | Kilbane et al. |
| 4,934,120 A | 6/1990 | Boyd |
| 4,946,748 A | 8/1990 | Higuchi et al. |
| 4,969,980 A | 11/1990 | Yoshioka et al. |
| 4,987,716 A | 1/1991 | Boyd |
| 4,999,258 A | 3/1991 | Wake et al. |
| 5,017,267 A | 5/1991 | Cordani |
| 5,023,113 A | 6/1991 | Boston et al. |
| 5,035,749 A | 7/1991 | Haruta et al. |

| | | |
|---|---|---|
| GB | 626826 | 7/1949 |
| GB | 629425 | 9/1949 |
| GB | 642122 | 8/1950 |
| GB | 707765 | 4/1954 |
| GB | 709163 | 5/1954 |
| GB | 786651 | 11/1957 |
| GB | 796128 | 6/1958 |
| GB | 927530 | 5/1963 |
| GB | 1008316 | 10/1965 |
| GB | 1040916 | 9/1966 |
| GB | 1074852 | 7/1967 |
| GB | 1143107 | 2/1969 |
| GB | 1178816 | 1/1970 |
| GB | 1194751 | 6/1970 |
| GB | 1277523 | 6/1972 |
| GB | 1361942 | 7/1974 |
| GB | 1419534 | 12/1975 |
| GB | 1439774 | 6/1976 |
| GB | 1448662 | 9/1976 |
| GB | 1513002 | 6/1978 |
| GB | 1517454 | 7/1978 |
| GB | 2005307 | 4/1979 |
| GB | 2055158 | 2/1981 |
| GB | 2055402 | 3/1981 |
| GB | 1588808 | 4/1981 |
| GB | 2099857 | 1/1982 |
| GB | 2087931 | 6/1982 |
| GB | 2 099 857 | 12/1982 |
| GB | 2117414 | 10/1983 |
| GB | 2242696 | 10/1991 |
| GB | 2265389 | 9/1993 |
| GB | 2276887 | 10/1994 |
| GB | 2 288 410 | 10/1995 |
| GB | 2 289 691 | 11/1995 |
| JP | 4218219 | 9/1967 |
| JP | 49-54230 | 5/1974 |
| JP | 4954230 | 5/1974 |
| JP | 55-158825 | 12/1980 |
| JP | 56-69340 | 6/1981 |
| JP | 5848694 | 3/1983 |
| JP | 5864498 | 4/1983 |
| JP | 58221283 | 12/1983 |
| JP | 5941430 | 3/1984 |
| JP | 5996238 | 6/1984 |
| JP | 60208465 | 10/1985 |
| JP | 61-16428 | 4/1986 |
| JP | 61-270371 | 11/1986 |
| JP | 62-230987 | 10/1987 |
| JP | 62-230988 | 10/1987 |
| JP | 63-153253 | 6/1988 |
| JP | 63-66916 | 12/1988 |
| JP | 64-24946 | 1/1989 |
| JP | 1259153 | 10/1989 |
| JP | 4-214848 | 8/1992 |
| JP | 4247860 | 9/1992 |
| JP | 8-3711 | 1/1996 |
| JP | 8-269733 | 10/1996 |
| JP | 8-269734 | 10/1996 |
| JP | 8-269735 | 10/1996 |
| JP | 08-325692 | 12/1996 |
| JP | 09-003658 | 1/1997 |
| JP | 09-071879 | 3/1997 |
| JP | 10-18054 | 1/1998 |
| SU | 386733 | 6/1973 |
| SU | 640831 | 1/1979 |
| WO | 96/30560 | 10/1996 |

OTHER PUBLICATIONS

Metal Handbook, 10th Ed.; vol. 2, Properties and Selection; Nonferrous Alloys and Special–Purpose Materials; ASM; pp. 1166–1168; Oct. 1990.

Design for Metal Spinning; Tin–Zinc Alloy Coatings; Materials and Methods; pp. 1248, 1250; Jul. 1946.

"Tin–Zinc Alloy Coatings", Materials & Methods, pp. 1248–1250, Jul. 1946.

Federal Specification QQ–T–201F, Nov. 12, 1986, "Terne Plate, for Roofing and Roofing Products", pp. 1–8.

Hot Dip Tin Coatings of Steel and Cast Iron, Metals Handbook; 9th Ed., vol. 5, 1983, pp. 351–355.

"Handbook of Stainless Steels", McGraw–Hill Book Company, Chapter 35 "The Cleaning of Stainless Steels", 35–1 – 35–16, 1977.

Metals Handbook Ninth Edition, vol. 5, Surface Cleaning, Finishing, and Coating, "Picking of Iron and Steel", pp. 68–82; "Hot Dip Galvanized Coatings", pp. 323–332; "Hot Dip Tin Coating of Steel and Cast Iron", pp. 351–355; "Hot Dip Lead Alloy Coating of Steel", pp. 358–360; "Cleaning and Finishing of Stainless Steel", pp. 551–554; Oct. 1982.

*Metal Handbook*, The American Society for Metals "Metallic Coatings", pp. 703–721; "Surface Treatments", pp. 725–732; "Tin and Tin Alloys", pp. 1063–1076; "Zinc and Zinc Alloys", pp. 1077–1092, 1958.

Van Nostrand's Scientific Encyclopedia, 6th Edition, vol. 1, 1983; pp. 94–96—Definition of "Alloys"; pp. 1322—Definition of "Galvanizing".

Van Nostrand's Scientific Encyclopedia, 6th Edition, vol. 11, 1983; pp. 2832–2834—Definition of "Tin"; pp. 3059–3062—Definition of "Zinc".

McGraw–Hill Encyclopedia of Science and Technology, 6th Edition, 1987, p. 517.

McGraw–Hill Encyclopedia of Science & Technology, 6th Edition, 1987, pp. 35–37; pp. 44–46.

McGraw–Hill Encyclopedia of Science & Technology, 6th Edition, 1987, pp. 368–372.

McGraw–Hill Encyclopedia of Science & Technology, 6th Edition, 1987, pp. 618–623.

Great Britain Search Report dated May 22, 1955, for GB Application 9504712.2.

*International Conference on Zinc and Zinc Alloy Coated Steel Sheet*; Galvatech '2001; Jun. 26–28, 2001; Brussels, Belgium.

* cited by examiner

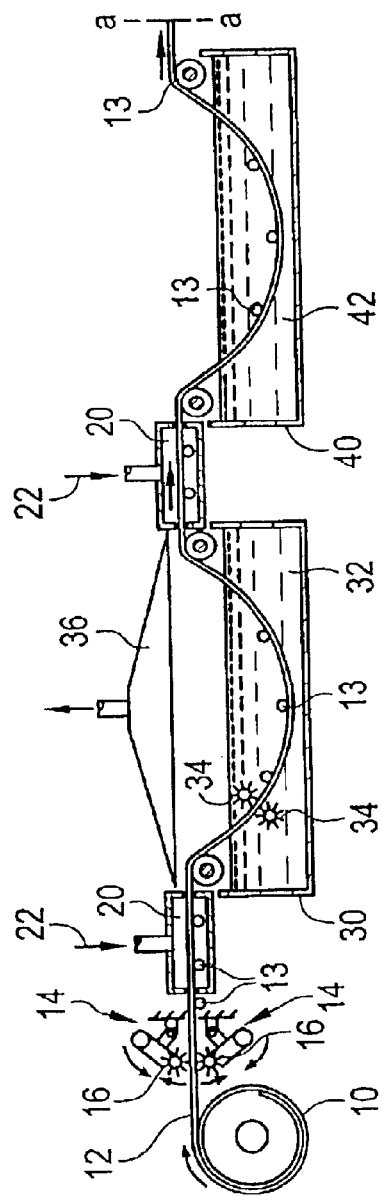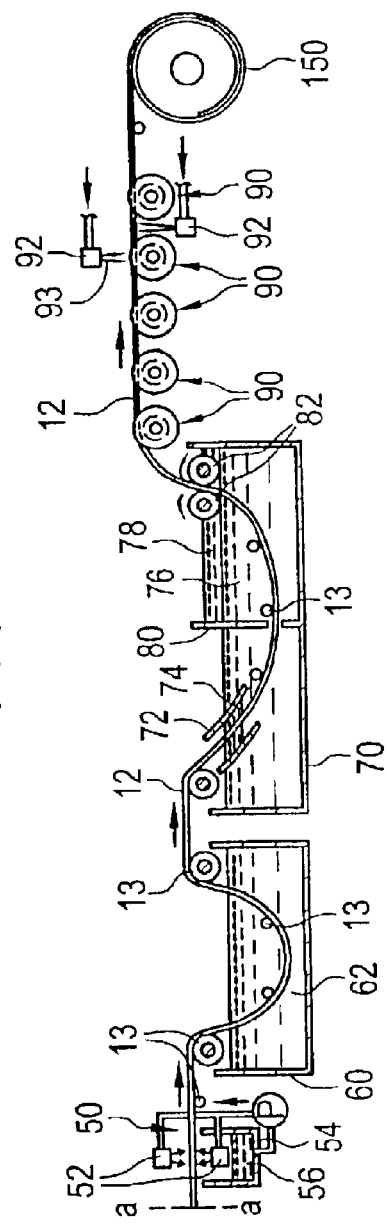

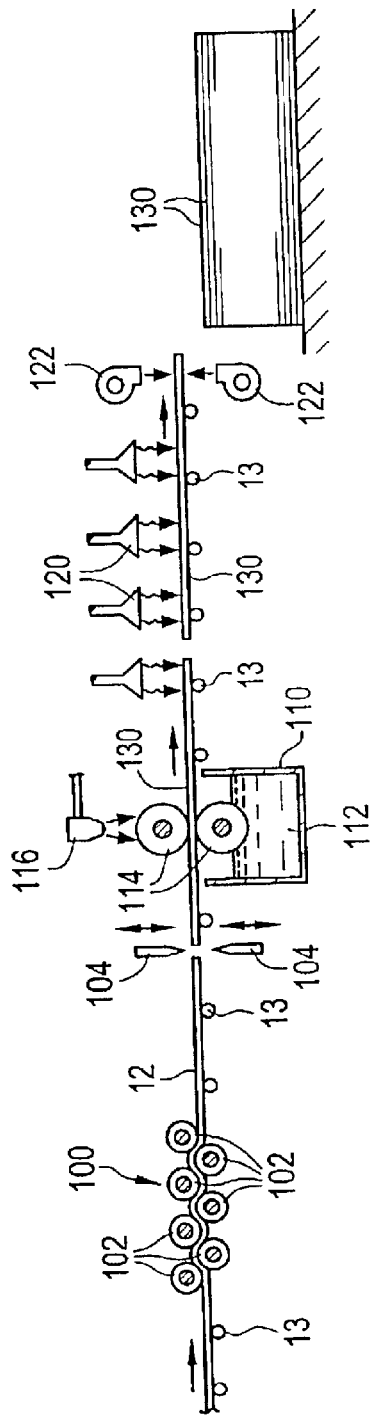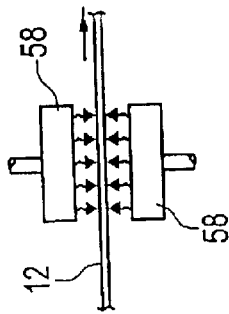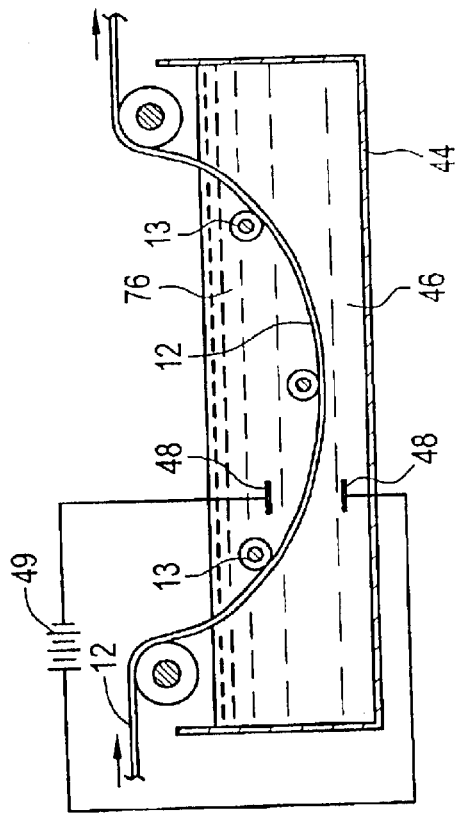

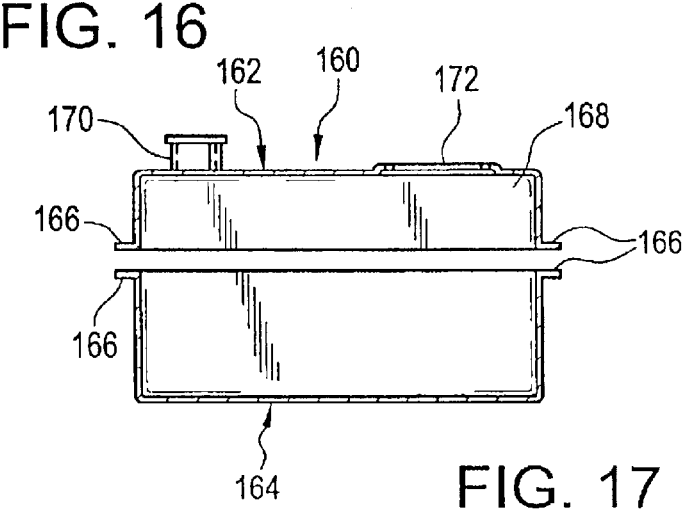
FIG. 16
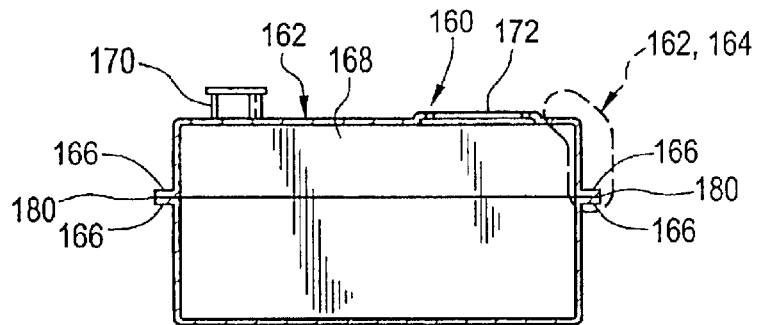
FIG. 17
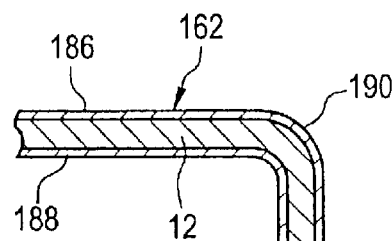
FIG. 18
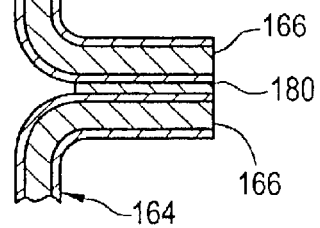

US 6,811,891 B2

CORROSION-RESISTANT COATED METAL AND METHOD FOR MAKING THE SAME

This patent application is a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/165,085 filed Dec. 10, 1993, now U.S. Pat. No. 5,397,652, which in turn is a continuation-in-part of Ser. No. 08/000,101 filed Jan. 4, 1993, now abandoned, which in turn is a continuation-in-part of Ser. No. 07/858,662 filed Mar. 27, 1992, now U.S. Pat. No. 5,314,758.

This patent application is also a continuation of Ser. No. 10/144,148 filed May 10, 2002, now U.S. Pat. No. 6,652,990 which in turn is a continuation of Ser. No. 09/634,828 filed Aug. 9, 2000, now abandoned which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/260,333 filed Jun. 15, 1994, now U.S. Pat. No. 5,429,882, which in turn is a continuation-in-part of Ser. No. 08/209,400 filed Mar. 14, 1994, now abandoned, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is further a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/341,365 filed Nov. 17, 1994, now U.S. Pat. No. 5,489,490, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is still further a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/347,261 filed Nov. 30, 1994, now U.S. Pat. No. 5,491,035, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is yet further a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is also a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/373,533 filed Jan. 17, 1995, now U.S. Pat. No. 5,455,122, which in turn is a continuation of Ser. No. 08/254,875 filed Jun. 6, 1994, now abandoned, which in turn is a divisional of Ser. No. 08/209,400 filed Mar. 14, 1994, now abandoned, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is further a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/338,337 filed Nov. 14, 1994, now abandoned, which in turn is a divisional of 08/229,097 filed Apr. 18, 1994, now U.S. Pat. No. 5,395,702, which in turn is a continuation of Ser. No. 08/000,101 filed Jan. 4, 1993, now abandoned, which in turn is a continuation-in-part of Ser. No. 07/858,662 filed Mar. 27, 1992, now U.S. Pat. No. 5,314,758.

This patent application is yet further a continuation of Ser. No. 10/144,148 filed May 10, 2002, now U.S. Pat. No. 6,652,990 which in turn is continuation of Ser. No. 09/634, 828 filed Aug. 9, 2000, now abandoned which in turn is a continuation-in-part of Ser. No. 08/929,623 filed Sep. 15, 1997, now abandoned, which in turn is a continuation-in-part of Ser. No. 08/604,078 filed Feb. 20, 1996, now U.S. Pat. No. 5,695,822, which in turn is a divisional of Ser. No. 08/438,042 filed May 8, 1995, now U.S. Pat. No. 5,597,656, which in turn is a continuation-in-part of Ser. No. 08/338,386 filed Nov. 14, 1994, now U.S. Pat. No. 5,470,667, which in turn is a continuation of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is also a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 08/929,623 filed Sep. 15, 1997, now abandoned, which in turn is a continuation-in-part of Ser. No. 08/604,078 filed Feb. 20, 1996, now U.S. Pat. No. 5,695,822, which in turn is a divisional of Ser. No. 08/438,042 filed May 8, 1995, now U.S. Pat. No. 5,597,656, which in turn is a continuation-in-part of Ser. No. 08/260,333 filed Jun. 15, 1994, now U.S. Pat. No. 5,429,882, which in turn is a continuation-in-part of Ser. No. 08/209,400 filed Mar. 14, 1994, now abandoned, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is further a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 08/929,623 filed Sep. 15, 1997, now abandoned, which in turn is a continuation-in-part of Ser. No. 08/604,078 filed Feb. 20, 1996, now U.S. Pat. No. 5,695,822, which in turn is a divisional of Ser. No. 08/438,042 filed May 8, 1995, now U.S. Pat. No. 5,597,656, which in turn is a continuation-in-part of Ser. No. 08/341,365 filed Nov. 17, 1994, now U.S. Pat. No. 5,489,490, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is yet further a continuation of Ser. No. 09/634,828 filed Aug. 9, 2000, now abandoned which in turn is a continuation-in-part of Ser. No. 08/929,623 filed Sep. 15, 1997, now abandoned, which in turn is a continuation-in-part of Ser. No. 08/604,078 filed Feb. 20, 1996, now U.S. Pat. No. 5,695,822, which in turn is a divisional of Ser. No. 08/438,042 filed May 8, 1995, now U.S. Pat. No. 5,597,656, which in turn is a continuation-in-part of Ser. No. 08/347,261 filed Nov. 30, 1994, now U.S. Pat. No. 5,491,035, which in turn is a continuation-in-part of Ser. No. 08/175,523 filed Dec. 30, 1993, now U.S. Pat. No. 5,401,586, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is further a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 08/980,985 filed Oct. 20, 1997, now abandoned, which in turn is a continuation of Ser. No. 08/636,179 filed Apr. 22, 1996, now abandoned, which in turn is a continuation-in-part of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/380,372 filed Jan. 30, 1995, now U.S. Pat. No. 5,480,731, which is in turn a continuation of Ser. No. 08/153,026 filed Nov. 17, 1993, now U.S. Pat. No. 5,395,703, which in turn is a divisional of Ser. No. 07/858,662 filed Mar. 27, 1992, now U.S. Pat. No. 5,314,758.

This patent application is still further a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 09/071,316 filed May 1, 1998, now U.S. Pat. No. 6,080,497, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/165,085 filed Dec. 10, 1993, now U.S. Pat. No. 5,401,586, which in turn is a continuation-in-part of Ser. No. 08/000,101 filed Jan. 4, 1993, now abandoned, which in turn is a continuation-in-part of Ser. No. 07/967,407 filed Oct. 26, 1992, now abandoned, which in turn is a continuation-in-part of Ser. No. 07/913,209 filed Jul. 15, 1992, now abandoned, which in turn is a continuation-in-part of Ser. No. 07/858,662 filed Mar. 27, 1992, now U.S. Pat. No. 5,314,758.

This patent application is yet further a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 09/100,578 filed Jun. 19, 1998, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/380,372 filed Jan. 30, 1995, now U.S. Pat. No. 5,480,731, which is in turn a continuation of Ser. No. 08/153,026 filed Nov. 17, 1993, now U.S. Pat. No. 5,395,703, which in turn is a divisional of Ser. No. 07/858,662 filed Mar. 27, 1992, now U.S. Pat. No. 5,314,758.

This patent application is also a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 09/131,219 filed Aug. 7, 1998, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/380,372 filed Jan. 30, 1995, now U.S. Pat. No. 5,480,731, which is in turn a continuation of Ser. No. 08/153,026 filed Nov. 17, 1993, now U.S. Pat. No. 5,395,703, which in turn is a divisional of Ser. No. 07/858,662 filed Mar. 27, 1992, now U.S. Pat. No. 5,314,758.

This patent application is further a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 09/161,573 filed Sep. 28, 1998, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/380,372 filed Jan. 30, 1995, now U.S. Pat. No. 5,480,731, which is in turn a continuation of Ser. No. 08/153,026 filed Nov. 17, 1993, now U.S. Pat. No. 5,395,703, which in turn is a divisional of Ser. No. 07/858,662 filed Mar. 27, 1992, now U.S. Pat. No. 5,314,758.

This patent application is still further a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 09/161,580 filed Sep. 28, 1998, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/380,372 filed Jan. 30, 1995, now U.S. Pat. No. 5,480,731, which is in turn a continuation of Ser. No. 08/153,026 filed Nov. 17, 1993, now U.S. Pat. No. 5,395,703, which in turn is a divisional of Ser. No. 07/858,662 filed Mar. 27, 1992, now U.S. Pat. No. 5,314,758.

This patent application is yet further a continuation of Ser. No. 10/144,148 filed May 10, 2002, now U.S. Pat. No. 6,652,990 which in turn is continuation of Ser. No. 09/634,828 filed Aug. 9, 2000, now abandoned which in turn is a continuation-in-part of Ser. No. 09/420,165 filed Oct. 18, 1999, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/380,372 filed Jan. 30, 1995, now U.S. Pat. No. 5,480,731, which is in turn a continuation of Ser. No. 08/153,026 filed Nov. 17, 1993, now U.S. Pat. No. 5,395,703, which in turn is a divisional of Ser. No. 07/858,662 filed Mar. 27, 1992, now U.S. Pat. No. 5,314,758.

This patent application is also a continuation of Ser. No. 10/144,148 filed May 10, 2002, now U.S. Pat. No. 6,652,990 which in turn is continuation of Ser. No. 09/634,828 filed Aug. 9, 2000, now abandoned, which in turn is a continuation-in-part of Ser. No. 09/420,165 filed Oct. 18, 1999, now abandoned, which in turn is a continuation-in-part of Ser. No. 09/161,580 filed Sep. 28, 1998, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/373,533 filed Jan. 17, 1995, now U.S. Pat. No. 5,455,122, which in turn is a continuation of Ser. No. 08/254,875 filed Jun. 6, 1994, now abandoned, which in turn is a divisional of Ser. No. 08/209,400 filed Mar. 14, 1994, now abandoned, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is also a continuation of Ser. No. 10/144,148 filed May 10, 2002, now U.S. Pat. No. 6,652,990 which in turn is continuation of Ser. No. 09/634,828 filed Aug. 9, 2000, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/373,533 filed Jan. 17, 1995, now U.S. Pat. No. 5,455,122, which in turn is a continuation of Ser. No. 08/254,875 filed Jun. 6, 1994, now abandoned, which in turn is a divisional of Ser. No. 08/209,400 filed Mar. 14, 1994, now abandoned, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

This patent application is also a continuation of Ser. No. 10/144,148 filed May 10, 2002, now U.S. Pat. No. 6,652,990 which in turn is continuation of Ser. No. 09/634,828 filed Aug. 9, 2000, now abandoned, which in turn is a continuation-in-part of Ser. No. 08/929,623 filed Sep. 15, 1997, now abandoned, which in turn is a continuation-in-part of Ser. No. 08/604,074 filed Feb. 20, 1996, now U.S. Pat. No. 5,667,849, which in turn is a divisional of Ser. No. 08/551,456 filed Nov. 1, 1995, now U.S. Pat. No. 5,616,424, which in turn is a divisional of Ser. No. 08/402,925 filed Mar. 13, 1995, now U.S. Pat. No. 5,491,036, which in turn is a continuation-in-part of Ser. No. 08/347,261 filed Nov. 30, 1994, now U.S. Pat. No. 5,491,035, which in turn is a continuation-in-part of Ser. No. 08/254,875 filed Jun. 6, 1994, now abandoned, which in turn is a divisional of Ser. No. 08/209,400 filed Mar. 14, 1994, now abandoned, which in turn is a continuation-in-part of Ser. No. 08/154,376 filed Nov. 17, 1993, now abandoned, which in turn is a continuation of Ser. No. 08/042,649 filed Apr. 5, 1993, now abandoned.

The present invention relates to the art of a corrosion-resistant metal material and more particularly to a corrosion resistant alloy or coated base metal which is coated with a corrosion resistant alloy, which alloy is environmentally friendly, and has a long life.

INCORPORATION BY REFERENCE

As background material so that the specification need not specify in detail what is known in the art, U.S. Pat. Nos. 4,934,120; 4,982,543; 4,987,716; 4,934,120; 5,001,881; 5,022,203; 5,259,166; and 5,301,474 are incorporated herein by reference to illustrate metal roofing systems of the type to which this invention can be used. U.S. Pat. No. 5,455,122 is incorporated herein by reference to illustrate petroleum receptacles of the type to which this invention can be used. U.S. Pat. No. 5,203,985 is incorporated herein by reference to illustrate a prior art electroplating process which can be used to coat the coated base metal. U.S. Pat. Nos. 5,296,300; 5,314,758; 5,354,624; 5,395,702; 5,395,703; 5,397,652; 5,401,586; 5,429,882; 5,455,122; 5,470,667; 5,480,731; 5,489,490; 5,491,035; 5,491,036; 5,492,772; 5,520,964; 5,597,656; 5,616,424; 5,667,849, 5,695,822; and 6,080,497 and U.S. patent application Ser. No. 07/913,209, filed Jul. 15, 1992; Ser. No. 08/042,649, filed Apr. 5, 1993; Ser. No. 08/929,623, filed Sep. 15, 1997; Ser. No. 08/980,985, filed Oct. 20, 1997; Ser. No. 09/100,578, filed Jun. 19, 1998; Ser. No. 09/131,219, filed Aug. 7, 1998; Ser. No. 09/161,573, filed Sep. 28, 1998; Ser. No. 09/161,580, filed Sep. 28, 1998; and Ser. No. 09/420,165, filed Oct. 18, 1999 are incorporated herein by reference to illustrate various processes that can be used to coat, treat and use the coated base metal.

BACKGROUND OF THE INVENTION

The present invention relates to the art of corrosion-resistant metal materials such as a corrosion-resistant metal made of a corrosion-resistant metal alloy or a base metal which is coated with a corrosion resistant metal alloy, which corrosion-resistant metal materials can be used in a wide variety of applications such as, but not limited to, architectural or building materials such as roofing materials, siding materials, window frames, sheet metal, metal plates and the like; truck and automotive products such as, but not limited to, gasoline tanks, filter casings, body molding, body parts and the like; household products such as, but not limited to, appliance housings, electrical housings, light fixtures and the like; marine products such as, but not limited to, boat hulls, boat masts, dock system components; and/or other types of metal materials such as, but not limited to, tools, machinery, wires, cables, electrodes, solder and the like. The invention also relates to various metal alloy compositions or metal coating alloy compositions based upon metal alloys of tin and metal alloys of tin and zinc, and several novel methods and processes used therein for forming the metal alloy materials or base metals coated with the metal alloy composition, such as, but not limited to, wire or solder forming, metal strip forming, and coated metal forming by a plating process and/or a hot-dip process (i.e plating of metal alloy and subsequent flow heating, immersion in molten metal alloy, metal spraying of metal alloy, and/or roller coating of metal alloy), pretreatment of the base metal prior to metal alloy coating, applying an intermediate barrier metal layer prior to metal alloy coating, post-treating the metal alloy or coated base metal, and/or forming the metal alloy or coated base metal into a variety of different articles.

Over the last several years, there has been a trend in the industry to produce products which are higher in quality, are environmentally friendly, and are safe for use by humans, animals, and/or plants. This push for quality, safety and environmental friendliness is very apparent in the automotive industry wherein both consumer groups and environmental organizations are constantly lobbying for safer, higher-quality vehicles that are more fuel efficient and less detrimental to the environment. Recycling old vehicles has been one answer to resolving the environmental issues associated with vehicles which have run out their useful life. Automotive salvage markets have developed for these vehicles. The vehicles are partially dismantled and sold as scrap metal wherein the metal is melted down and reformed into various parts. Because of the environmentally-unfriendly nature of lead, the gasoline tanks of vehicles must be removed prior to the recycling of the vehicle. Gasoline tanks are commonly made of carbon or stainless steel that are coated with a terne alloy.

Terne or terne alloy is a term commonly used to describe a metal alloy containing about 80% lead and the balance tin. The terne alloy is conventionally applied to a base metal by immersing the base metal into a molten bath of terne metal by a continuous or batch process.

Although terne coated metals have excellent corrosion-resistant properties and have been used in various applications, terne coated materials have been questioned due to environmental concerns based on the high lead content of the alloy. Environmental and public safety laws have been proposed and/or passed prohibiting or penalizing the user of materials containing a significant portion of lead. As a result, these terne coated gas tanks must be disposed of in dumping yards or landfills. Not only does the terne coated gasoline tank take up space in the landfills, but there is a concern with the lead leaching from the terne coating into the landfill site and potentially contaminating the surrounding area and underground water reservoirs. Plastic gasoline tanks have been used as an alternative to terne coated materials, but with limited success. Although the use of plastic tanks eliminates the environmental concerns associated with lead, the plastic in-of-itself is a non-environmentally-friendly compound which does not readily degrade and therefore must be disposed of in a landfill. The plastic used to make the gasoline tanks is usually not the type that can be recycled. Plastics have also been found to be less reliable than metal gasoline tanks with respect to durability and safety. Plastic gasoline tanks have a tendency to rupture upon impact, such as from a car accident, whereas a metal gasoline tank tends to absorb much of the shock on impact by bending and slightly deforming. Furthermore, the plastic gasoline tanks are more susceptible to being punctured from roadside debris since the plastic skin is not as strong or malleable as the skin of a metal gasoline tank. Plastic gasoline tanks also require new materials, special tools and new assembly methods to fix and install the gasoline tanks due to the nature of plastic and its physical properties. These additional costs and shortcomings of plastic tanks have resulted in very little adoption of plastic gasoline tanks in present day motor vehicles.

The lead content in metal materials is also of some concern for building materials. This is especially a concern when the metal materials are in contact with drinking water. In many countries, lead pipe has been outlawed to reduce the amount of lead in the water. In many remote locations throughout the world, piped water or well water is not readily available. As a result, structures, such as portable roof systems, are built to capture rain and to store the rain water for later use. These potable roof systems supply an important water source for inhabitants utilizing such structures. Roof systems that are designed to collect rain water are typically made of metal to increase the longevity of the roofing system. Typically, the roof systems are made of carbon steel since such metal is the least expensive. The carbon steel is commonly coated with a terne alloy to extend the life of the roof system. Terne alloy is commonly used due to its relatively low cost, ease of application, excellent corrosion-resistant properties and desirable colorization during weathering. Roof systems have been made of other metals such as, but not limited to, stainless steel, copper, copper alloys and aluminun. Stainless steel, copper, copper alloys and aluminum were typically not coated with a terne coating since these metals have excellent corrosion-resistant properties. However, in some limited applications, these metals have been coated with terne to extend the life of these metals. However, as with lead piping, there is a concern that the lead in the terne coated roofing materials results in lead dissolving in the collected water.

Terne coated materials have typically been coated with a 6–8 lb. coating (7–11 microns), which is a very thin coating. This thin coating commonly includes pinholes. Terne coated materials that are drawn or formed in various types of materials such as, but not limited to, gasoline tanks, corrugated roofing materials and the like typically included one or more defects in the coating. The defects in the terne coating on the base metal which were designed to protect the base metal from corroding thus compromised the corrosion resistance provided by the terne coating. Due to the thin layer of the terne coating and the pinholes in the coating, the coating on the base metal, upon being drawn by a die or by being formed, tended to tear or shear the terne coating and/or elongate the pin holes on the coating thereby exposing the base metal. These exposed surfaces were subject to corrosion and over time compromised the structural integrity, safety and/or performance of the coated base metal. The non-uniform coating of stainless steel metal with the terne coating is especially evident since the terne alloy did not bond as well to the stainless steel. Another disadvantage of using a terne alloy coating is the softness of the terne layer. The softness of the terne coating is susceptible to damage from the abrasive nature of forming machines and to environments that subject the terne coating to frequent contact with other materials.

Terne alloys have a further disadvantage in that the newly applied terne is very shiny and highly reflective. As a result, the highly reflective coating cannot immediately be used in certain environments such as on buildings or roofing systems in or near airports and military establishments. The terne coating eventually loses its highly reflective properties as the components of the terne coating are reduced (weathered); however, the desired amount of reduction takes at least approximately 1½ to 2 years when the terne coating is exposed to the atmosphere, thus requiring the terne metals to be stored over long periods of time prior to being used in these special areas. The storage time is significantly prolonged when the terne coated materials are stored in rolls and/or the terne alloy is protected from the atmosphere.

Metallic coatings such as tin or zinc have been tested as substitutes for terne coatings with limited success. The most popular process for applying a tin coating to a base metal is by an electroplating process. In an electroplating process, the coating thickness is very thin and typically ranges between 0.3 microns to 30 microns. The very thin thicknesses of the tin coating typically results in a tin coating having a network of small pinholes, thereby making the coated material generally unacceptable for use in corrosive environments such as on building materials and automotive products. Such tin plated base metals can include a flash or intermediate metal layer (plated layer) to reduce the pinhole problems inherent with the tin plating process. The tin plated layer is also susceptible to flaking or being scrapped off when the tin plated base metal is drawn through a die and/or formed into various components. The flaking of the tin coating can also cause premature clogging of filter systems and liquid lines, such as in gasoline lines and filters, when the tin plated based metals are formed into gasoline tanks. The pinholes problem and flaking and/or scraping problem that is associated with plated tin coatings is very problematic since tin is not electroprotective under oxidizing conditions. Consequently, discontinuities in the plated tin coating result in the corrosion of the exposed base metal.

The plated tin coating of carbon steel is a well-known process in the food industry. However, in the specialized art of building materials, a tin coating for base metals for use on building materials and the like has recently been used as disclosed in U.S. Pat. No. 5,314,758. Tin coatings form a highly-reflective surface. As a result, materials coated with a tin coating cannot be used in an environment where highly-reflective materials are undesirable until the tin coated materials are further treated (i.e. paint) or the tin is allowed time to sufficiently oxidize.

Coating a base metal with zinc metal, commonly known as galvanizing, is another popular metal treatment to inhibit corrosion. Zinc is a desirable metal to coat materials because of its relatively low cost, ease of application, and excellent corrosion resistance. Zinc is also electroprotective under oxidizing conditions and inhibits or prevents the exposed metal, due to discontinuities in the zinc coating, from rapidly corroding. This electrolytic protection extends away from the zinc coating over exposed metal surfaces for a sufficient distance to protect the exposed metal at cut edges, scratches, and other coating discontinuities. Although zinc coatings bond to many types of metals, the bond is typically not very strong thereby resulting in the zinc coating flaking off the base metal over time and/or when being formed. The flaking of zinc, like the flaking of tin, can cause premature clogging of filter systems and liquid lines when zinc coated materials are formed into gasoline tanks. Further, when using fuel injection systems, the small particles of zinc or zinc oxide can disable the fuel injectors over time. Such problems are unacceptable in the automotive field. Zinc further does not form a uniform and/or thick coating when coating stainless steel, thus resulting in discontinuities in the coating. Zinc is also a very rigid and brittle metal, thus tends to crack and/or flake off when the zinc coated materials are formed and/or drawn through a die. When zinc oxidizes, the zinc coating forms a white powdery texture (zinc oxide). This white powdery substance is undesirable for many building applications and in various other environments and applications. Consequently, the use of a tin or zinc coating as a substitute for terne coatings has not been highly reliable, or a cost effective substitute for traditional terne coatings.

Metal coatings that include a hot dip coating of tin and zinc alloy have been used for fuel tanks as disclosed in Japanese Patent Application No. 47-97776 filed Sep. 29, 1972. The alloy coating thickness was disclosed to be 10–15 microns.

The coating of steel articles by a batch hot-dip process with a tin, zinc and aluminum mixture is disclosed in U.S. Pat. No. 3,962,501 issued Jun. 8, 1976. The '501 patent discloses that the tin, zinc and aluminum mixture resists oxidation and maintains a metallic luster. The '501 patent also discloses that the coating is applied by a batch process involving the immersion of a steel article into a molten alloy bath for an extended period of time. The '501 patent further discloses that a molten tin and zinc metal alloy is very susceptible to oxidation resulting in viscous oxides forming on the surface of the molten tin and zinc metal alloy. These viscous oxides cause severe problems with the coating process. While the steel article is immersed in the molten alloy, a large amount of dross forms on the surface of the molten alloy. The dross results in non-uniformity of the coating and the formation of pin holes as the steel article is removed from the molten metal. The '501 patent discloses that the addition of up to 25% aluminum to the tin and zinc metal alloy inhibits dross formation, prevents Zn—Fe alloy formation, and reduces viscous oxide formation on the molten bath surface. The batch process disclosed in the '501 patent subjects the surface of the article to differing residence times in the molten alloy which can result in differing coating thicknesses and coating properties on the coated article.

The treatment of a steel sheet by plating tin and zinc followed by heat flowing is disclosed in U.S. Pat. No. 4,999,258. The '258 patent discloses a steel sheet plated with a layer of tin and a subsequent layer of zinc. The tin and zinc plated layers are then heated until the zinc alloys with the tin. The tin is applied at 0.2–1.0 g/m$^2$ and the zinc is applied at 0.01–0.3 g/m$^2$. The '258 patent also discloses that when less than 1% zinc is used, the beneficial effect of the zinc is null; however, when more than 30% zinc is used, the coating will rapidly corrode under adverse environments. The '258 patent also discloses that a nickel plated layer is preferably applied to the steel sheet prior to applying the tin and zinc plated layers to improve corrosion resistance. The heat treated tin and zinc layer can be further treated by applying a chromate treatment to the plated layer to further improve corrosion resistance.

A continuous process for electroplating a carbon steel strip is disclosed in U.S. Pat. No. 5,203,985. The '985 patent discloses that nickel is electroplated on a continuously moving strip of carbon steel. After the carbon steel has been nickel plated, the plated strip is hot dip coated with molten zinc.

The electroplating of tin, tin-nickel or tin and zinc by an electroplating process and subsequent formation of an intermetallic layer by heat flowing the plated layer is disclosed in U.S. Pat. No. 5,433,839.

Due to the various environmental concerns and problems associated with corrosion-resistant coatings applied to base metals and the problems associated with the inadvertent removal of the corrosion-resistant coating during the forming and/or drawing of the coated materials, there has been a demand for a coating or metal material that is corrosion-resistant, is environmentally friendly, and which resists damage during forming into end components. Many of these demands where met by the tin metal alloy or the tin and zinc metal alloy and process and method for applying these alloys to a base metal disclosed in Applicants U.S. Pat. Nos. 5,314,758; 5,354,624; 5,395,702; 5,395,703; 5,397,652; 5,401,586; 5,429,882; 5,455,122; 5,470,667; 5,480,731; 5,489,490; 5,491,035; 5,491,036; 5,492,772; 5,520,964; 5,597,656; 5,616,424; and 5,667,849. The present invention is an improvement or refinement of the alloys and/or use of the alloys disclosed in these prior patents.

SUMMARY OF THE INVENTION

The present invention relates to a product and method of producing a corrosion-resistant, environmentally friendly metal material. More particularly, the invention relates to a metal material that is at least partially composed of a corrosion resistant metal alloy, or the coating of a base metal with a corrosion resistant metal alloy which forms a corrosive-resistant barrier on the base metal. Even more particularly, the invention relates to a corrosion resistant metal alloy or a base metal coated with a corrosion-resistant metal alloy which corrosion resistant metal alloy or coated base metal is formed into truck and/or automotive products, architectural and/or building materials, household materials, marine products, and/or formed into tools, machinery, cable, wire, wire solder and/or welding electrodes.

In accordance with the principal feature of the invention, there is provided a corrosion resistant metal alloy primarily including tin or tin and zinc. In one embodiment of the invention, the corrosion resistant metal alloy is formed, molded and/or drawn into a metal article. In another embodiment of the invention, the corrosion resistant metal alloy is coated on a base metal, which coated base metal is formed, molded, and/or drawn into a metal article.

In accordance with another aspect of the invention, a metal alloy that primarily includes tin and equal to or less than the minimum eutectic weight percentage of zinc, when zinc is included in the metal alloy, is a tin metal alloy. As defined herein, a tin metal alloy is a metal alloy that includes at least a majority of the metal alloy and includes less than 9–10 weight percent zinc, when zinc is included in the metal alloy. The corrosion resistant tin metal alloy forms a corrosion resistant coating that protects the surface of the base metal from oxidation. The corrosion resistant tin metal alloy provides protection to the base metal in a variety of environments such as rural, industrial, and/or marine environments. The corrosion resistant tin metal alloy also performs well in low temperatures; has a relatively low coefficient of thermal expansion; has a pleasing color; resists degradation by solar energy; can be molded, cast, formed, drawn, soldered, painted and/or colored; and/or can be installed in a variety of weather conditions. Because of the relative inertness of the tin oxide in many environments, the corrosion resistant tin metal alloy is considered to be environmentally safe and friendly and considered a safe material to be used in the human environment. The corrosion resistant tin metal alloy is also a cost effective material for use in structures erected in corrosive environments, such as in the tropics and other areas where buildings are exposed to strong winds, corrosive fumes, and/or marine conditions. The tin metal alloy can be used as a solder and/or wire electrode. In one embodiment of the invention, the tin content in the tin metal alloy makes up over 50 weight percent of the tin metal alloy. In one aspect of this embodiment, the tin content in the tin metal alloy is at least about 75 weight percent of the tin metal alloy. In another aspect of this embodiment, the tin content in the tin metal alloy is at least about 80 weight percent of the tin metal alloy. In yet another aspect of this embodiment, the tin content in the tin metal alloy is at least about 85 weight percent of the tin metal alloy. In still yet another aspect of this embodiment, the tin content in the tin metal alloy is at least about 90 weight percent of the tin metal alloy. In a further aspect of this embodiment, the tin content in the tin metal alloy is at least about 95 weight percent of the tin metal alloy. In yet a further aspect of this embodiment, the tin content in the tin metal alloy is at least about 98 weight percent of the tin metal alloy. In still a further aspect of this embodiment, the tin content in the tin metal alloy is at least about 99 weight percent of the tin metal alloy.

In accordance with another aspect of the invention, a metal alloy that primarily includes tin and equal to or less than the minimum eutectic weight percentage of zinc, when zinc is included in the metal alloy, is a tin metal alloy. As defined herein, a tin metal alloy is a metal alloy that includes at least a majority of the metal alloy and includes less than 9–10 weight percent zinc, when zinc is included in the metal alloy. The corrosion resistant tin metal alloy forms a corrosion resistant coating that protects the surface of the base metal from oxidation. The corrosion resistant tin metal alloy provides protection to the base metal in a variety of environments such as rural, industrial, and/or marine environments. The corrosion resistant tin metal alloy also performs well in low temperatures; has a relatively low coefficient of thermal expansion; has a pleasing color; resists degradation by solar energy; can be molded, cast, formed, drawn, soldered, painted and/or colored; and/or can be installed in a variety of weather conditions. Because of the relative inertness of the tin oxide in many environments, the corrosion resistant tin metal alloy is considered to be environmentally safe and friendly and considered a safe material to be used in the human environment. The corrosion resistant tin metal alloy is also a cost effective material for use in structures erected in corrosive environments, such as in the tropics and other areas where buildings are exposed to strong winds, corrosive fumes, and/or marine conditions. The tin metal alloy can be used as a solder and/or wire electrode. In one embodiment of the invention, the tin content in the tin metal alloy makes up over 50 weight percent of the tin metal alloy. In one aspect of this embodiment, the tin content in the tin metal alloy is at least about 75 weight percent of the tin metal alloy. In another aspect of this embodiment, the tin content in the tin metal alloy is at least about 80 weight percent of the tin metal alloy. In yet another aspect of this embodiment, the tin content in the tin metal alloy is at least about 85 weight percent of the tin metal alloy. In still yet another aspect of this embodiment, the tin content in the tin metal alloy is at least about 90 weight percent of the tin metal alloy. In a further aspect of this embodiment, the tin content in the tin metal alloy is at least about 95 weight percent of the tin metal alloy. In yet a further aspect of this embodiment, the tin content in the tin metal alloy is at least about 98 weight percent of the tin metal alloy. In still a further aspect of this embodiment, the tin content in the tin metal alloy is at least about 99 weight percent of the tin metal alloy.

In accordance with yet another aspect of the invention, the corrosion resistant tin metal alloy and corrosion resistant tin and zinc metal alloy contain a low lead content. The lead source in the tin metal alloy or the tin and zinc metal alloy can be from impurities in the raw tin and/or zinc ore used to make the metal alloy, and/or can be from directed additions of lead to the metal alloy. In some metal alloy combinations, lead in the metal alloy positively affects one or more physical and/or chemical properties of the metal alloy. Metal alloys that include little or no lead are considered more environmentally friendly, and the prejudices associated with high lead containing alloys are overcome. In one embodiment of the invention, the tin metal alloy and the tin and zinc metal alloy includes no more than about 10 weight percent lead. In one aspect of this embodiment, the metal alloy includes less than about 2 weight percent lead. In another aspect of this embodiment, the metal alloy includes less than about 1 weight percent lead. In yet another aspect of this embodiment, the metal alloy includes less than about 0.5 weight percent lead. In still another aspect of this embodiment, the metal alloy includes less than about 0.05 weight percent lead. In still yet another aspect of this embodiment, the metal alloy includes less than about 0.01 weight percent lead.

In accordance with a further aspect of the invention, the tin metal alloy and tin and zinc metal alloy include one or more additives. In one embodiment of the invention, the one or more additives generally constitute less than about 25 weight percent of the metal alloy. In one aspect of this embodiment, the one or more additives constitute less than about 10 weight percent of the metal alloy. In another aspect of this embodiment, the one or more additives constitute less than about 5 weight percent of the metal alloy. In yet another aspect of this embodiment, the one or more additives constitute less than about 2 weight percent of the metal alloy. In still another aspect of this embodiment, the one or more additives constitute less than about 1 weight percent of the metal alloy. In still yet another aspect of this embodiment, the one or more additives constitute less than about 0.5 weight percent of the metal alloy. In another embodiment of the invention, the additives include, but are not limited to, aluminum, antimony, arsenic, bismuth, boron, bromine, cadmium, carbon, chlorine, chromium, copper, cyanide, fluoride, iron, lead, magnesium, manganese, molybdenum, nickel, nitrogen, phosphorous, potassium, silicon, silver, sulfur, tellurium, titanium, vanadium, and/or zinc. The one or more additives included in the corrosion resistant metal alloy are used to enhance the mechanical properties of the metal alloy, to improve the corrosion resistance of the metal alloy, to improve the grain refinement of the metal alloy, to alter the color of the metal alloy, to alter the reflectiveness of the metal alloy, to inhibit the oxidation of the metal alloy during forming or coating of the metal alloy and/or when the metal alloy is exposed in various types of environments, to inhibit dross formation during the forming or coating of the metal alloy, to stabilize one or more components of the metal alloy, to improve the bonding of the metal alloy on the base metal and/or intermediate barrier metal layer on the base metal, to improve the flowability of the metal alloy during the forming or coating process, to produce the desired thickness of heat created intermetallic layer, and/or to reduce or inhibit the crystallization of the tin in the metal alloy. The inclusion of one or more additives in the corrosion resistant metal alloy preforms one or more of the above listed functions and/or features in the metal alloy. The believed functions and features of select additives are described below; however, the described additives may have additional functions and features. Aluminum reduces the rate of oxidation of the molten metal alloy; reduces dross formation during the coating process; alters the reflective properties of the metal alloy; alters the mechanical properties of the metal alloy (i.e. coatability, durability, flexibility, flowability, formability, hardness, and/or strength); and/or reduces the thickness of the heat created intermetallic layer to improve the formability of the coated base metal. Antimony, bismuth, cadmium, and/or copper prevents or inhibits the crystallization of the tin in the metal alloy, which crystallization can weaken the bonding and/or result in flaking of the corrosion resistant metal alloy; improves the bonding properties of the metal alloy to the base metal and/or intermediate barrier metal layer; alters the mechanical properties of the metal alloy; and/or alters the corrosion resistant properties of the metal alloy. Only small amounts of antimony, bismuth, cadmium, and/or copper are needed to prevent and/or inhibit the crystallization of the tin. This small amount can be as low as about 0.001–0.05 weight percent, and typically as low as 0.001–0.004 weight percent Arsenic alters the mechanical properties of the metal alloy. Cadmium, in addition to its bonding, corrosion resistant, stabilizing and/or mechanical altering properties, reduces the rate of oxidation of the molten metal alloy; reduces dross formation during the coating or forming process of the metal alloy; alters the color and/or reflective properties of the metal alloy; and/or improves the grain refinement of the metal alloy. Chromium provides additional corrosion protection to the metal alloy; alters the mechanical properties of the metal alloy; and/or alters the color and/or reflective properties of the metal alloy. Copper, in addition to its corrosion resistant, stabilizing and/or mechanical altering properties, alters the color and/or reflective properties of the metal alloy. Iron alters the mechanical properties of the metal alloy; and/or alters the color of the metal alloy. Lead provides additional corrosion protection to the metal alloy, alters the mechanical properties of the metal alloy; alters the color of the metal alloy; and/or improves the bonding properties of the metal alloy to the base metal and/or intermediate barrier metal layer. Magnesium alters the mechanical properties of the metal alloy; reduces the anodic characteristics of the metal alloy; reduces the rate of oxidation of the molten metal alloy; and/or reduces dross formation during the forming or coating process of the metal alloy. Manganese provides additional corrosion protection to the metal alloy, improves the grain refinement of the metal alloy; and/or improves the bonding properties of the metal alloy to the base metal and/or intermediate barrier metal layer. Nickel provides corrosion protection to the metal alloy, especially in alcohol and chlorine containing environments; alters the mechanical properties of the metal alloy; and/or alters the color and/or reflective properties of the metal alloy. Silver alters the mechanical properties of the metal alloy; and/or alters the color and/or reflective properties of the metal alloy. Titanium improves the grain refinement of the metal alloy; alters the mechanical properties of the metal alloy; provides additional corrosion protection to the metal alloy; reduces the rate of oxidation of the molten metal alloy; reduces dross formation during the forming or coating process of the metal alloy; alters the color and/or reflective properties of the metal alloy; and/or improves the bonding properties of the metal alloy to the base metal and/or intermediate barrier metal layer. Zinc alters the mechanical properties of the metal alloy; provides additional corrosion protection to the metal alloy, alters the color and/or reflective properties of the metal alloy; improves the bonding properties of the metal alloy to the base metal and/or intermediate barrier metal layer, and/or stabilizes the tin to inhibit or prevent crystallization of the tin in the metal alloy.

In accordance with another aspect of the invention, the thickness of the corrosion resistant metal alloy is selected to provide the desired amount of corrosion resistant protection to the surface of the base metal. Generally thinner coating thicknesses can be obtained by a plating process and thicker coating thicknesses can be obtained by immersion in molten metal alloy. The selected thickness of the coating will typically depend on the use of the coated base metal and the environment the coated base metal is to be used. A 6 lb. coating on a base metal is a common thickness for a thin coating. A 6 lb. coating has a coating thickness of about 7 microns. A 6 lb. coating is commonly applied by a plating process. In many instances, very thin coating thickness includes one or more pin holes in the coating. A 40 lb. coating on a base metal is also a common coating having a thickness of about 50 microns. A 40 lb. coating typically has few, if any, pin holes, and due to the thicker coating, resists tearing when the coated metal strip is drawn or formed into various types of components. Thicker metal alloy coatings are commonly used for automotive components (i.e. gasoline tank shell members), and roofing and siding materials. In one embodiment of the invention, the metal alloy coating is applied by a single plating process. In one aspect of this embodiment, the thickness of the metal alloy coating is at least about 1 micron. In another aspect of this embodiment, the thickness of the metal alloy coating is at least about 2 microns. In still another aspect of this embodiment, the thickness of the metal alloy coating is about 2–30 microns. In another embodiment of the invention, the metal alloy coating is applied by a) multiple plating processes, b) single or multiple hot-dip processes, and/or c) at least one plating process and at least one hot dip process. In one aspect of this embodiment, the thickness of the metal alloy coating is at least about 1 micron. In another aspect of this embodiment, the thickness of the metal alloy coating is up to about 2550. In still another aspect of this embodiment, the thickness of the metal alloy coating is about 2.5–1270 microns. In yet another aspect of this embodiment, the thickness of the metal alloy coating is about 7–1270 microns. In still yet another aspect of this embodiment, the thickness of the metal alloy coating is about 7–1250 microns. In a further aspect of this embodiment, the thickness of the metal alloy coating is about 15 to 1250 microns. In yet a further aspect of this embodiment, the thickness of the metal alloy coating is about 25–77 microns. In still a further aspect of this embodiment, the thickness of the metal alloy coating is about 25–51 microns.

In accordance with still another aspect of the invention, the base metal is a metal strip. A "strip" is defined as metal in the form of a thin metal sheet that is or can be rolled into a roll of metal, as opposed to plates of metal or other configurations of the metal. Metal strip which has a thickness of less than about 127 microns (0.005 inch) can break as the strip is pretreated and/or coated with a metal alloy coating at high process speeds. A high process speed is defined as a metal strip moving through the pretreatment process, intermediate barrier metal coating process and/or metal alloy coating process at a speed of about 60–400 ft/min. However, the metal strip thickness should not be too great so as to prevent the strip from being able to be directed, at a relatively high speed, through the pretreatment process, if any, and the coating process. Metal strip which is too thick is more difficult to heat when a heat created intermetallic layer is to be formed between the base metal and metal alloy coating and/or intermediate barrier metal, especially when the metal strip is moving at high speeds and/or coated over a short period of time. Metal strips having too great of a thickness are also difficult to maneuver at economical high speeds through the pretreatment process, if any, and the coating process. In one embodiment of the invention, the thickness of the metal strip is thin enough such that the metal strip can be unrolled from a roll of metal, coated by a metal alloy coating, and re-rolled into a roll of coated metal strip. In one aspect of this embodiment, the thickness of the metal strip is not more than about 5080 microns. In another aspect of this embodiment, the thickness of the metal strip is less than about 2540 microns. In yet another aspect of this embodiment, the thickness of the metal strip is less than about 1270 microns. In still another aspect of this embodiment, the thickness of the metal strip is less than about 762 microns. In a further aspect of this embodiment, the thickness of the metal strip is about 127–762 microns. In yet a further aspect of this embodiment, the thickness of the metal strip is about 254–762 microns. In still a further aspect of this embodiment, the thickness of the metal strip is about 381–762 microns. In yet a further aspect of this embodiment, the thickness of the metal strap is about 127–381 microns. In still yet a further aspect of this embodiment, the thickness of the metal strip is about 508–762 microns. In another embodiment of the invention, the thickness of the metal strip is not more than about 1588 microns when the metal strip is formed of stainless steel, nickel alloys, titanium or titanium alloys. These types of metal strip are difficult to maneuver at economical, high speeds through the coating process when the metal strip thickness is greater than 1588 microns. In one aspect of this embodiment, metal strip made of stainless steel, nickel alloys, titanium or titanium alloy strip has a thickness of about 255–762 microns.

In accordance with still yet another aspect of the invention, the base metal is a metal plate. In one embodiment of the invention, the metal plate is a rectangular or square metal plate having a length of about 1 to 15 feet and a width of about 1–20 feet. In another embodiment of the invention, the thickness of the metal plate is not more than about 51000 microns (2 inches). In one aspect of this embodiment, the thickness of the metal plate is not more than about 25400 microns. In another aspect of this embodiment, the thickness of the metal plate is not more than about 12700 microns.

In accordance with another aspect of the invention, the base metal is carbon steel. In one embodiment of the invention, the carbon steel base metal is a metal strip. In one aspect of this embodiment, the thickness of the carbon steel strip is less than about 2540 microns. In another aspect of this embodiment, the thickness of the carbon steel strip is less than about 1588 microns. In yet another aspect of this embodiment, the thickness of the carbon steel strip is less than about 1270 microns. In still another aspect of this embodiment, the thickness of the carbon steel strip is up to about 762 microns. In a further aspect of this embodiment, the thickness of the carbon steel strip is about 127–762 microns. In yet a further aspect of this embodiment, the thickness of the carbon steel strip is about 254–762 microns. In still a further aspect of this embodiment, the thickness of the carbon steel strip is about 381–762 microns. In another embodiment of the invention, the carbon steel base metal is a metal plate.

In accordance with still another aspect of the invention, the base metal is stainless steel. "Stainless steel" is used in its technical sense and includes a large variety of ferrous alloys containing chromium and iron. Carbon steel base metal that is plated with chromium and subsequently coated with a metal alloy coating by a hot dip process transforms the carbon steel into stainless steel at least at the surface of the base metal surface. The stainless steel may also contain other elements or compounds such as, but not limited to, nickel, carbon, molybdenum, silicon, manganese, titanium, boron, copper, aluminum and various other metals or compounds. Elements such as nickel can be flashed (plated) onto the surface of the stainless steel or directly incorporated into the stainless steel. In one embodiment of the invention, the stainless steel base metal is 304 or 316 stainless steel. In another embodiment of the invention, the stainless steel base metal is a metal strip. In one aspect of this embodiment, the thickness of the stainless steel strip is less than about 2540 microns. In another aspect of this embodiment, the thickness of the stainless steel strip is less than about 1588 microns. In yet another aspect of this embodiment, the thickness of the stainless steel strip is less than about 1270 microns. In still another aspect of this embodiment, the thickness of the stainless steel strip is up to about 762 microns. In a further aspect of this embodiment, the thickness of the stainless steel strip is about 127–762 microns. In yet a further aspect of this embodiment, the thickness of the stainless steel strip is about 254–762 microns. In still a further aspect of this embodiment, the thickness of the stainless steel strip is about 381–762 microns. In still another embodiment of the invention, the stainless steel base metal is a metal plate.

In accordance with yet another aspect of the invention, the base metal is copper. Copper metal is known for its malleability properties and natural corrosion resistant properties. Copper metal that is coated with a metal alloy can be formed into a variety of simple and complex shapes. In one embodiment of the invention, the copper base metal is a metal strip. In one aspect of this embodiment, the thickness of the copper strip is not more than about 5080 microns. In another aspect of this embodiment, the thickness of the copper strip is less than about 2540 microns. In yet another aspect of this embodiment, the thickness of the copper strip is less than about 1270 microns. In still another aspect of this embodiment, the thickness of the copper strip is up to about 762 microns. In a further aspect of this embodiment, the thickness of the copper strip is about 127–762 microns. In yet a further aspect of this embodiment, the thickness of the copper strip is about 254–762 microns. In still a further aspect of this embodiment, the thickness of the copper strip is about 381–762 microns. In still another embodiment of the invention, the copper base metal is a metal plate.

In accordance with still yet another aspect of the invention, the base metal is a copper alloy. "Copper alloys" as used herein include, but are not limited to, brass and bronze. Brass is defined as a copper alloy that includes a majority of copper and zinc. Bronze is defined as an alloy that includes tin and a majority of copper. Brass and bronze are copper alloys with known corrosion resistant properties in various environments. Although brass and bronze are relatively corrosion resistant in many environments, brass and bronze are susceptible to a greater degree of corrosion in some environments than others. Brass and bronze are also relatively bright and reflective materials which can be undesirable for use in several applications. As a result, it has been found that brass and bronze coated with a corrosion resistant metal alloy can overcomes these deficiencies. In one embodiment of the invention, the copper content of the brass is about 50.1–99 weight percent and the zinc content is about 1–49.9 weight percent. In one aspect of this embodiment, the brass includes one or more additives such as, but not limited to, aluminum, beryllium, carbon, chromium, cobalt, iron, lead, manganese, magnesium, nickel, niobium, phosphorous, silicon, silver, sulfur, and/or tin. These additives typically alter the mechanical and/or corrosion resistant properties of the brass. In another embodiment of the invention, the bronze includes one or more additives such as, but not limited to, aluminum, iron, lead, manganese, nickel, nitrogen, phosphorous, silicon, and/or zinc. In still another embodiment of the invention, the copper alloy base metal is a metal strip. In one aspect of this embodiment, the thickness of the copper alloy strip is not more than about 5080 microns. In another aspect of this embodiment, the thickness of the copper alloy strip is less than about 2540 microns. In yet another aspect of this embodiment, the thickness of the copper alloy strip is less than about 1270 microns. In still another aspect of this embodiment, the thickness of the copper alloy strip is less than about 762 microns. In a further aspect of this embodiment, the thickness of the copper alloy strip is about 127–762 microns. In yet a further aspect of this embodiment, the thickness of the copper alloy strip is about 254–762 microns. In still a further aspect of this embodiment, the thickness of the copper alloy strip is about 381–762 microns. In yet another embodiment of the invention, the copper alloy base metal is a metal plate.

In accordance with a further aspect of the invention, the base metal is made of aluminum, aluminum alloys, nickel alloys, tin, titanium, or titanium alloys. "Aluminum alloys" are used herein include, but are not limited to, alloys including at least about 10 weight percent aluminum. "Nickel alloys" are used herein include, but are not limited to, alloys including at least about 5 weight percent nickel. In one embodiment of the invention, the base metal is an aluminum metal strip. In another embodiment of the invention, the base metal is a aluminum alloy metal strip. In yet another embodiment of the invention, the base metal is a nickel alloy, tin, titanium, or titanium alloys strip. In still another embodiment of the invention, the base metal is a tin metal strip. In still yet another embodiment of the invention, the base metal is a titanium metal strip. In a further embodiment of the invention, the base metal is a titanium alloy metal strip. In one aspect of these embodiments, the thickness of the aluminum, aluminum alloy, nickel alloy, tin, titanium, or titanium alloy strip is less than about 2540 microns. In another aspect of these embodiments, the thickness of the aluminum, aluminum alloy, nickel alloy, tin, titanium, or titanium alloy strip is less than about 1588 microns. In yet another aspect of these embodiments, the thickness of the aluminum, aluminum alloy, nickel alloy, tin, titanium, or titanium alloy strip is less than about 1270 microns. In still another aspect of these embodiments, the thickness of the aluminum, aluminum alloy, nickel alloy, tin, titanium, or titanium alloy strip is up to about 762 microns. In a further aspect of these embodiments, the thickness of the aluminum, aluminum alloy, nickel alloy, tin, titanium, or titanium alloy strip is about 127–762 microns. In yet a further aspect of these embodiments, the thickness of the aluminum, aluminum alloy, nickel alloy, tin, titanium, or titanium alloy strip is about 240–762 microns. In still a further aspect of these embodiments, the thickness of the aluminum, aluminum alloy, nickel alloy, tin, titanium, or titanium alloy strip is about 381–762 microns. In yet a further embodiment of the invention, the base metal is an aluminum metal plate. In still a further embodiment of the invention, the base metal is a aluminum alloy metal plate. In still yet a further embodiment of the invention, the base metal is a nickel alloy plate. In another embodiment of the invention, the base metal is a tin metal plate. In yet another embodiment of the invention, the base metal is a titanium metal plate. In still another embodiment of the invention, the base metal is a titanium alloy metal plate.

In accordance with a yet further aspect of the invention, the base metal is pretreated prior to applying the metal alloy to the base metal. The pretreatment of the base metal is designed to remove dirt, oil, adhesives, plastic, paper and/or other foreign substances from the surface of the base metal; to remove oxides and other compounds from the base metal surface; etch the base metal surface; and/or improve the bonding of the metal alloy coating to the surface of the base metal. The pretreatment process may include one or more process steps depending on the surface condition of the base metal. In one embodiment of the invention, the various steps of the pretreatment process for the base metal are similar to the pretreatment process disclosed in U.S. Pat. No. 5,395,702, which is incorporated herein. In another embodiment of the invention, the pretreatment process includes, but is not limited to, an abrasion process; an absorbent process; solvent and/or cleaning solution process; a low oxygen environment process; a rinse process; a pickling process; a chemical activation process; a flux treating process; and/or an intermediate barrier metal layer coating process. In one aspect of this embodiment, each of these pretreatment process can be use singly or in combination with one another. The type and/or number of pretreatment process used generally depends on the type of base metal and/or condition of the base metal surface. The pretreatment process can be applied to a portion of the base metal surface or the complete surface of the base metal.

The abrasion process, absorbent process and/or solvent or cleaning process are designed to remove foreign materials and/or oxides from the base metal surface. In one embodiment of the invention, the abrasion process includes, but is not limited to, the use of brushes, scrappers and the like to mechanically remove oxides and/or foreign material from the surface of the base metal. In another embodiment of the invention, the absorbent process includes, but is not limited to, the use of absorbing materials (i.e. towels, absorbent paper products, sponges, squeegees, etc.) to mechanically remove oxides and/or foreign material from the surface of the base metal. In still another embodiment of the invention, the solvent or cleaning process includes, but is not limited to, the use of water, detergents, abrasives, chemical solvents, and/or chemical cleaners to remove oxides and/or foreign material from the surface of the base metal. The abrasion process, absorbent process, and/or solvent or cleaning process can be use individually or in conjunction with one another to remove foreign materials and/or oxides from the base metal surface.

The low oxygen environment process is designed to inhibit the formation and/or reformation of oxides on the surface of the base metal. The low oxygen environment may take on several forms such as, but not limited to, a low oxygen-containing gas environment and/or a low oxygen-containing liquid environment. Examples of gases used in the low oxygen-containing gas environments include, but are not limited to, nitrogen, hydrocarbons, hydrogen, noble gasses and/or other non-oxidizing gasses. The one or more gases partially or totally shield oxygen and/or other oxidizing elements or compounds from the base metal. In one embodiment of the invention, the low oxygen-containing gas environment includes nitrogen. Examples of liquids used in the low oxygen-containing liquid environment include, but are not limited to, non-oxidizing liquids and/or liquids containing a low dissolved oxygen content. The liquids partially or totally shield oxygen and/or other oxidizing elements or compounds from the base metal. In another embodiment of the invention, the low oxygen-containing liquid environment includes heated water that is at least about 37–49° C. (100–110° F.). In still another embodiment of the invention, the low oxygen-containing environment is applied to the base metal by spraying the low oxygen-containing environment onto the surface of the base metal, partially or totally immersing the base metal in the low oxygen-containing environment, and/or encasing the base metal in the low oxygen-containing environment. In still yet another embodiment of the invention, agitators are used in the low oxygen-containing liquid environment to facilitate in the removal of oxides and/or inhibit oxide formation on the base metal. The agitators can include brushes which contact the base metal.

The rinsed process is designed to remove foreign materials, oxides, pickling solution, deoxidizing agent, fluxes, solvents, and/or cleaning solutions from the surface of the base metal. In one embodiment of the invention, the rinse process includes the use of a rinse solution that includes a low or non-oxidizing liquid. In one aspect of this embodiment, the low or non-oxidizing liquid includes water that is at least about 21° C. (70° F). In another embodiment of the invention, the rinse solution can be applied to the surface of the metal strip by spraying the rinse solution onto the metal strip and/or partially or totally immersing the metal strip in the rinse solution. In yet another embodiment of the invention, the rinse solution is agitated to facilitate in the cleaning of the base metal surface. In still another embodiment of the invention, the rinse solution is recirculated, diluted and/or the temperature is maintained during the rinsing process.

The pickling process is designed to remove a very thin surface layer from the base metal. The removal of the thin layer from the base metal results in the partial or total removal of oxides and/or other foreign matter from the base metal surface. The removal of the thin surface layer from the base metal causes a slight etching of the base metal surface which results in the formation of microscopic valleys on the base metal surface. These microscopic valleys increase the surface area to which the metal alloy and/or intermediate barrier metal layer can bond thereby facilitating in the formation of a stronger bond between the base metal and the metal alloy and/or intermetallic barrier metal layer. The pickling process includes the use of a pickling solution which can be an acidic or a basic solution. In one embodiment of the invention, the pickling solution is an acidic solution. The acid can be an organic acid, an inorganic acid, or combinations thereof. In one aspect of this embodiment, the inorganic acid used in the pickling solution includes, but are not limited to, hydrobromic acid, hydroiodic acid, choleic acid, perchloric acid, hydrofluoric acid, sulfuric acid, nitric acid, hydrochloric acid, phosphoric acid, and/or isobromic acid. In another aspect of this embodiment, the organic acid used in the pickling solution includes, but are not limited to, formic acid, propionic acid, butyric acid, and/or isobutyric acid. In another embodiment of the invention, the pickling solution includes a single acid. Most base metal surfaces can be satisfactorily cleaned or pickled with the use of a single acid. In one aspect of this embodiment, the pickling solution only includes an inorganic acid. In still another embodiment of the invention, the pickling solution includes two or more acids. Some base metals are more difficult to clean or pickle. Stainless steel, as with other metals, is known to have surface oxides that are difficult to remove. When coating stainless steel, it is very desirable to activate (i.e. remove surface oxides) the stainless steel surface so as to form a strong bond and to uniformly coat the stainless steel base metal. The chromium in the stainless steel surface reacts with atmospheric oxygen to form a chromium oxide film on the surface of the stainless steel. The chromium oxide film creates an almost impenetrable barrier which protects the iron in the stainless steel from oxidizing. The chromium oxide film also forms a very tight and strong bond with the stainless steel, thus is not easily removable. Although the formation of the chromium oxide film is important in the corrosion-resistant properties of the stainless steel and is intended for commercial stainless steel, the chromium oxide film can interfere with the bonding of the metal alloy coating to the stainless steel surface, thereby resulting in a weaker bond with the metal alloy coating, thus resulting in flaking of the metal alloy coating. The surface activation of the stainless steel, as with other base metals, is accomplished by removing the oxides on the surface of the base metal. The removal of the chromium oxide film from the stainless steel surface activates the stainless steel surface. Testing of coated stainless steel has revealed that the removal of chromium oxide film improves the bonding of the metal alloy coating and allows for thick and/or uniform metal alloy coatings to be formed. Oxide removal on other base metals also improves the bonding, coating uniformity and/or coating thickness of the metal alloy coating. Pickling solutions that include two or more acids typically can provide a more rapid oxide removal rate. As can be appreciated, the use of a pickling solution that includes two or more acids is not limited to use on stainless steel or other base metals wherein oxide removal is difficult, but can be used on base metals to increase the rate of cleaning or pickling thereby reducing time for the pickling process. In one aspect of this embodiment, the pickling solution contains a combination of hydrochloric acid and nitric acid. One specific formulation of this dual acid pickling solution is a pickling solution including about 5–25% by volume hydrochloric acid and about 1–15% by volume nitric acid. A more specific formulation of this dual acid pickling solution is a pickling solution including about 5–15% by volume hydrochloric acid and about 1–5% by volume nitric acid. A yet more specific formulation of this dual acid pickling solution is a pickling solution including about 10% by volume hydrochloric acid and about 3% by volume nitric acid. In yet another embodiment of the invention, the temperature of the pickling solution is maintained to obtain the desired activity of the pickling solution. In one aspect of this embodiment, the pickling solution is maintained at a temperature of above about 26° C. In another aspect of this embodiment, the pickling solution is maintained at a temperature of about 48–60° C. In yet another aspect of this embodiment, the pickling solution is maintained at a temperature of about 53–56° C. Higher acid concentrations and/or higher acid temperatures will typically increase the activity and aggressiveness of the pickling solution. In yet another embodiment of the invention, the pickling solution is agitated to prevent or inhibit the pickling solution from stagnating, varying in concentration, varying in temperature, and/or to remove gas pockets which form on the base metal surface. In one aspect of this embodiment, the pickling solution is at least partially agitated by placing agitators in a pickling tank and/or by recirculating the pickling solution in a pickling tank. Typically, agitation brushes in the pickling tank contact the base metal as it passes through the pickling tank to facilitate in oxide removal and cleaning of the base metal surface. In another embodiment of the invention, the base metal is exposed to the pickling solution for a sufficient time to properly clean and/or pickle the surface of the base metal. In one aspect of this embodiment, the total time for pickling the base metal is less than about 10 minutes. In another aspect of this embodiment, the total time for pickling the base metal is less than about two minutes. In still another aspect of this embodiment, the total time for pickling the base metal is less than about one minute. In still yet another aspect of this embodiment, the total time for pickling the base metal is about 5–60 seconds. In a further aspect of this embodiment, the total time for pickling the base metal is about 10–20 seconds. In still another embodiment, the pickling solution is applied to the base metal by spray jets. In yet another embodiment, the base metal is partially or fully immersed in the pickling solution contained in a pickling tank.

The chemical activation process is designed to remove oxides and/or foreign material from the base metal surface. In one embodiment of the invention, the chemical activation process includes the subjecting of the base metal surface to a deoxidizing agent. Various types of deoxidizing agents may be used. In another embodiment of the invention, the deoxidizing agent includes zinc chloride. In one aspect of this embodiment, the deoxidizing agent includes at least about 1% by volume zinc chloride. In another aspect of this embodiment, the deoxidizing agent includes at least about 5% by volume zinc chloride. The zinc chloride removes oxides and foreign materials from the base metal surface and/or provides a protective coating which inhibits oxide formation on the base metal surface. In still another embodiment of the invention, the temperature of the zinc chloride solution is at least about ambient temperature (about 15–32° C). In yet another embodiment, the deoxidizing solution is agitated to maintain a uniform solution concentration and/or temperature. In one aspect of this embodiment, the agitators include brushes which contact the base metal. In still yet another embodiment of the invention, small amounts of acid are added to the deoxidizing solution to enhance oxide removal. In one aspect of this embodiment, hydrochloric acid is added to the deoxidizing solution. In this aspect, one formulation of the deoxidizing solution includes about 1–50% by volume zinc chloride and about 0.5–15% by volume hydrochloric acid. In this aspect, another formulation of the deoxidizing solution includes about 5–50% by volume zinc chloride and about 1–15% by volume hydrochloric acid. In a further embodiment of the invention, the base metal is subjected to the deoxidizing solution for less than about 10 minutes. In one aspect of this embodiment, the base metal is subjected to the deoxidizing solution for up to about one minute. In still a further embodiment, the deoxidizing solution is applied to the base metal by spray jets. In yet a further embodiment, the base metal is partially or fully immersed in the deoxidizing solution contained in a deoxidizing tank.

The intermediate barrier metal process is designed to coat one or more surface areas of the base metal with a thin metal coating. The intermediate metal barrier is applied to part of or the complete surface of the base metal by a plating process, a plating and subsequent flow heating process, a metal spraying process, a coating roller process, and/or an immersion process in molten metal prior to applying the metal alloy coating to the base metal surface. The intermediate barrier metal typically provides additional corrosion resistance to the base metal in many types of corrosive environments. In marine environments where the coated base metal is exposed to salt and/or halogens (i.e. chlorine, fluorine, etc.), the use of an intermediate barrier metal can significantly extend the life of the coated base metal. The use of an intermediate barrier metal can also enhance the bonding of the metal alloy coating to the base metal. Some base metals such as, but not limited to, stainless steel form a weaker bond with certain formulations of the metal alloy. The application of an intermediate barrier metal on part of or the complete surface of the base metal can, in many instances, improve the strength of the bond of the metal alloy coating to the base metal. The intermediate barrier metal is typically tin, nickel, copper, and/or chromium. Other metals can be used for the intermediate barrier metal, such as, but not limited to, aluminum, cobalt, molybdenum, Sn—Ni, Fe—Ni, and/or zinc. Typically, one intermediate barrier metal is formed on the surface of the base metal; however, more than one layer of one or more barrier metals can be applied to the surface of the base metal to form a thicker intermediate barrier metal layer, alter the composition of the intermediate barrier metal layer, alter the composition of the heat created intermetallic layer if formed, and/or improve the bonding of the metal alloy coating to the intermediate barrier metal layer and/or base metal. In one embodiment of the invention, the intermediate barrier metal includes nickel. Typically, the nickel is flashed or plated to the base metal surface. The nickel including intermediate barrier metal layer improves corrosion-resistance of the base metal and/or metal alloy, especially against halogen containing compounds which can penetrate the metal alloy coating and attack and oxidize the surface of the base metal, thereby weakening the bond between the base metal and the metal alloy coating. The nickel including intermediate barrier metal layer has also been found to provide a formidable barrier to alcohols and/or various type of petroleum products. The metal alloy coating and nickel including intermediate barrier metal effectively complement one another to provide superior corrosion resistance. An intermediate barrier metal layer which includes nickel also improves the bonding of the metal alloy coating to the base metal. The bond between the metal alloy coating and the nickel layer is surprisingly strong and durable, thereby inhibiting the metal alloy coating from flaking. An intermediate barrier metal layer which includes nickel also inhibits the formation of a thick zinc layer in the intermetallic layer, when zinc is included in the metal alloy. In another embodiment of the invention, the intermediate barrier metal includes tin, chromium and/or copper. An intermediate barrier metal layer which includes tin, chromium and/or copper improves the bonding of the metal alloy coating to the base metal. The tin, chromium and/or copper in the intermediate barrier metal also has been found to inhibit adverse zinc intermetallic layer growth from the zinc in a zinc containing metal alloy. A thick zinc layer can cause poor coating quality or cracking of the coating during forming and bending of a coated material, thereby giving rise to localized corrosion, and/or adversely affecting performance of the coated strip in particular applications. When copper is included in the intermediate barrier metal, the copper is typically plated onto the surface of the base metal. The plated copper layer can be, but is not limited to being formed by passing the base metal through an electroplating process or by adding copper sulfate to a pickling solution and pickling the coated base metal. A copper containing intermediate barrier metal layer also enhances the corrosion-resistant properties of the heat created intermetallic layer, improves the bonding of the metal alloy to the base metal, and/or improves the corrosion resistance of the metal alloy and/or base metal. When tin is included in the intermediate barrier metal, the tin is typically coated onto the base metal by immersion in molten metal, plating and/or metal spraying. A tin containing intermediate barrier metal advantageously changes the composition of the heat created intermetallic layer to form a highly corrosion-resistant heat created intermetallic layer, improves the bonding of the metal alloy to the base metal, and/or improves the corrosion-resistance of the metal alloy and/or base metal. When chromium is included in the intermediate barrier metal, the chromium is typically plated onto the surface of the base metal. A chromium containing intermediate barrier metal layer advantageously changes the composition of the heat created intermetallic layer to form a highly corrosion-resistant heat created intermetallic layer, improves the bonding of the metal alloy, and/or improves the corrosion resistance of the metal alloy and/or base metal. In still another embodiment of the invention, the intermediate barrier metal includes aluminum, cobalt, molybdenum, Sn—Ni, Fe—Ni, and/or zinc. The aluminum, cobalt, molybdenum, Sn—Ni, Fe—Ni, and/or zinc are typically plated onto the base metal by a plating process. An intermediate barrier metal layer which includes aluminum, cobalt, molybdenum, Sn—Ni, Fe—Ni, and/or zinc improves the bonding of the corrosion resistant metal alloy coating to the base metal, enhances the corrosion-resistant properties of the heat created intermetallic layer, and/or improves the corrosion-resistance of the metal alloy and/or base metal. In yet another embodiment of the invention, the thickness of the intermediate barrier metal layer is at least about 0.3 micron. In one aspect of this embodiment, the thickness of the intermediate barrier metal layer is at least about 1 micron. In another aspect of this embodiment, the thickness of the intermediate barrier metal layer is less than about 500 microns. In yet another aspect of this embodiment, the thickness of the intermediate barrier metal layer is less than about 250 microns. In still another specific aspect of this embodiment, the thickness of the intermediate barrier metal layer is less than about 50 microns. In still yet another aspect of this embodiment, the thickness of the intermediate barrier metal layer is less than about 20 microns. In a further aspect of this embodiment, the thickness of the intermediate barrier metal layer is about 1–10 microns. In yet a further aspect of this embodiment, the thickness of the intermediate barrier metal layer is about 1–3 microns. In accordance with still yet another embodiment of the invention, the intermediate barrier metal layer is pre-heated and/or flow heated prior to applying the metal alloy coating to the base metal. The heating of the intermediate barrier metal layer to a sufficient temperature for a sufficient amount of time causes a heat created intermetallic layer to form between the intermediate barrier metal layer and the base metal. A heat created intermetallic layer is formed without the use of a subsequent heating step when the intermediate barrier metal is applied to the base metal by a metal spraying process, a coating roller process, and/or an immersion process. The temperature of the intermediate barrier metal in the molten state causes a heat created intermetallic layer to form between the intermediate barrier metal and the base metal when the molten intermediate barrier metal contacts the surface of the base metal. When the intermediate barrier metal is applied by a plating or pickling process, a subsequent heating step is needed to form the heat created intermetallic layer between the intermediate barrier metal and the base metal. A "heat created intermetallic layer" is defined herein as a metal layer formed by heat wherein the metal layer is a mixture of at least the primary surface components of the base metal and one or more components of a coated metal layer (i.e. intermediate barrier metal and/or metal alloy coating). The application of heat to the base metal and a coated metal layer causes the surface of the base metal to soften and/or melt and to combine with a portion of the soften or melted coated metal layer. In many instances, the formation of a heat created intermetallic layer results in improved bonding of the coated metal to the base metal, and/or improves the corrosion-resistance of the base metal and/or coated metal layer. In one aspect of this embodiment, the thickness of the heat created intermetallic layer formed between the base metal and the intermediate barrier metal is at least about 0.1 micron. In another aspect of this embodiment, the thickness of the heat created inter-metallic layer formed between the base metal and the intermediate barrier metal is at least about 0.3 micron. In still another aspect of this embodiment, the thickness of the heat created intermetallic layer formed between the base metal and the intermediate barrier metal is at least about 0.5 micron. In still another aspect of this embodiment, the thickness of the heat created intermetallic layer formed between the base metal and the intermediate barrier metal is at least about 1 micron. In yet another aspect of this embodiment, the thickness of the heat created intermetallic layer formed between the base metal and the intermediate barrier metal is less than about 100 microns. In still yet another aspect of this embodiment, the thickness of the heat created intermetallic layer formed between the base metal and the intermediate barrier metal is less than about 50 microns. In a further aspect of this embodiment, the thickness of the heat created intermetallic layer formed between the base metal and the intermediate barrier metal is less than about 25 microns. In yet a further aspect of this embodiment, the thickness of the heat created intermetallic layer formed between the base metal and the intermediate barrier metal is less than about 20 microns. In still a further aspect of this embodiment, the thickness of the heat created intermetallic layer formed between the base metal and the intermediate barrier metal is less than about 10 microns. In still yet a further aspect of this embodiment, the thickness of the heat created intermetallic layer formed between the base metal and the intermediate barrier metal is about 1–10 microns. In still yet a further aspect of this embodiment, the thickness of the heat created intermetallic layer formed between the base metal and the intermediate barrier metal is about 1–5 microns. In still yet even a further aspect of this embodiment, the thickness of the heat created intermetallic layer formed between the base metal and the intermediate barrier metal is about 1–3 microns. Typically the formation of a heat created intermetallic layer takes at least a couple seconds to form. In one embodiment of the present invention, the base metal is exposed to heat for at least about 2 seconds to form the heat created intermetallic layer between the base metal and the intermediate barrier metal. The time period of heat exposure for an intermediate barrier metal layer applied by a plating and/or a pickling process is the time the intermediate barrier metal is exposed to heat after the plating and/or pickling process. The time period for heat exposure for an intermediate barrier metal layer applied by metal spraying, coating rollers, and/or immersion in molten metal includes the time of applying the intermediate barrier metal to the base metal and the time the intermediate barrier metal is exposed to heat after the metal spraying, coating rollers, and/or immersion in molten metal process. Typically, the time of total heat exposure is less than about four hours; however, greater heat exposure times can be used. In one aspect of this embodiment, the total time period of heat exposure to an intermediate barrier metal layer applied to the base metal to form an intermetallic layer between the base metal and the intermediate barrier metal layer is less than about 20 minutes. In another aspect of this embodiment, the total time period of heat exposure to an intermediate barrier metal layer applied to the base metal to form an intermetallic layer between the base metal and the intermediate barrier metal layer is less than about 10 minutes. In yet another aspect of this embodiment, the total time period of heat exposure to an intermediate barrier metal layer applied to the base metal to form an intermetallic layer between the base metal and the intermediate barrier metal layer is less than about 5 minutes. In still another aspect of this embodiment, the total time period of heat exposure to an intermediate barrier metal layer applied to the base metal to form an intermetallic layer between the base metal and the intermediate barrier metal layer is about 0.033–2 minutes. When heat is applied to the coated base metal to form or further form the heat created intermetallic layer between the base metal and intermediate metal barrier layer, the heat typically is applied by, but not limited to, an oven and/or furnace, induction heating coils, lasers, heat exchanger, and/or radiation. As can be appreciated, the flow heating of the plated intermediated barrier layer can also function as a pre-heat process for the base metal. Alternatively or additionally, the heat can be supplied by coating the base metal and the intermediated metal barrier layer with a metal alloy by a hot-dip process. The heat from the hot-dip process causes the formation of the heat created intermetallic layer. In still another embodiment of the invention, the application of the intermediate barrier metal layer on the surface of the base metal is a partial or complete pretreatment process for the surface of the base metal prior to applying the metal alloy coating to the base metal. The application of the an intermediate barrier metal to the surface of the base metal forms a clean metal surface on the base metal surface. Due to this clean metal surface, the application of the an intermediate barrier metal to the surface of the base metal can function as the sole pretreatment process for the surface of the base metal. As can be appreciated, the surface of the base metal can be pretreated with other pretreatment process prior to applying the intermediate barrier metal layer and/or pretreated with other pretreatment process subsequent to applying the intermediate barrier metal layer.

In accordance with another aspect of the invention, metal alloy coating is coated on the base metal by a plating process or by a hot dip process. The coating process for the metal alloy coating can be by a batch or continuous process. As defined herein, a "hot dip process" for the metal alloy is any process that coats the metal alloy coating on the base metal and causes the formation of a heat created intermetallic layer between the base metal and the metal alloy coating. Examples of a hot dip process include, but are not limited to, 1) plating a metal alloy coating partially or totally on the base metal and subsequently heating the plated layer until a heat created intermetallic layer forms between the plated layer and the base metal, 2) plating a metal alloy partially or totally on the base metal and subsequent partial or total immersion of the base metal in a molten bath of metal alloy for a sufficient period of time to partially or totally coat the base metal and to form a heat created intermetallic layer between the coated metal alloy layer and the base metal, 3) plating a metal alloy partially or totally on the base metal and subsequent spray coating molten metal alloy onto the base metal to partially or totally coat the base metal wherein the base metal is spray coated for a sufficient period of time to form a heat created intermetallic layer between the coated metal layer and base metal, 4) plating a metal alloy partially or totally on the base metal and subsequent partial or total immersion of the base metal in a molten bath of metal alloy and spray coating molten metal alloy onto the base metal to partially or totally coat the base metal wherein the base metal is spray coated and immersed for a sufficient period of time to form a heat created intermetallic layer between the coated metal layer and base metal, 5) partial or total immersion of the base metal in a molten bath of metal alloy for a sufficient period of time to partially or totally coat the base metal and to form a heat created intermetallic layer between the coated metal layer and the base metal, 6) partial or total immersion of the base metal in a molten bath of metal alloy for a sufficient period of time to partially or totally coat the base metal and spray coating molten metal alloy onto the base metal to partially or totally coat the base metal wherein the base metal is immersed and sprayed for a sufficient period of time to form a heat created intermetallic layer between the coated metal layer and base metal, 7) spray coating the base metal with molten metal alloy to partially or totally coat the base metal for a sufficient period of time to form a heat created intermetallic layer between the coated metal layer and the base metal, 8) plating and subsequent heating and subsequent immersion in molten metal alloy coating and/or spray coating molten metal alloy coating for a sufficient period of time to form a heat created intermetallic layer between the coated metal layer and the base metal, 9) plating and subsequent heating and subsequent immersion in molten metal alloy coating and/or spray coating molten metal alloy coating and subsequent heating after immersion in molten metal alloy coating and/or spray coating molten metal alloy coating for a sufficient period of time to form a heat created intermetallic layer between the coated metal layer and the base metal, 10) immersion in molten metal alloy coating and subsequent heating for a sufficient period of time to form a heat created intermetallic layer between the coated metal layer and the base metal, 11) immersion in molten metal alloy coating and spray coating molten metal alloy coating and subsequent heating after immersion and spray coating for a sufficient period of time to form a heat created intermetallic layer between the coated metal layer and the base metal, 12) spray coating molten metal alloy coating and subsequent heating after spray coating for a sufficient period of time to form a heat created intermetallic layer between the coated metal layer and the base metal, 13) coating molten metal alloy by coating rollers for a sufficient period of time to form a heat created intermetallic layer between the coated metal layer and the base metal, 14) coating molten metal alloy by coating rollers and spray coating for a sufficient period of time to form a heat created intermetallic layer between the coated metal layer and the base metal, 15) immersion in molten metal alloy and coating molten metal alloy by coating rollers for a sufficient period of time to form a heat created intermetallic layer between the coated metal layer and the base metal, 16) plating and coating molten metal alloy by coating rollers for a sufficient period of time to form a heat created intermetallic layer between the coated metal layer and the base metal, and/or 17) coating molten metal alloy by coating rollers and subsequent heating for a sufficient period of time to form a heat created intermetallic layer between the coated metal layer and the base metal. As can be appreciated, many other hot dip coating combinations can be used. As further can be appreciated, the base metal can be coated multiple of times by various types of coated processes. When heat is subsequently applied to the coated base metal to form or further form the heat created intermetallic layer between the base metal and the metal alloy coating, the heat typically is applied to, but not limited to, an oven and/or furnace, induction heating coils, lasers, a heat exchanger, and/or radiation. In one embodiment of the invention, the thickness of the heat created intermetallic layer is at least about 0.3 micron. In one aspect of this embodiment, the thickness of the heat created intermetallic layer formed between the base metal and the metal alloy coating is at least about 1 micron. In yet another aspect of this embodiment, the thickness of the heat created intermetallic layer formed between the base metal and the metal alloy coating is less than about 100 microns. In still yet another aspect of this embodiment, the thickness of the heat created intermetallic layer formed between the base metal and the metal alloy coating is less than about 50 microns. In a further aspect of this embodiment, the thickness of the heat created intermetallic layer formed between the base metal and the metal alloy coating is less than about 25 microns. In yet a further aspect of this embodiment, the thickness of the heat created intermetallic layer formed between the base metal and the metal alloy coating is less than about 20 microns. In still a further aspect of this embodiment, the thickness of the heat created intermetallic layer formed between the base metal and the metal alloy coating is less than about 10 microns. In still yet a further aspect of this embodiment, the thickness of the heat created intermetallic layer formed between the base metal and the metal alloy coating is about 1–5 microns. In still yet even a further aspect of this embodiment, the thickness of the heat created intermetallic layer formed between the base metal and the metal alloy coating is about 1–3 microns. Typically, the formation of a heat created intermetallic layer takes at least a couple seconds to form. In one embodiment of the invention, the base metal is exposed to heat for at least 2 seconds to form the heat created intermetallic layer between the base metal and the metal alloy coating. The time period of heat exposure of a metal alloy coating layer applied by a plating process is the time the metal alloy coating is exposed to heat after the plating process. The time period for heat exposure for a metal alloy coating layer applied by metal spraying, coating rollers and/or immersion in molten metal includes the time of applying the metal alloy coating to the base metal and the time the metal alloy coating is exposed to heat after the metal spraying, coating rollers, and/or immersion in molten metal process. In one aspect of this embodiment, the total time period of heat exposure to a metal alloy coating layer applied to the base metal to form an intermetallic layer between the base metal and the metal alloy coating layer is less than about 3 hours. In another aspect of this embodiment, the total time period of heat exposure to a metal alloy coating layer applied to the base metal to form an intermetallic layer between the base metal and the metal alloy coating layer is less than about 4 hours. In still another aspect of this embodiment, the total time period of heat exposure to a metal alloy coating layer applied to the base metal to form an intermetallic layer between the base metal and the metal alloy coating layer is less than about 2 hours. In yet another aspect of this embodiment, the total time period of heat exposure to a metal alloy coating layer applied to the base metal to form an intermetallic layer between the base metal and the metal alloy coating layer is less than about 1 hour. In still yet another aspect of this embodiment, the total time period of heat exposure to a metal alloy coating layer applied to the base metal to form an intermetallic layer between the base metal and the metal alloy coating layer is less than about 30 minutes. In a further aspect of this embodiment, the total time period of heat exposure to a metal alloy coating layer applied to the base metal to form an intermetallic layer between the base metal and the metal alloy coating layer is less than about 20 minutes. In yet further aspect of this embodiment, the total time period of heat exposure to a metal alloy coating layer applied to the base metal to form an intermetallic layer between the base metal and the metal alloy coating layer is less than about 10 minutes. In still a further another aspect of this embodiment, the total time period of heat exposure to a metal alloy coating layer applied to the base metal to form an intermetallic layer between the base metal and the metal alloy coating layer is less than about 5 minutes. In still yet further aspect of this embodiment, the total time period of heat exposure to a metal alloy coating layer applied to the base metal to form an intermetallic layer between the base metal and the metal alloy coating layer is about 0.033–2 minutes. In still a further aspect of this embodiment, the total time period of heat exposure to a metal alloy coating layer applied to the base metal to form an intermetallic layer between the base metal and the metal alloy coating layer is about 0.033–0.5 minutes. In yet a further aspect of this embodiment, the total time period of heat exposure to a metal alloy coating layer applied to the base metal to form an intermetallic layer between the base metal and the metal alloy coating layer is about 0.083–0.5 minutes.

The metal alloy coating formed on the surface of the base metal by a batch coating process or by a continuous coating process can result in different types of coatings. These differences can include, but are not limited to, the following:

a) Uniformity of coating (weight and thickness)
b) Surface appearance
c) Smoothness
d) Texture control
e) Control of intermetallic phases (growth and uniformity)

A base metal coated in a continuous coating process typically produces a coated base metal having superior uniformity of coating (weight and thickness), superior metallographic structure, superior surface appearance, superior smoothness, superior spangle size, and fewer surface defects. Furthermore, the composition of the heat created intermetallic layer is typically superior as compared to a base metal coated in a batch coating process. In addition to surface appearance and uniformity of thickness, the formability of the coated base metal is generally better due to a more uniform coating thickness on the surface of the base metal. In general, thicker coatings provide greater corrosion protection, whereas thinner coatings tend to give better formability and weldability. Thinner coatings with uniformity of thickness can be better formed by a continuous coating process.

In still another aspect of the invention, the metal alloy coating is applied to the surface of the base metal, the surface of the intermediate barrier metal layer, and/or an existing metal alloy coating by a plating process. When a plating process is used, a heat created intermetallic layer is not formed between the metal alloy coating and the surface of the base metal, the surface of the intermediate barrier metal layer, and/or a previously applied metal alloy coating. Typically, the plating process is carried out by standard plating processes, thus a detailed description of a plating process is not described herein. The complete or partial surface of the base metal, the surface of the intermediate barrier metal layer, and/or surface of a previously applied metal alloy can be coated by the plating process. The plating of the components of the corrosion resistant metal alloy can be accomplished at the same time or in subsequent steps. For instance, a corrosion resistant tin metal alloy which includes lead can be plated by a) simultaneously plating the tin and lead onto the surface of the base metal, the surface of the intermediate barrier metal layer, and/or metal alloy coating, b) first plating the tin on the surface of the base metal, the surface of the intermediate barrier metal layer and/or metal alloy coating, and subsequently plating the lead on the surface of the base metal, the surface of the intermediate barrier metal layer, and/or metal alloy coating, or c) first plating the lead on the surface of the base metal, the surface of the intermediate barrier metal layer, and/or metal alloy coating, and subsequently plating the tin on the surface of the base metal, the surface of the intermediate barrier metal layer, and/or metal alloy coating. Similarly, a corrosion resistant tin and zinc metal alloy which includes antimony can be plated by a) simultaneously plating the tin, zinc and antimony onto the surface of the base metal, the surface of the intermediate barrier metal layer, and/or metal alloy coating, b) first plating the tin on the surface of the base metal, the surface of the intermediate barrier metal layer, and/or metal alloy coating, then plating the zinc on the surface of the base metal, the surface of the intermediate barrier metal layer, and/or metal alloy coating, and subsequently plating the antimony on the surface of the base metal, the surface of the intermediate barrier metal layer, and/or metal alloy coating, c) first plating the zinc on the surface of the base metal, the surface of the intermediate barrier metal layer, and/or metal alloy coating, then plating the tin on the surface of the base metal, the surface of the intermediate barrier metal layer, and/or metal alloy coating, and subsequently plating the antimony on the surface of the base metal, the surface of the intermediate barrier metal layer, and/or metal alloy coating, d) first plating the antimony on the surface of the base metal, the surface of the intermediate barrier metal layer, and/or metal alloy coating, and subsequently simultaneously plating tin and zinc on the surface of the base metal, the surface of the intermediate barrier metal layer, and/or metal alloy coating, etc. In one embodiment of the invention, a tin metal alloy is plated on the surface of the base metal. In one specific aspect of this embodiment, the plating process includes the plating of tin in an electrolytic solution containing stannous tin and an acid. In another embodiment of the invention, a tin and zinc metal alloy is plated on the surface of the base metal. In one specific aspect of this embodiment, the plating process includes the plating of tin and zinc in an electrolytic solution containing stannous tin, zinc and an acid.

In yet another aspect of the invention, the metal alloy coating is applied to the surface of the base metal, the surface of the intermediate barrier metal layer, and/or previously applied metal alloy coating by a hot dip process that includes plating and subsequent heating of the plated metal alloy. The metal alloy is plated onto the surface of the base metal, the surface of the intermediate barrier metal layer, and/or a previously applied metal alloy coating by a plating process that is the same as or similar to the plating process described above. After the metal alloy is plated onto the surface of the base metal, the surface of the intermediate barrier metal layer, and/or previously applied metal alloy coating, the plated metal alloy coating is subjected to heat for a sufficient period of time to form a heat created intermetallic layer between the plated metal alloy coating and the surface of the base metal, the surface of the intermediate barrier metal layer, and/or the surface of the previously applied metal alloy coating. If one or more of the components of the corrosion resistant metal alloy coating are plated by a separate plating process, the plated metal components of the metal alloy coating can be subjected to heat after one or more of the plating processes, or after all the components of the metal alloy coating have been coated onto the surface of the base metal, the surface of the intermediate barrier metal layer, and/or the surface of the previously applied metal alloy coating. The heating of the plated metal alloy coating causes at least a portion of the alloy to enter a molten state and to form an at least partially uniform and substantially level coating layer. The heating of the plated metal alloy coating also facilitates in the reduction and/or elimination of pin holes in the metal alloy coating which may have formed during the plating process. The time period selected for flow heating the plated metal alloy coating depends on the time necessary to soften and/or melt the desired amount of tin in the tin metal alloy coating or tin and zinc in the tin and zinc metal alloy coating to form the desired thickness of the heat created intermetallic layer. When one or more of the components of the corrosion resistant metal alloy coating are plated by a separate plating process, the plated metal components of the metal alloy coating are subjected to heat for a sufficient period of time to at least partially alloy together the components of the metal alloy coating. The heating process for the plate metal alloy can be by a batch or by a continuous process. In one embodiment of the invention, the plated metal alloy coating is exposed to heat by the application of another molten metal alloy coating onto the surface of the plated metal alloy coating. The heat of the molten metal alloy upon contact with the plated metal alloy causes the components of the plated metal alloy coating to at least partially alloy together and/or form the desired thickness of the heat created intermetallic layer between the plated metal alloy coating and the surface of the base metal, the surface of the intermediate barrier metal layer, and/or the surface of the previously applied metal alloy coating. In one aspect of this embodiment, a molten metal alloy is applied by immersion onto the surface of the plated metal alloy coating. In another aspect of this embodiment, a molten metal alloy is applied by coating rollers is coated onto the surface of the plated metal alloy coating. In still another aspect of this embodiment, a molten metal alloy is applied by spray coating is coated onto the surface of the plated metal alloy coating. In another embodiment of the invention, the plated metal alloy coating is exposed to an external heat source for a time period and temperature sufficient to at least partially alloy together the components of the plated metal alloy coating and/or to form the desired thickness of the heat created intermetallic layer between the plated metal alloy coating and the surface of the base metal, the surface of the intermediate barrier metal layer, and/or the surface of the previously applied metal alloy coating. The plated metal alloy coating is typically exposed to heat through the use of a convection oven, a furnace, heated fluids, flames, induction heating, lasers, hot gasses, radiation, and the like. In one aspect of this embodiment, the temperature the plated metal alloy is exposed to is at least about 200° C. In another aspect of this embodiment, the temperature the plated metal alloy is exposed to is less than about 2000° C. In still another aspect of this embodiment, the temperature the plated metal alloy is exposed to is less than about 1000° C. In yet another aspect of this embodiment, the temperature the plated metal alloy is exposed to is less than 500° C.

In accordance with still yet another aspect of the invention, the corrosion resistant metal alloy is coated onto the surface of the base metal, the surface of the intermediate barrier metal layer, and/or the surface of the previously applied metal alloy coating by immersion into molten corrosion resistant metal alloy. In one embodiment of the invention, the molten corrosion resistant metal alloy is maintained at a temperature of at least about 232° C. (449° F.). In one aspect of this embodiment, the molten corrosion resistant metal alloy is maintained at a temperature of at least about 2–30° C. above the melting point of the corrosion resistant metal alloy. In another embodiment of the invention, the residence time of the base metal in the molten corrosion resistant alloy is selected to form the desired heat created intermetallic layer between the corrosion resistant alloy metal coating and the surface of the base metal, the surface of the intermediate barrier metal layer, and/or the surface of the previously applied metal alloy coating. In one aspect of this embodiment, the residence time of the base metal in the molten metal alloy is at least about 0.033–0.083 minutes. In another aspect of this embodiment, the residence time of the base metal in the molten metal alloy is less than about 10 minutes. In still another aspect of this embodiment, the residence time of the base metal in the molten metal alloy is less than about two minutes. In yet another aspect of this embodiment, the residence time of the base metal in the molten metal alloy is less than about one minute. In still yet another aspect of this embodiment, the residence time of the base metal in the molten metal alloy is about 0.083–0.5 minutes.

In accordance with another aspect of the invention, the hot dip coating of the base metal by immersion in molten metal alloy includes the use of a flux box. The flux box is designed to receive the base metal prior to the base metal passing into the molten metal alloy. The flux solution in the flux box is formulated to remove residual oxides from the base metal surface to shield the surface of the base metal, the surface of the intermediate barrier metal layer, and/or the surface of the previously applied metal alloy coating from oxygen until the surface of the base metal, the surface of the intermediate barrier metal layer, and/or the surface of the previously applied metal alloy coating base metal is coated with the molten metal alloy, and/or to inhibit the formation of viscous oxides at the point where the base metal enters the molten metal alloy, and/or inhibits dross formation on the base metal. The exposure of the base metal to the flux solution is the last pretreatment process of the base metal prior to being coated by immersion in molten metal alloy. In one embodiment of the invention, the flux box contains a flux solution which has a lower specific gravity than the molten metal alloy, thus the flux solution floats on the surface of the molten alloy. In another embodiment of the invention, the flux solution includes a zinc chloride solution. In one aspect of this embodiment, the flux solution includes ammonium chloride. In another aspect of this embodiment, the flux solution includes about 20–75% by volume zinc chloride. In yet another aspect of this embodiment, the flux solution includes zinc chloride and ammonium chloride. In still yet another aspect of this embodiment, the flux solution includes about 20–75% by volume zinc chloride and up to about 40% by volume ammonium chloride. In a further aspect of this embodiment, the flux solution includes about 30–60% by volume zinc chloride and up to about 1–20% by volume ammonium chloride. In yet a further aspect of this embodiment, the flux solution includes about 50% by volume zinc chloride and about 8% by volume ammonium chloride.

In accordance with still another aspect of the invention, the hot dip process of coating the base metal is by immersion in a molten metal alloy includes a melting pot for heating the molten metal alloy. In one embodiment of the invention, the melting pot is heated by heating coils, heating rods, gas jets, induction heating, lasers, radiation, etc. In one aspect of this embodiment, the melting pot is heated by at least one gas jet directed toward at least one side of the melting pot. In another aspect of this embodiment, heating coils and heating rods are used to heat the metal alloy directly in the melting pot. In still another aspect of this embodiment, gas jets are used heat the molten metal alloy in the melting pot.

In accordance with a further aspect of the invention, the hot dip process of coating the base metal by immersion in molten metal alloy includes the use of a protective material on the surface of the molten metal alloy in the melting pot. The protective material is formulated to at least partially shield the molten metal alloy from the atmosphere thereby preventing or inhibiting oxide formation on the surface of the molten metal alloy, and/or preventing or inhibiting dross formation on the coated base metal as the coated base metal enters and/or exits from the melting pot. In one embodiment of the invention, the protective material has a specific gravity which is less than the specific gravity of the molten metal alloy so that the protective material at least partially floats on the surface of the molten metal alloy. In another embodiment of the invention, the protective material includes an oil. In one aspect of this embodiment, the protective material includes palm oil. When the protective material is palm oil, the melting point of the metal alloy should be below about 344° C., the degrading point of palm oil. For metal alloys having a higher melting point, other oils, fluxes, or other materials and/or special cooling processes for the protective material are employed when a protective material is used. In still another embodiment, the protective material facilitates in forming a smooth and uniform coating on the surface of the base metal.

In accordance with another aspect of the invention, the thickness of the metal alloy coating by immersion in molten metal alloy is at least partially regulated by the residence time of the base metal in the molten metal alloy, the temperature of the molten metal alloy in the melting pot, and/or the speed at which the base metal moves through the molten metal alloy. In one embodiment of the invention, the base metal is maintained at a substantially constant speed through the molten metal alloy. The substantially uniform speed results in a substantially uniform growth of the heat created intermetallic layer between the metal alloy and the base metal, a substantially smooth coating of metal alloy, and/or a substantially constant metal alloy coating thickness. As the base metal passes through the molten metal alloy at a substantially constant speed, the metal alloy adheres to the moving base metal and shears a portion of the metal alloy coating from the moving base metal. The shearing effect results from the viscosity of the molten alloy and the speed of the moving base metal. For a given speed and metal alloy viscosity, a certain thickness of metal alloy will be applied to the base metal over a given time. The shearing effect results in a substantially uniform coating, excellent surface appearance, excellent smoothness, excellent texture control and a substantially uniform heat created intermetallic layer. In another embodiment of the invention, the base metal is coated by moving the base metal through the molten metal alloy in the melting pot at a relatively constant speed of about 1–400 ft/min. In one aspect of this embodiment, the base metal is moved through the molten metal alloy in the melting pot at a relatively constant speed of about 50–250 ft/min.

In accordance with still another aspect of the invention, the corrosion resistant metal alloy is coated onto the surface of the base metal, the surface of the intermediate barrier metal layer, and/or the surface of the previously applied metal alloy coating by a coating roller process. Molten metal alloy on the coating rollers is applied to the surface of the base metal, the surface of the intermediate barrier metal layer, and/or the surface of the previously applied metal alloy coating by a coating roller process as the base metal passes by or between one or more coating rollers. The coating rollers form a smooth and/or uniform metal alloy coating layer on the base metal. The coating rollers press against and coat the surface of the base metal, the surface of the intermediate barrier metal layer, and/or the surface of the previously applied metal alloy coating and fill pin holes or uncoated surfaces on the surface of the base metal, the surface of the intermediate barrier metal layer, and/or the surface of the previously applied metal alloy coating by a coating roller process. The coating rollers also control the thickness of the metal alloy coating on the surface of the base metal, the surface of the intermediate barrier metal layer, and/or the surface of the previously applied metal alloy coating by a coating roller process. In one embodiment of the invention, the coating rollers are used in conjunction with an immersion process and/or metal spray process. In another embodiment, the coating rollers are spaced apart a sufficient distance so that the base metal can pass between the coating rollers. As the base metal basses between one or more sets of coating rollers, the coating rollers maintain a desired coating thickness of the metal alloy on the base metal, remove excess metal alloy from the base metal, and/or coat any non-coated regions on the surface of the base metal. In one aspect of this embodiment, the coating thickness of the metal alloy is selected to ensure that essentially no uncoated regions exist on the surface of the base metal. Typically, the average thickness of the metal alloy on the surface of base metal is at least about 1 micron, and generally at least about 2.5 microns, more generally about 7 to 2550 microns, and even more generally about 7–1270 microns. In another aspect of this embodiment, the coating thickness of the metal alloy is selected to ensure the coated metal alloy has essentially no pin holes, and/or does not shear when formed into various products. A metal alloy coating thickness of about 25–51 microns forms a coating that has few, if any, pin holes, provides greater elongation characteristics, and resists shearing when formed into various shaped articles. In still another aspect of this embodiment, the thickness of the metal alloy is selected for use in certain types of environments in which the coated base metal is to be used. A metal alloy coating thickness of about 25–51 microns forms a coating that significantly reduces the corrosion of the base metal in virtually all types of environments. Metal alloy coating thicknesses greater than about 51 microns are typically used in harsh environments to provide added corrosion protection. In another embodiment of the invention, the molten metal alloy is maintained at a temperature at least about 2–30° C. above the melting point of the metal alloy, while the metal alloy is on the coating rollers. In another embodiment of the invention, the coating processes includes at least one set of coating rollers that partially or fully coat the surface of the base metal as the base metal passes the coating rollers. In another embodiment of the invention, one or more coating rollers are at least partially immersed in molten metal alloy during the coating process. In one aspect of this embodiment, the coating process is used in conjunction with an immersion coating process and one or more of the coating rollers are at least partially immersed in molten metal alloy in the melting pot. In another aspect of this embodiment, one or more of the coating rollers are at least partially immersed in a protective material in the melting pot. In yet another embodiment of the invention, one or more coating rollers are positioned above the molten metal alloy in the melting pot when the coating rollers are used in conjunction with an immersion coating process. In still another embodiment of the invention, one or more coating rollers are at least partially coated with molten metal alloy by one or more spray jets that direct molten metal alloy on to the one or more coating rollers. The one or more spray jets direct the molten metal alloy on to the surface of the coating rollers as the base metal passes by or between the coating rollers thereby resulting in the base metal being partially or completely coated with the metal alloy. In still another embodiment of the invention, one or more coating rollers include an internal cavity in which molten metal alloy is directed into and then directed onto the surface of the coating roller to direct the molten metal alloy onto the surface of the coating rollers as the base metal passes by or between the coating rollers. In still another embodiment of the invention, the time period the base metal is exposed to each coating roller is a relatively short time. The time period is dependant on the speed of the base metal and the size of the coating rollers. Typically, the base metal is exposed to the coating rollers for at least about 0.3 seconds and generally about 0.5–30 seconds. In a further embodiment, one or more coating rollers include one or more grooves. The one or more grooves are designed to facilitate in maintaining the molten metal alloy on the coating roller during the coating process.

In accordance with yet another aspect of the present invention, the corrosion resistant metal alloy is coated onto the surface of the base metal, the surface of the intermediate barrier metal layer, and/or the surface of the previously applied metal alloy coating by a spray coating process. Molten metal alloy is sprayed onto the surface of the base metal, the surface of the intermediate barrier metal layer, and/or the surface of the previously applied metal alloy coating by one or more spray jets. The spray jets spray molten metal alloy onto the surface of the base metal, the surface of the intermediate barrier metal layer, and/or the surface of the previously applied metal alloy coating to at least partially coat the surface of the base metal, the surface of the intermediate barrier metal layer, and/or the surface of the previously applied metal alloy coating, and/or ensure that a uniform and/or continuous coating is applied on the surface of the base metal, the surface of the intermediate barrier metal layer, and/or the surface of the previously applied metal alloy coating. The speed and time the surface of the base metal, the surface of the intermediate barrier metal layer, and/or the surface of the previously applied metal alloy is in contact with the molten metal is controlled so that the desired coating thickness and desired thickness of the heat created intermetallic layer is obtained. In one embodiment of the invention, the spray jets are used in conjunction with coating rollers and/or an immersion process. In one aspect of this embodiment, the spray jets at least partially direct molten metal alloy onto the coating rollers and/or onto the surface of the base metal, the surface of the intermediate barrier metal layer, and/or the surface of the previously applied metal alloy coating during the coating process. In another embodiment of the invention, this molten metal alloy is maintained at a temperature of at least about 2–30° C. above the melting point of the metal alloy as the metal alloy is sprayed from the one or more spray jets. In yet another embodiment of the invention, the base metal passes by or between one or more metal spray jets during the coating process to partially or completely coat the surface of the base metal. In another embodiment of the invention, the base metal is exposed to the molten metal alloy from the one or more metal spray jets for a sufficient time to partially or fully coat the surface of the base metal. The time the base metal is exposed to the molten metal alloy from the metal spray jets is dependent on the speed of the moving base metal. Typically, the base metal is exposed to the molten metal alloy from the metal spray jets for at least about 0.3 seconds, generally about 0.5–60 seconds, and more typically about 1–30 seconds.

In accordance with another aspect of the present invention, the coated base metal which is coated by a hot dip process is subjected to an air-knife process. In an air-knife process, the coated to metal alloy is subjected to a high velocity fluid. The high velocity fluid removes surplus molten corrosion resistant metal alloy coating from the surface of the base metal, the surface of the intermediate barrier metal layer, and/or the surface of the previously applied metal alloy coating; smears the coated corrosion resistant metal alloy over the surface of the base metal, the surface of the intermediate barrier metal layer, and/or the surface of the previously applied metal alloy coating thereby reducing or eliminating pin holes or other uncoated surfaces; improves the grain size of the coated metal alloy; smooths and/or reducing lumps or ribs in the coated metal alloy, reduces the metal alloy coating thickness; and/or cools and/or hardens the molten metal alloy. In one embodiment of the invention, the air knife process uses a high velocity fluid which generally does not oxidize the corrosion resistant alloy. In one aspect of this embodiment, the fluid used in the air-knife process includes, but is not limited to, an inert or substantially inert gas such as, but not limited to, nitrogen, sulfur hexafluoride, carbon dioxide, hydrogen, noble gases, and/or hydrocarbons. In another embodiment of the invention, the high velocity fluid of the air-knife process is directed onto both sides of the coated base metal and at a direction which is not perpendicular to the surface of the coated base metal. In still another embodiment of the invention, the protective material on the surface of the molten metal alloy in the melting pot is eliminated when the air-knife process is used in conjunction with a coating process by immersion in molten alloy. When an air-knife process is used in conjunction with coating by immersion, the inert or substantially inert fluid inhibits or prevents dross formation and/or viscous oxide formation in the region in which the inert or substantially inert fluid contacts the molten metal alloy in the melting pot. The high velocity of the inert or substantially inert fluid also breaks up and/or pushes away dross or viscous oxides on the surface of the molten metal alloy thus forming a dross and oxide free region for the coated base metal to be removed from the melting pot. In yet another embodiment of the invention, the air-knife process includes one or more blast nozzles to direct a high velocity fluid toward the metal alloy coating on the surface of the base metal. In one aspect of this embodiment, the coated base metal is directed between two or more blast nozzles. In still yet another embodiment, the air-knife process at least partially causes molten metal alloy on the surface of the base metal to be directed back into the melting pot when the air-knife process is used in conjunction with an immersion coating process. In a further embodiment, one or more blast nozzles are adjustable so as to direct the high velocity fluid at various angles onto the surface of the coated base metal. In yet a further embodiment of the invention, one or more blast nozzles are partially or fully enclosed in a chamber, which chamber is designed to accumulate or trap at least a portion of the fluid after the fluid is directed toward the base metal. The accumulated fluid can then be recirculated back through the blast nozzles. In still a further embodiment of the invention, the air-knife process is used to control the thickness and/or quality of the molten metal alloy coating. In still yet a further embodiment of the invention, the base metal is exposed to the fluid from the air-knife process for a relatively short period of time. The time the base metal is exposed to the fluid is dependent on the speed of the moving base metal. Typically, the base metal is exposed to the fluid from the air-knife process for at least about 0.3 seconds, generally about 0.5–60 seconds, and more typically about 1–30 seconds.

In accordance with another aspect of the present invention, the coated base metal is cooled by a cooling process. Typically the coated base metal is cooled after being coated by a hot dip coating process. The coated base metal can be cooled by spraying with and/or subjecting the coated base metal to a cooling fluid and/or immersing the coated base metal in a cooling fluid. As previously stated, when an air-knife process is used, the coated base metal can be at least partially cooled by the fluid from the air-knife process. When the heated corrosion resistant metal alloy slowly cools, larger grain sizes and lower grain densities generally occur in the corrosion resistant metal alloy coating, and the corrosion resistant metal alloy coating typically forms a more reflective surface. When the heated corrosion resistant metal alloy rapidly cools, fine grain sizes and increased grain densities occur in the corrosion resistant metal alloy coating, and the corrosion resistant metal alloy coating forms a less reflective surface than a slowly cooled corrosion resistant alloy coating. Small grain sizes and higher grain densities in the corrosion resistant metal alloy coating typically result in a stronger bonding coating and greater corrosion resistance. In one embodiment of the invention, the cooling process is less than about two hours. In one aspect of this embodiment, the cooling process is less than about one hour. In another aspect of this embodiment, the cooling process is less than 0 minutes. In still another aspect of this embodiment, the cooling process is less than about 5 minutes. In another embodiment of the invention, a liquid or gas is jet sprayed onto the surface of the coated base metal to cool the metal alloy coating. In one aspect of this embodiment, the cooling fluid is water. In another aspect of this embodiment, the temperature of the cooling fluid is about 15–95° C. In yet another aspect of this embodiment, the temperature of the cooling fluid is about 20–60° C. In yet another aspect of this embodiment, the temperature of the cooling fluid is about ambient temperature (20–28° C.). In still yet another aspect of this embodiment, the coated base metal is at least partially guided by a camel-back guide as the coated base metal is cooled by the spray jets. The camel-back guide is designed to minimize contact with the coated base metal thereby reducing the amount of metal alloy coating inadvertently removed from the base metal. In one aspect of this embodiment, the camel-back design allows cooling fluid to be applied to both sides of the coated base metal. In still another embodiment of the invention, the coated metal alloy is cooled by immersion in a cooling fluid. Typically, the coated base metal is directed into a cooling tank that contains a cooling fluid. In one aspect of this embodiment, the temperature of the cooling fluid in the cooling tank is maintained at a desired temperature by use of agitators, heat exchangers, and/or replenishment of cooling fluid. In another aspect of this embodiment, the temperature of the cooling fluid is about 15–95° C. In yet another aspect of this embodiment, the temperature of the cooling fluid is about 20–60° C. In yet another aspect of this embodiment, the temperature of the cooling fluid is about ambient temperature (20–28° C.). In still yet another aspect of this embodiment, water is used as the cooling fluid. The oxygen in the water can cause discoloration of the metal alloy coating thereby reducing the reflectiveness of the metal alloy coating.

In accordance with another aspect of the invention, the coated base metal is passed through a leveler whereby the coated metal alloy is molded about the base metal, and/or smoothed. In one embodiment of the invention, a final coating thickness is obtained by the leveler. In another embodiment of the invention, the leveler includes a plurality of rollers. In yet another embodiment of the invention, the base metal is maintained at a tension as it is passed through the leveler.

In accordance with yet another aspect of the invention, the coated base metal is rolled into a coil for later processing or use.

In accordance with still another aspect of the invention, the coated base metal is sheared into specific length plates or strip for later use or immediate processing. In one embodiment of the invention, a shearing device shears a continuously moving coated base metal. In one aspect of this embodiment, the shearing device moves with the moving coated base metal when shearing.

In accordance with still yet another aspect of the present invention, the heat created intermetallic layer formed between the metal alloy coating and the surface of the base metal, surface of the intermediate barrier metal layer, and/or surface of a previously applied metal alloy coating is at least partially exposed. The exposed heat created intermetallic layer has been found to provide excellent corrosion resistance in a number of environments. The heat created intermetallic layer can be exposed by mechanical and/or chemical processes. In one embodiment of the invention, at least a portion of the metal alloy coating is removed by a mechanical process that includes, but is not limited to, grinding, melting, shearing and the like. In another embodiment of the invention, at least a portion of the metal alloy coating is removed by a chemical process which includes, but is not limited to, an oxidation process. The oxidation process at least partially removes the coated metal alloy and at least partially exposes the heat created intermetallic layer. The oxidation process includes the use of an oxidizing solution. In one aspect of this embodiment, the oxidation solution is selected to be autocatalytic in that the oxidation solution removes the metal alloy coating but does not or only very slowly removes the heat created intermetallic layer. In another aspect of this embodiment, the oxidation solution includes nitric acid and/or chromic acid. When nitric acid is included in the oxidation solution, the nitric acid concentration is generally about 5–60% by volume and typically about 10–25% by volume of the oxidation solution. In still another aspect of this embodiment, the oxidation solution includes copper sulfate. When copper sulfate is included in the oxidation solution, the copper sulfate is generally less than about 10% by volume, typically about 0.5–2% by volume of the oxidation solution, and more typically about 1% by volume of the oxidation solution. In yet another aspect of this embodiment, the exposure of the coated base metal to the oxidation solution in the oxidation process is generally less than about one hour; however, longer times can be used depending on the concentration and temperature of the oxidation solution, the type of metal alloy, the thickness of the metal alloy, and/or the degree of desired exposure of the heat created intermetallic layer. In one specific aspect, the exposure to the oxidation solution in the oxidation process is less than about ten minutes. In another specific aspect, the exposure to the oxidation solution in the oxidation process is less than about two minutes. In still another specific aspect, the exposure to the oxidation solution in the oxidation process is about 0.08–1.5 minutes. In a further aspect of this embodiment, after a sufficient amount of the heat created intermetallic layer is exposed by the oxidation solution, the oxidation solution is removed from the base metal. In still a further aspect this embodiment, the temperature of the oxidation solution is about 15–80° C. In yet a further aspect this embodiment, the temperature of the oxidation solution is about 30–80° C. In yet a further aspect this embodiment, the temperature of the oxidation solution is about 15–60° C. In a further aspect this embodiment, the temperature of the oxidation solution is about 12–62° C. In yet a further aspect this embodiment, the temperature of the oxidation solution is about 40–60° C. In yet a further aspect this embodiment, the temperature of the oxidation solution is about 22–42° C. In still a further aspect this embodiment, the temperature of the oxidation solution is about 32° C. In still yet a further aspect of this embodiment, the oxidation solution is rinsed off after the intermetallic layer is exposed. In still another embodiment of the invention, the at least partial removal of the metal alloy coating is described in U.S. Pat. No. 5,397,652, which is incorporated herein.

In accordance with another aspect of the present invention, the exposed heat created intermetallic layer is passivated by a passivation process. The passivation process is designed to at least partially react with the heat created intermetallic layer and to form a thin corrosion resistant layer. The corrosion resistant layer exhibits improved corrosion resistant properties, improved abrasion resistance, improved hardness, improved formality, resists cracking, and/or has less reflective color as compared to a non-passified intermetallic layer. The passivation process includes the use of a passivation solution. In one embodiment of the invention, the passivation solution includes a nitrogen containing compound. In another embodiment of the invention, the passivation solution is the same as the oxidation solution, thus the oxidation/passivation solution removes the metal alloy to expose the heat created intermetallic layer and subsequently passifies the exposed heat created intermetallic layer to form the corrosion resistant layer. In one aspect of this embodiment, the oxidizing solution fully or substantially ceases to react with the intermetallic layer after the passivation later is formed (auto-catalytic). In another embodiment of the invention, the coated base metal material is passivated in a different tank from the oxidation solution. In yet another embodiment of the invention, the oxidation solution and/or passivation solution is rinsed off the coated base metal after the formation of the passivation layer. In still yet another embodiment of the present invention, the pacified intermetallic layer exhibits excellent formability characteristics. The formability of the base material having a pacified intermetallic layer on the surface of the base material exhibits improved formability characteristics over a tin metal alloy or a tin and zinc metal alloy coated base material. The improved formability is believed to be the result of the complete or partial removal of the tin metal alloy or tin and zinc metal alloy from the surface of the base material. The removal of the tin metal alloy or tin and zinc metal alloy reduces the thickness of the treated base material. The tin metal alloy or tin and zinc metal alloy is also less formable than many types of base metal such as, but not limited to, copper, copper alloys, aluminum, aluminum alloys. As a result, the reducing of the thickness of the coated base material and by partial or complete removal of a less formable metal layer, i.e. the tin metal alloy or tin and zinc metal alloy, results in improved formability. In yet another embodiment of the invention, the thickness of the passivation layer is at least about 0.1 micron. In still another embodiment of the invention, the thickness of the passivation layer is about 0.1–5 microns. In still another embodiment of the invention, the thickness of the passivation layer is up to about 1.5 microns.

In accordance with still another aspect of the present invention, the coated base metal is treated with a weathering agent to accelerate the weathering, discoloration of the surface of the metal alloy coating, and/or control the formation of white rust on the surface of the metal alloy coating. In one embodiment of the invention, the weathering material is applied to the metal alloy coating to oxidize the metal alloy coating surface, reduce the reflectivity of the metal alloy coating, and/or discolor the metal alloy coating. In another embodiment of the invention, the weathering material is an asphalt-based paint which causes accelerated weathering of the metal alloy coating when exposed to the atmosphere. The asphalt-based paint decreases the weathering time of the metal alloy coating. In one aspect of this embodiment, the asphalt paint is a petroleum-based paint which includes asphalt, titanium oxide, inert silicates, clay, carbon black or other free carbon and an anti-settling agent. In another aspect of this embodiment, the asphalt-based paint is applied at a thickness to form a semi-transparent or translucent layer over the metal alloy coating. In one specific aspect, the thickness of the asphalt-based paint is about 1–500 microns. In another specific aspect, the thickness of the asphalt-based paint is about 6–150 microns. In still another specific aspect, the thickness of the asphalt-based paint is about 6–123 microns. In yet another specific aspect, the thickness of the asphalt-based paint is about 12–50 microns. In still yet a further specific aspect, the thickness of the asphalt-based paint is about 12–25 microns. In still yet another embodiment of the invention, the weathering agent is dried by air drying and/or by heating lamps.

In accordance with yet another aspect of the present invention, the metal alloy or base metal coated with the metal alloy coating is immediately formed, or formed at a manufacturing site, or formed at a building site. In one embodiment of the invention, the metal alloy or coated base metal is formed into roofing materials such as disclosed in, but not limited to, gutter systems or roofing material which are illustrated in U.S. Pat. Nos. 4,987,716; 5,001,881; 5,022,203; 5,259,166; and 5,301,474, all of which are incorporated herein by reference. In one aspect of this embodiment, the roofing materials are formed on site. In another embodiment of the invention, the metal alloy or coated base metal is formed into an automotive part such as, but not limited to a gasoline tank. In one aspect of this embodiment, the gasoline tank includes a first and second metal shell member. The two combined cavities of the shell members are combined to form an inner fuel receiving chamber which holds fuel within the receptacle. The abutting peripheral edges of the shell members are joined together and sealed to maintain the fuel within the inner petroleum receiving chamber. The two shell members may be joined in any of a number of ways that will securely prevent the shells from separating and petroleum from leaking from the interior chamber (i.e. welding, soldering and/or bonding the edges together). Such a fuel tank is illustrated in U.S. Pat. No. 5,455,122, which is incorporated herein by reference. In still another embodiment of the invention, the metal alloy is formed into a wire. In one aspect of this embodiment, the wire is used as a solder or welding wire to solder or weld together metals. In one specific aspect, the solder or welding wire is formulated to have excellent wetting properties which helps to ensure the formation of a high quality bond between metal materials. In another specific aspect, the solder or welding wire is formulated to have a low lead content. In still another specific aspect, the solder or welding wire can be used in standard soldering guns or welding apparatuses (i.e. ultrasonic welding, arc welding, gas welding, laser welding). In still yet another specific aspect, the solder has low dissolving activity with the welded metal materials. In a further specific aspect, the welding wire is a solid welding wire or a cored welding wire. In still another embodiment of the invention, the metal alloy exhibits excellent soldering or welding characteristics such that various electrodes including lead and/or no-lead containing solders and/or electrodes can be used to solder and/or weld the metal alloy or coated base metal.

In accordance with yet another aspect of the present invention, the metal alloy and/or coated base metal base material can be formed on site without the metal alloy cracking and/or flaking off.

In accordance with still another aspect of the present invention, the metal alloy is formed into a corrosion-resistant strip or sheet. In one embodiment of the invention, the metal alloy strip is formed by a roll forming process. In the roll forming process, a vat of molten metal alloy is provided. The molten alloy is then directed through a series of rollers until the desired thickness of the metal alloy strip or sheet is obtained.

The primary object of the present invention is the provision of a metal alloy having corrosion-resistant properties.

Another object of the present invention is the provision of a base metal coated with a metal alloy having corrosion resistant properties.

Yet another object of the present invention is the provision of a metal material at least partially formed from a metal alloy having corrosion resistant properties.

Still another object of the present invention is the provision of a metal alloy and/or coated base metal which is both corrosion-resistant and environmentally-friendly.

Still yet another object of the present invention is the provision of a coated base metal having a sufficient coating thickness to reduce or eliminate pinholes in the coating and/or which the shearing of the coating is inhibited when the coated base metal is formed.

Another object of the present invention is the provision of a coated base metal having a heat created intermetallic layer formed between the base metal and the metal alloy coating.

Yet another object of the present invention is the provision of a coated base metal coated by a hot dip process.

Still another object of the present invention is the provision of coating a base metal by a plating process.

Yet still another object of the present invention is the provision of a base metal coated by a continuous process.

Still yet another object of the present invention is the provision of a metal alloy or a coated base metal which is formed and sheared into various building and roofing components, automotive components, marine products, household materials, and other formed materials that are subsequently assembled on site or in a forming facility.

Another object of the present invention is the provision of a metal alloy or coated base metal that is corrosion-resistant and which can be formed into complex shapes and/or ornamental designs.

Another object of the present invention is the provision of a corrosion resistant metal alloy which includes a coloring agent to alter the color of the corrosion resistant metal alloy, a corrosion-resistance agent to improve the corrosion-resistance of the corrosion resistant metal alloy, a mechanical agent to improve the mechanical properties of the corrosion resistant metal alloy, a grain agent to positively affect grain refinement of the corrosion resistant metal alloy, an oxidation agent to reduce oxidation of the molten corrosion resistant metal alloy, an inhibiting agent to inhibit the crystallization of the corrosion resistant metal alloy, and/or a bonding agent to improve the bonding characteristics of the corrosion resistant metal alloy.

Still another object of the present invention is the provision of a corrosion resistant metal alloy which includes a majority of tin.

Yet another object of the present invention is the provision of a corrosion resistant metal alloy which includes a majority of tin and zinc.

Another object of the present invention is the provision of applying an intermediate barrier metal layer to the surface of the base metal prior to applying the corrosion resistant metal alloy coating.

Still another object of the present invention is the provision of a coated base metal or metal alloy which is formed into wire, wire solder and/or welding electrodes.

Still yet another object of the invention is the provision of a metal alloy and/or a coated base metal which is economical to produce.

Another object of the invention is the provision of a metal alloy and/or a coated base metal that can be soldered with conventional tin-lead solders or no-lead solders.

Yet another object of the present invention is the provision of pretreating the base metal prior to coating the base metal with a corrosion resistant alloy to remove oxides and/or foreign materials from the surface of the base metal.

Another object of the present invention is the provision of pickling the base metal to remove surface oxides on the base metal prior to coating the base metal with a metal alloy.

Yet another object of the present invention is the provision of chemically activating the base metal to remove surface oxides on the base metal prior to coating the base metal with a metal.

Still yet another object of the present invention is the provision of reducing the oxygen interaction with the base metal prior to and/or during the coating process.

Another object of the present invention is the provision of abrasively treating the surface of the base metal prior to coating the base metal with a metal alloy.

Still yet another object of the present invention is the provision of a metal alloy and/or a metal coating that is not highly reflective.

Yet another object of the present invention is the provision of a metal alloy and/or a metal coating for a base metal which has a low lead content.

Still yet another object of the present invention is the provision of using spray jets to spray molten metal alloy onto the surface of the base metal to coat the surface of the base metal.

Another object of the present invention is the provision of coating a metal alloy and/or a metal coating with a weathering agent to accelerate the dulling of the surface of the metal alloy.

Still another object of the present invention is the use of an air-knife process to control the thickness and quality of the metal alloy coating on the base metal.

Yet still another object of the present invention is the provision of cooling the metal alloy and/or a metal coating to form fine, high density grains which produce a strong bonding, corrosive-resistant, discolored coating.

Another object of the present invention is the provision of subjecting the coated base metal to an oxidation solution to at least partially remove the metal alloy from the base metal and to at least partially expose the heat created intermetallic layer.

Still another object of the present invention is the provision of subjecting the heat created intermetallic layer to a passivation solution to form a highly corrosion-resistant, non-reflective surface layer on the base metal.

Still yet another object of the present invention is the provision of a metal alloy coating which has superior corrosive characteristics permitting a thinner coating of the metal alloy on the base metal than that which is required for conventional terne coatings with the high lead content.

Still yet another object of the present invention is the provision of using spray jets which spray metal alloy onto the coating rollers and/or base metal surface to eliminate non-coated surfaces on the base metal.

Another object of the present invention is the indirect heating of the melting pot without use of heating coils or heating rods.

Another object of the present invention is the provision of a corrosion resistant metal alloy that can be coated on a number of different base metal compositions.

Yet another object of the present invention is the provision of a corrosion resistant metal alloy that can be coated a base metal having a number of different shapes.

Still another object of the present invention is the provision of providing a coated base metal which is formed by a continuous, hot dip process wherein the base metal has a controlled residence time when exposed to the molten metal alloy.

Still yet another object of the present invention is the provision of producing a highly corrosion-resistant metal alloy or coated base material that is economical to make.

These and other objects and advantages will become apparent to those skilled in the art upon the reading and following of this description taken together with the accompanied drawing.

BRIEF DESCRIPTION OF THE DRAWINGS

Reference may now be made to the drawings, which illustrate various embodiments that the invention may take in physical form and in certain parts and arrangements of parts wherein;

FIGS. 1A–1B is a cross-sectional view of a hot dip process wherein a metal strip is coated with a corrosion resistant alloy by immersing the metal strip in molten corrosion resistant metal alloy;

FIG. 2 is a cross-section view of additional and/or alternative processes for handling the coated metal strip;

FIG. 3 is a cross-sectional view of the process of plating a metal strip with a corrosion resistant metal alloy;

FIG. 4 illustrates a cross-sectional view of the process of flow heating the plated metal alloy;

FIG. 16 is a plane view of a gasoline tank formed from the metal alloy or base metal coated with the metal alloy of the present invention;

FIG. 17 illustrates the joining of the first and second shell members of the gasoline tank at the peripheral edges;

FIG. 18 is a partial cross-sectional view of a gasoline tank illustrating a corrosion resistant coating on the metal shell after a coated base metal shell has been drawn;

DESCRIPTION OF THE PREFERRED EMBODIMENTS

Figure 5:
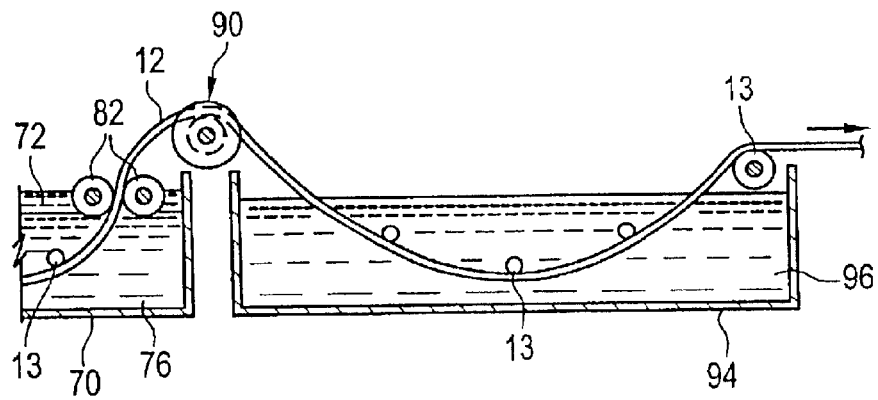
FIG. 5 illustrates a cross-section view of an alternative process of cooling the hot dip coated base metal in a cooling tank.

Referring now to the drawings, wherein the showings are for the purpose of illustrating preferred embodiments of the invention only and not for the purpose of limiting the same, reference is first had to FIGS. 1A–1B which illustrates one type of hot dip process for coating a metal alloy on a base metal and for forming a heat created intermetallic layer between the metal alloy coating and the base metal. However, as will be later discussed, the base metal can be alternatively coated by a process that does not form a heat created intermetallic layer between the metal strip and metal alloy coating. The base metal and process used to coat and/or pre-treat the base metal are illustrated in FIGS. 1–15. The base metal is in the form of a metal strip; however, other forms of the base metal can be used (i.e. metal plates, metal strip or metal plate formed into various shapes, various shaped metal objects) and be coated with a metal alloy in accordance with the present invention.

The metal alloy is a corrosion resistant alloy. When the metal alloy is coated onto the surface of a base metal, the metal alloy inhibits or prevents the base metal from corroding when exposed to the atmosphere. The metal alloy is highly corrosive resistant, abrasive resistant, pliable, weldable and environmentally friendly. The metal alloy binds with the base metal to form a durable protective coating which is not easily removable.

The amount of corrosion resistance protection provided by the metal alloy is of primary importance. The coating of the metal strip with the metal alloy functions to form a barrier to the atmosphere which inhibits or prevents the metal strip from corroding. By coating the metal strip with the metal alloy, the life of the metal strip is extended for many years. The pliability of the metal alloy is also important when the coated metal strip is to be formed. For materials such as, but not limited to, wall systems, roofing systems and petroleum receptacles, the coated base metal is formed into various shapes and is usually folded to form seams to bind together the coated base metal components. A coating on a metal strip that forms a rigid or brittle coating can crack and/or prevent the coated base metal components from being properly shaped. The metal alloy is formulated to be connected together by solder or a weld.

Metal strips such as, but not limited to, carbon steel, stainless steel, copper, copper alloys, aluminum and aluminum alloys, oxidize when exposed to the atmosphere and/or various types of chemicals or petroleum products. Over a period of time, the oxidized metal strip begins to weaken and disintegrate. The application of a corrosion resistant metal alloy onto the metal strip acts as a barrier to the atmosphere and/or to chemical or petroleum products to inhibit or prevent the oxidation of the metal strip. By coating the metal strip with the corrosion resistant metal alloy, the life of the metal strip is extended for many years.

As illustrated in FIGS. 1A–1B, metal strip 12 is provided from a large metal roll 10. Metal strip 12 has a thickness of less than about 12700 microns, and typically about 127–5080 microns; however, other metal strip thickness can be used depending on the type of base metal and the use of the coated base metal. Metal strip 12 is unwound from roll 10 at speeds which are generally less than about 400 ft./min., typically about 1–150 ft./min., more typically about 70–250 ft./min., and yet more typically about 50–115 ft/min. The metal strip speed is ultimately selected so that the residence time of the metal strip in contact with the molten metal alloy is sufficient to coat the desired amount of strip to a desired thickness and to form a heat created intermetallic layer of a desired thickness.

After metal strip 12 is unrolled from metal roll 10, metal strip 12 is optionally pretreated prior to being coated with the metal alloy. As illustrated in FIGS. 1A–1B, metal strip 12 is pretreated to clean and/or remove surface oxides from the surface of the metal strip prior to the metal strip being coated with the corrosion resistant metal alloy. The type and number of pretreatment process for metal strip 12 will depend on the surface condition of the metal strip.

Figure 9:
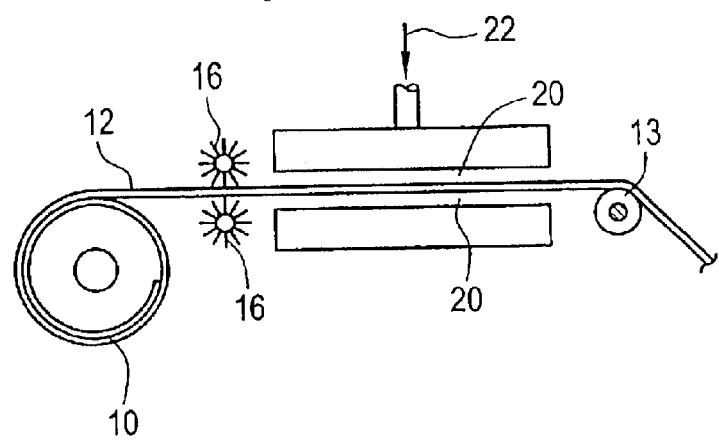
FIG. 9 illustrates a cross-sectional view of an alternative process of using abrasion treaters in conjunction with a low oxygen environment to pre-treat the base metal.

Metal strip 12 is illustrated in FIGS. 1A and 9 as being cleaned by an abrasion treater 14 after being unrolled from metal roll 10. The abrasion treater includes brushes 16 that are driven by motors. The brushes are placed in contact with metal strip 12 to remove foreign objects from metal strip 12 and to initially etch and/or mechanically remove oxides from the surface of metal strip 12. Brushes 16 are typically biased against metal strip 12 to cause friction between the brushes and metal strip 12, which friction facilitates in the cleaning of the surface of metal strip 12. Typically, brushes 16 are located on the top and bottom surface of strip 12. As can be appreciated, the brushes can be positioned to only contact a portion of the surface of the metal strip. Brushes 16 are typically made of a material having a hardness equal to or greater than metal strip 12 so that the brushes will not quickly wear down when removing foreign materials and/or pre-etching the surface of metal strip 12. In one arrangement, the brushes are made of a metal material such as, but not limited to, carbon steel wire brushes. Brushes 16 typically rotate in a direction that is opposite of the direction of the moving metal strip. This opposite rotational direction of the brushes causes increased abrasive contact with the surface of the metal strip. The abrasion treatment of the metal strip surface can also include the use of absorbents, cleaners and/or solvents. These absorbents, cleaners and/or solvents can be applied to part of or to the fill surface of metal strip 12 before, during and/or after metal strip 12 is treated with brushes 16. The cleaners and/or solvents can include, but are not limited to, alkaline cleaners, acidic cleaners and/or organic solvents.

After metal strip 12 passes through abrasion treater 14, metal strip 12 is guided by strip guides 13 to a low oxygen environment 20. As shown in FIGS. 1A and 9, strip guides 13 are positioned throughout the pretreatment and coating processes to guide metal strip 12 through each process. Low oxygen environment 20 is illustrated as being a low oxygen gas environment that fully surrounds the surface of metal strip 12 with low oxygen-containing gas 22. As can be appreciated, the low oxygen gas environment can be designed to only partially protect one or more surfaces of metal strip 12. The low oxygen-containing gas includes, but are not limited to, nitrogen, hydrocarbons, hydrogen, noble gases and/or other non-oxygen containing gases. The low oxygen-containing gas surrounds metal strip 12 and forms a barrier against the oxygen containing atmosphere thereby preventing or inhibiting oxide formation on the surface of metal strip 12. As can be appreciated, low oxygen environment 20 can include or in the alternative be a low oxygen liquid environment. In a low oxygen liquid environment, the liquid can be sprayed on to one or more surfaces of the metal strip or the metal strip can be partially or fully immersed in the low oxygen-containing liquid.

Metal strip 12, after passing through low oxygen gas environment 20, enters pickling tank 30 which contains a pickling solution 32. The pickling solution is formulated to remove surface oxides from the metal strip surface, remove dirt and other foreign materials from the metal strip surface and/or to etch the surface of the metal strip. Pickling tank 30 is of sufficient length and depth to allow for complete immersion of metal strip 12 in pickling solution 32 and to maintain the metal strip in contact with the pickling solution for a sufficient period of time. Typically, pickling tank 30 is at least about 25 feet in length. As can be appreciated, the pickling tank can be longer or shorter depending on the speed of the metal strip. Furthermore, the pickling tank can be designed so that only a portion of the surface of metal strip 12 contacts the pickling solution. The pickling solution typically contains one or more acids. The acids include organic and/or inorganic acids. Such acids include, but are not limited to, perchloric acid, hydrofluoric acid, sulfuric acid, nitric acid, hydrochloric acid, phosphoric acid, and/or isobromic acid. Typically, pickling solution 32 includes hydrochloric acid. Generally, the pickling solution contains at least about 5% by volume hydrochloric acid. For metal strip having extensive surface oxides and/or difficult to remove surface oxides, such as on a stainless steel strip, an aggressive pickling solution is used. One type of aggressive pickling solution is a dual acid solution of hydrochloric acid and nitric acid. Formulations of the hydrochloric-nitric acid include a) about 1–30% by volume hydrochloric acid and about 0.1–15% by volume nitric acid, b) about 5–25% by volume hydrochloric acid and 1–15% by volume nitric acid, or c) about 10% hydrochloric acid and 3% nitric acid. Pickling solution 32 is maintained at a temperature to obtain the desired activity of the pickling solution. Typically, pickling solution 32 is maintained at a temperature of at least about 26° C., generally about 48–60° C., and typically about 53–56° C. Pickling tank 30 contains one or more agitators 34. Agitator 34 is designed to agitate pickling solution 32 to maintain a uniform solution concentration, to maintain a uniform solution temperature and/or to break up gas pockets which form on the surface of metal strip 12. Agitator 34 typically includes an abrasive material which can both agitate pickling solution 32 and remove oxides from metal strip 12 when in contact with the surface of the metal strip. Agitator 34 is typically made of a material which does not react with pickling solution 32 and resists undue wear when in contact with the metal strip surface. Metal strip 12 is typically not exposed to the pickling solution for more than about 10 minutes so as to avoid pitting of the metal strip surface; however, longer pickling times can be used depending on the type of pickling solution, concentration and temperature of the pickling solution, type of metal strip, and/or condition of metal strip surface. Typically, the pickling time is less than about ten minutes, more typically less than about two minutes, still more typically less than about one minute, and yet more typically about 10–20 seconds. A pickling solution vent 36 is placed above pickling tank 30 to collect and remove acid fumes and other gasses escaping pickling tank 30.

As illustrated in FIG. 1A, metal strip 12 enters a low oxygen environment 20 after exiting pickling tank 30. After metal strip 12 exits pickling tank 30, the surface of metal strip 12 is essentially absent surface oxides and other foreign materials and is highly susceptible to oxidation with oxygen and other gases in the atmosphere. Low oxygen environment 20 shields the surface of metal strip 12 from oxygen and other oxidizing gases and/or liquids thereby inhibiting oxide formation on the metal strip surface. Low oxygen environment 20 is a low oxygen-containing gas environment similar to the low oxygen environment used after the abrasion treatment process; however, a low oxygen-containing liquid environment could be used in conjunction with or as an alternative to the low oxygen-containing gas environment After metal strip 12 exits low oxygen environment 20, metal strip 12 enters rinse tank 40 which contains a rinse solution 42. Rinse tank 40 is designed to remove any remaining pickling solution 32 on the surface of metal strip 12 and/or inhibit the formation of oxides on the metal strip surface. One type of rinse solution includes water that is deoxygenated by heating the water above about 37.7–43.3° C. (100–110° F.). As can be appreciated, other rinse liquids can be used. Rinse solution 42 can remove small amounts of oxides that remain on the surface of metal strip 12. The rinse solution typically is slightly acidic due to the acidic pickling solution that is removed from the metal strip surface combining with the rinse solution. As can be appreciated, the rinse solution can be also acidified by the intentional addition of acid to the rinse solution. The slightly acidic rinse solution 42 removes small amounts of oxides on the surface of metal strip 12. Rinse tank 40 is of sufficient length and depth to facilitate complete immersion of metal strip 12 in rinse solution 42 and to maintain the metal strip in contact with the rinse solution for a sufficient period of time. Typically, rinse tank 40 is at least about 20 feet in length. As can be appreciated, the rinse tank can be longer or shorter depending on the speed of the metal strip. Furthermore, the rinse tank can be designed so that only a portion of the surface of metal strip 12 contacts the rinse solution: The rinse tank typically includes one or more agitators, not shown. The agitators are designed to agitate rinse solution 42 to maintain a uniform solution concentration, maintain a uniform solution temperature, and/or break up gas pockets which form on the surface of metal strip 12. The agitators typically include an abrasive material which can both agitate the rinse solution and remove remaining oxides on the surface of metal strip 12 when in contact with the surface of the metal strip. The agitators are typically made of a material which does not react with rinse solution 42 and resists undue wear when in contact with the metal strip surface. As can be appreciated, the pickling solution can be alternatively or additionally be removed by spraying a rinse fluid onto a portion or the full surface of metal strip 12.

Referring now to FIG. 1B, metal strip 12 enters low oxygen environment 50 after exiting rinse tank 40. Low oxygen environment 50 is a low oxygen-containing liquid environment which includes spray jets 52. Spray jets 52 are located on each side of metal strip 12 so as to direct the low oxygen-containing liquid onto both sides of metal strip 12. As can be appreciated, the spray jets can be positioned about metal strip 12 so that only a portion of the strip surface is subjected to the low oxygen-containing liquid. The low oxygen-containing liquid 56 inhibits oxide formation on the metal strip surface. Spray jets 52 also remove remaining pickling solution 32 or other acid on the surface of metal strip 12. Low oxygen-containing liquid 56 is typically heated water having a temperature of at least about 38–43° C. (100–109° F.). As can be appreciated, other low oxygen-containing liquids can be used. Furthermore, it can be appreciated that low oxygen environment 50 can include or in the alternative be a low oxygen-containing gas environment.

Metal strip 12, upon leaving low oxygen liquid environment 50, enters chemical activation tank 60 which includes a chemical activating solution or deoxidizing solution 62. The chemical activation tank is of sufficient length and depth to facilitate in the complete immersion of metal strip 12 in deoxidizing solution 62 and to maintain the metal strip in contact with the deoxidizing solution for a sufficient period of time. Typically, chemical activation tank is at least about 25 feet in length. As can be appreciated, the chemical activation tank can be longer or shorter depending on the speed of the metal strip. Furthermore, the chemical activation tank can be designed so that only a portion of the surface of metal strip 12 contacts the deoxidizing solution. The chemical activation tank typically includes one or more agitators, not shown. The agitators are designed to agitate deoxidizing solution 62 to maintain a uniform solution concentration, to maintain a uniform solution temperature and/or to break up gas pockets which form on the surface of metal strip 12. The agitators typically include an abrasive material which can both agitate the deoxidizing solution and remove any remaining oxides on the surface of metal strip 12 when in contact with the surface of the metal strip. The agitators are typically made of a material which does not react with deoxidation solution and resists undue wear when in contact with the metal strip surface. The metal strip is generally subjected to the deoxidizing solution for less than about 10 minutes, and typically less than about one minute; however, longer times can be used. Deoxidizing solution 62 is formulated to remove the remaining oxides on the surface of metal strip 12 and/or act as a protective coating to inhibit oxide formation on the surface of metal strip 12. The temperature of the deoxidizing solution is maintained at a temperature to achieve sufficient activity of the deoxidizing solution. Typically, the temperature of the deoxidizing solution is maintained at least about 15° C. (59° F.), typically about 15–33°C. (59–91.4° F.), and more typically about 26–33° C. (78.8–91.4° F.). The deoxidizing solution typically includes zinc chloride; however, other chemical compounds can be used. Small amounts of an acid can be add to the deoxidizing solution to further enhance oxide removal from the metal strip surface. One specific deoxidizing solution formulation includes at least about 1% by volume zinc chloride. Another specific deoxidizing solution formulation includes about 5–50% by volume zinc chloride. Yet another specific deoxidizing solution formulation includes about 5–50% by volume zinc chloride and about 0.5–15% by volume hydrochloric acid.

After metal strip 12 exits chemical activation tank 60, metal strip 12 enters the final pretreatment step of immersion in a flux solution 74 contained in flux box 72. As can be appreciated, metal strip 12 can be exposed to a low oxygen environment, not shown, prior to entering flux solution 74 to inhibit or prevent oxide formation on the metal strip surface after the metal strip exits chemical activation tank 60. As also can be appreciated, flux box 72 can be designed so that only a portion of metal strip 12 is exposed to flux solution 74. Flux box 72 is located in melting pot 70. The flux solution in flux box 72 has a specific gravity that is less than or equal to the specific gravity of molten corrosion resistant metal alloy 76 so that flux solution 74 at least partially floats on the surface of the molten corrosion resistant metal alloy. Flux solution 74 typically includes zinc chloride and ammonium chloride; however, other compounds can be used. Specific formulations of flux solution 74 include a) about 20–75% by volume zinc chloride and 140% by volume ammonium chloride, b) about 20–75% by volume zinc chloride and 1–20% by volume ammonium chloride, c) about 30–60 weight percent zinc chloride and up to about 40 weight percent ammonium chloride, d) about 30–60 weight percent zinc chloride and about 5–40 weight percent ammonium chloride, or e) about 50 weight percent zinc chloride and about 8 weight percent ammonium chloride. As can be appreciated, other concentrations of these two components can be used. Flux solution 74 is the final pre-treating process of metal strip 12 for removal of remaining oxides on the surface of metal strip 12 prior to being coated with metal alloy 76. Flux box 74 also acts as a barrier to oxygen and prevents or inhibits oxides from forming on the surface of the metal strip and on the surface of the molten metal alloy covered by the flux solution.

An additional or alternative pretreatment process is the coating of metal strip 12 with an intermediate barrier metal layer prior to coating the metal strip with the corrosion resistant metal alloy. The coating of the metal strip with an intermediate barrier metal layer can constitute the only pretreatment process for the metal strip, or the metal strip can be pretreated with one or more other pretreatment process before and/or after the metal strip is coated with an intermediate barrier metal layer. The intermediate barrier metal layer is typically a thin layer of metal such as, but not limited to, tin, nickel, copper, chromium, aluminum, cobalt, molybdenum, Sn—Ni, Fe—Ni, and/or zinc. The thickness of the layer is generally less than about 500 microns and typically less than about 100 microns. The intermediate barrier metal layer can be applied by an electroplating process, an electroplating process and subsequent heating of the plated layer, immersion in molten metal, metal spraying, coating rollers, and the like. The process for plating the intermediate barrier metal layer onto the surface of metal strip 12 is typically by a conventional continuous plating process. The applied intermediate barrier metal layer typically forms a strong bond with the metal strip, whether or not the strip surface has been activated. The bonding of the intermediate barrier metal layer to the strip is enhanced by heating the intermediate barrier metal layer and the forming a heat created intermetallic layer between the metal strip and the intermediate barrier metal layer. When the intermediate barrier metal layer is plated and then flow heated, the thickness of the intermediate barrier metal layer is typically at least about 2 microns so that a sufficiently thick intermediate barrier metal layer exists for proper flow heating. The selection of metal of the intermediate barrier metal layer can advantageously change the composition of the heat created intermetallic layer thereby improving corrosion resistance, improving metal alloy bonding, improving metal alloy pliability, and/or inhibiting the formation of a thick zinc layer in the intermetallic layer when zinc is included in the metal alloy.

Another additional or alternative pretreatment process is the preheating of the metal strip prior to coating the metal strip with the corrosion resistant metal alloy. Metal strip that has a thickness of less than about 762 microns is typically not pre-heated. Thicker metal strip can be preheated to assist in the formation of the heat created intermetallic layer. A thin metal strip need not be preheated since the surface of the thin strip quickly heats to the temperature of the molten metal alloy. As the surface of the metal strip approaches the temperature of the molten metal alloy, an intermetallic layer begins to form between the surface of the metal strip and the metal alloy coating. Metal strip having a thickness of up to about 762 microns is classified as thin metal strip. However, thin metal strip can be preheated and such preheated strip forms an intermetallic layer quicker than a non pre-heated strip. Metal strip having a thickness over about 762 microns is classified as a thick metal strip. Thick metal strip is typically preheated prior to coating with the metal alloy. The surface of a thick metal strip takes a longer time to approach the temperature of the molten metal alloy due to the larger heat sink of the thicker metal strip. Preheating the thick metal strip facilitates in the surface of the metal strip reaching or approaching the molten temperature of the metal alloy during the coating process so that a desired heat created intermetallic layer is formed. Metal strip 12 can be preheated in any number of ways, such as but not limited to, convection or induction heating, flames, lasers, and the like. When a heat created intermetallic layer is not to be formed, the meal strip is typically not pre-heated.

Although FIGS. 1A–1B illustrate metal strip 12 being pretreated by the pretreatment processes of abrasion, pickling and rinsing, chemical activation, exposure to low oxygen environment, and the flux solution. The use of all these pretreatment process on all types of metal strip is not always required. When the metal strip has a clean surface and/or little or no oxide formation on the metal strip surface, the pretreatment process can be eliminated or only a select number of pretreatment processes can be used prior to coating the metal strip with the corrosion resistant metal alloy.

Figure 11:
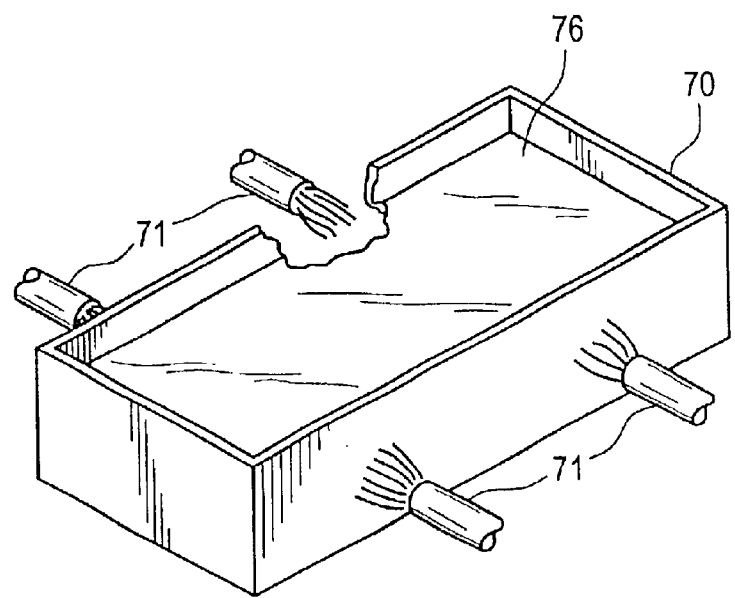
FIG. 11 is a prospective view of a melting pot heated by gas torches.

Referring to FIG. 1B, metal strip 12, after exiting flux box 72, enters molten corrosion resistant metal alloy 76. Melting pot 70 is typically heated by heating jets, coils, rods, heat exchangers, etc. In one particular arrangement, melting pot 70 is heated by four heating jets 71 directed at the outside sides of melting pot 70 as shown in FIG. 11. The heating jets are typically gas jets. Melting pot 70 is maintained at a temperature of at least several degrees above the melting point of corrosion resistant metal alloy 76 to prevent solidification of metal alloy 76 as metal strip 12 enters melting pot 70. Tin melts at about 232° C. (450° F.). Zinc melts at about 419.6° C. (787° F.). When additives and/or impurities are included in the tin metal alloy or tin and zinc metal alloy, the melting point of metal alloy 76 will be altered. The composition and/or thickness of melting pot 70 is selected to accommodate the various alloy melting temperatures. The temperature of the molten metal alloy can be up to or more than 38° C. (100° F.) cooler at the top of the melting pot than at the bottom of the melting pot. Typically, the tin metal alloy or tin and zinc metal alloy is maintained at least about 2–30° C. (35.1–86° F.) above the melting point of the metal alloy at the top of the melting pot. The temperature of the molten metal alloy is maintained at a sufficient level to prevent solidification of the molten metal when strip 12 enters the molten metal. The temperature of the metal alloy in the melting pot is selected to accommodate the inclusion of additives and/or impurities in metal alloy 76. Generally, the temperature of the molten metal alloy in the melting pot is about 231–538° C. (447.8–1000° F.). For high melting point metal alloys, additional heating jets or other additional heating devices can be used to heat the metal alloy in the melting pot to the desired temperature.

The molten metal alloy in the melting pot is generally formed by adding ingots of tin for a tin alloy coating and ingots of tin and ingots of zinc for a tin and zinc metal alloy coating into the melting pot wherein the ingots are melted and mixed. The ingots may contain some additional elements which function as additives or impurities in the tin metal alloy or tin and zinc metal alloy. The amount of impurities in the metal alloy are controlled so as to reduce the adverse affects of such impurities.

As shown in FIG. 1B, melting pot 70 is divided into two chambers by barrier 80. Barrier 80 is designed to prevent protective material 78, such as palm oil, from spreading over the complete top surface of molten corrosion resistant alloy 76 in melting pot 70. As can be appreciated, barrier 80 can be eliminated. When the protective material is palm oil, the melting point of the metal alloy should be below 343° C. (649.4° F.) so as to not degrade the palm oil. For metal alloys having higher melting point temperatures, special oils, fluxes, or other materials and/or special cooling procedures are employed when a protective material is used. Protective material 78 has a specific gravity which enables the protective material to at least partially float on the surface of molten alloy 76. The protective material inhibits or prevents the surface of the molten metal alloy from solidifying by insulating the surface from the atmosphere, inhibits or prevents the surface of the molten metal alloy from oxidizing, and/or aids in the properly distribution the metal alloy on the surface of metal strip 12 upon exiting the molten metal alloy.

Melting pot 70 is generally about 10–100 ft. in length so as to provide an adequate residence time for the metal strip in the molten metal alloy as the metal strip moves through the molten metal alloy 76 in the melting pot. Longer melting pot lengths can be employed for fast moving metal strip. The residence time of the metal strip in the molten metal alloy is sufficiently long enough to form the desired thickness of heat created intermetallic layer 140. The residence time of metal strip 12 in melting pot 70 is generally at least about 5 seconds and less than about 10 minutes, typically less than about 2–10 minutes, more typically less than about one minute, still more typically about 5–30 seconds, and even more typically about 10–30 seconds. When the metal strip is coated with the metal alloy by a continuous immersion process, the metal strip is typically moved through the molten tin alloy in the melting pot in a curvilinear path; however, other paths can be used. When the metal strip uses a curvilinear path, the metal strip requires fewer, if any, guide rolls (driving rollers), especially when the metal strip is made of a more malleable material such as, but not limited to, copper. The curvilinear path of the metal strip allows the metal strip to dictate its path in the molten metal alloy. The coating thickness of the metal alloy onto the metal strip is a function of the time the metal strip is resident or immersed in the molten tin alloy. The coating thickness increases the longer the metal strip is maintained in the molten metal alloy. In a continuous immersion coating process, the resident time of the surfaces of the metal strip in the molten metal alloy is substantially the same. The uniformity of residence time in the molten metal alloy results in a more uniform coating thicknesses on the surface of the metal strip and substantially uniform growth of the heat created intermetallic layer. The metal strip is typically maintained at a constant speed through the molten metal alloy to create a more smooth coated surface. As the metal strip passes through the molten metal alloy at a substantially constant speed, the molten metal alloy about the metal strip adheres to the moving metal strip and shears a portion of the coating from the moving metal strip. This shearing effect results from the viscosity of the molten metal alloy and the speed at which the metal strip is moving through the molten metal alloy. For a given speed and molten metal alloy viscosity, a constant shearing effect is applied to the surface of the moving metal strip thereby smoothing the coated surface and facilitating in the formation of a constant coating thickness. By using a continuous coating process to coat the metal strip with a metal alloy, a uniform of coating (weight and thickness) is obtained, having excellent surface appearance, smoothness, texture control and a substantially uniform heat created intermetallic layer.

Figure 12:
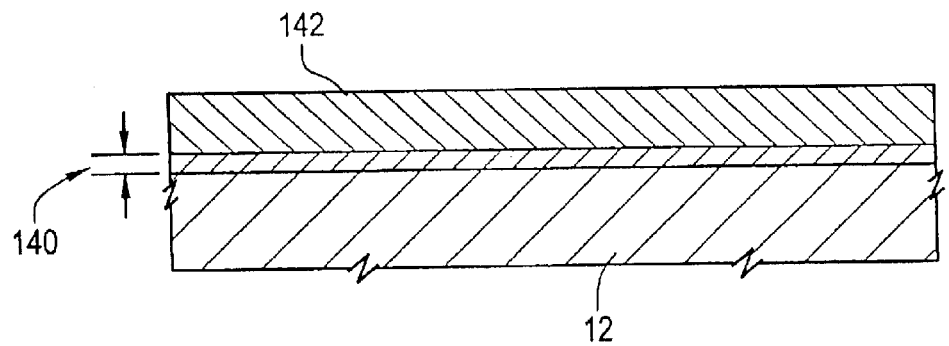
FIG. 12 is a cross-sectional view of a coated metal strip having a heat-created intermetallic layer.

During the coating of the metal strip with molten metal alloy, a heat created intermetallic layer 140 forms between the metal alloy coating layer 142 and metal strip 12 as shown in FIG. 12. The heat created intermetallic layer includes elements of the corrosion resistant metal alloy molecularly intertwined with elements on the surface of metal strip 12. This molecular intertwining occurs when the temperature of the surface of the metal strip approaches the temperature of the molten corrosion resistant metal alloy. The migration of the corrosion resistant metal atoms into the surface layer of strip 12 results in the formation of heat created intermetallic layer 140. A carbon steel strip coated with a tin or tin and zinc metal alloy would form an intermetallic layer that includes at least iron, zinc, and tin. A stainless steel strip coated with a tin metal alloy would form an intermetallic layer that includes at least iron, chromium, and tin. A copper or copper alloy strip coated with a tin and zinc metal alloy would form an intermetallic layer that includes at least copper, zinc, and tin. Intermetallic layer 140 can include a number of elements such as, but is not limited to, antimony, aluminum, arsenic, bismuth, cadmium, chromium, copper, hydrogen, iron, lead, magnesium, manganese, nickel, nitrogen, oxygen, silicon, silver, sulfur, tellurium, tin, titanium, zinc and/or small amounts of other elements or compounds depending on the composition of the metal strip, the corrosion resistant alloy, and the intermediate barrier metal layer (if used). Heat created intermetallic layer 140 can be thought of as a transition layer between metal strip 12 and corrosion resistant alloy coating 142. Heat created intermetallic layer 140 is believed to be at least partially responsible for the strong bond formed between corrosion resistant metal alloy layer 142 and metal strip 12. The heat created intermetallic layer also functions as a corrosion-resistant layer. Typically, the thickness of the heat created intermetallic layer is at least about 0.1 micron, and typically about 1–50 microns; however, thicker heat created intermetallic layers can be formed. The time needed to form the heat created intermetallic layer is typically less than about three minutes and generally less than about one minute; however, longer times can be used.

Figure 6:
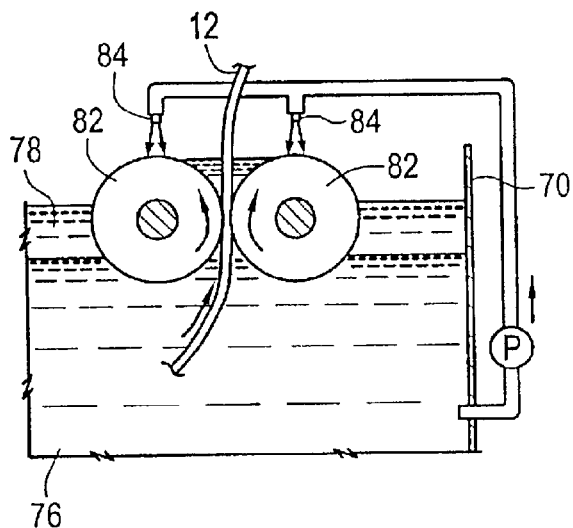
FIG. 6 illustrates a cross-sectional view of an alternative process of using metal spray jets during the hot dip coating process to coat the metal strip.

As shown in FIGS. 1B and 6, metal strip 12 passes between at least one set of coating rollers 82 upon exiting the molten metal alloy in melting pot 70. As best shown in FIG. 6, the coating rollers are partially immersed in protective material 78. As can be appreciated, the coating rollers can be completely immersed in the protective material or positioned above the protective material. Coating rollers 82 are spaced apart a sufficient distance so that metal strip 12 can pass between the coating rollers. The coating rollers 82 are designed to maintain a desired coating thickness of the metal alloy on metal strip 12, remove excess metal alloy 76 from metal strip 12, and/or coat any non-coated regions on the surface of the metal strip. The coating thickness of the metal alloy is selected to ensure that essentially no uncoated regions exist on the surface of the metal strip. Typically, the average thickness of the metal alloy on the surface of metal strip 12 is at least about 1 micron, and generally about 7 to 2550 microns. The coating thickness is typically selected to ensure the coated metal alloy has essentially no pin holes, and/or does not shear when formed into various products. The thickness of the metal alloy is selected depending on the environment in which the coated metal strip is to be used. A metal alloy coating thickness of about 25–51 microns forms a coating that prevents pin holes, provides greater elongation characteristics of the coating, and/or significantly reduces the corrosion of the metal strip in virtually all types of environments. Metal alloy coating thicknesses greater than about 51 microns are typically used in harsh environments to provide added corrosion protection.

Referring again to FIGS. 1B and 6, a metal spray process is shown wherein metal coating jets or spray jets 84 inject molten metal alloy 76 on the surface of coating rollers 82. As can be appreciated, metal coating jets 84 can in addition to or in the alternative direct molten metal alloy onto the surface of metal strip 12. The molten metal alloy that is spray jetted onto coating roller 82 is then pressed against metal strip 12 by coating rollers 82 as the metal strip 12 moves between the coating rollers thereby filling in any uncoated surface areas on metal strip 12 which were not coated as the metal strip passed through the molten alloy in melting pot 70. As can be appreciated, the metal spray process and/or the coating rollers can be used independently of the melting pot and/or be the sole coating process used to coat the metal alloy onto the metal strip.

Figure 7:
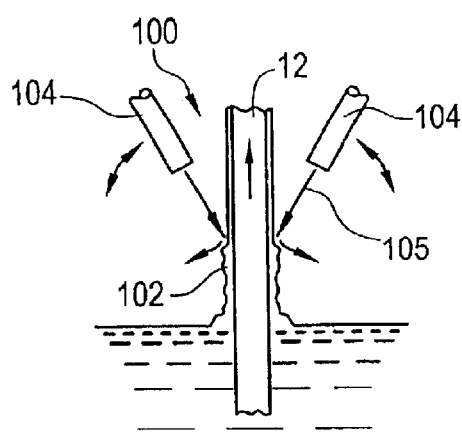
FIG. 7 illustrates a cross-sectional view of an alternative process of using an air-knife during the hot dip coating process to control the thickness of the coating on the metal strip.

Referring now to FIG. 7, an air-knife 100 directs a high velocity gas toward metal alloy coating 76 on metal strip 12 as the metal strip exits melting pot 70. The air knife includes at least one blast nozzle 104 that direct a high velocity gas onto the surface of the metal alloy on the metal strip. Typically, the air knife includes at least two blast nozzles 104 which are mutually opposed from each other and are disposed over melting pot 70. The blast nozzles direct high velocity gas 105 toward metal strip 12 and toward the surface of melting pot 70 as the metal strip moves by or between the blast nozzles. Generally, the blast nozzles are adjustable so as to direct the high velocity gas at various angles on to the surface of the metal strip. The high velocity gas removes surplus molten metal alloy coating 102 from the metal strip, smears the molten alloy on metal strip 12 to cover any uncoated regions, reduces the thickness of the metal alloy coating on the metal strip, reduces lumps or ribs in the metal alloy coating, and/or cools and/or hardens the metal alloy coating. The high velocity gas is typically an inert gas so as not to oxidize the molten metal alloy. Use of an inert gas also reduces dross formation on the metal alloy coating and/or acts as a protective barrier to the atmosphere which causes viscous oxides to form on the surface of the molten metal alloy in melting pot 70. When inert gas is used, the use of a protective material on the surface of the melting pot can be eliminated. Generally, the inert gas is, but is not limited to, nitrogen or an inert gas that is heavier than air (i.e. has a higher density than air). The blast nozzles are typically enclosed in a box shaped sleeve which accumulates at least a portion of the gas after the gas is directed toward the metal strip. The accumulated gas can then be recirculated back through the blast nozzles. When an air-knife is used to control the thickness and/or quality of the metal alloy coating, the air-knife is generally used as a substitute for or used in conjunction with coating rollers 82.

Referring now to FIG. 3, an alternative process for coating metal strip 12 with a corrosion resistant metal alloy is illustrated. Metal strip is shown to be coated with a corrosion resistant metal alloy by a continuous electroplating process. This coating process is a non-hot dip process in that a heat created intermetallic layer is not formed between the metal strip and metal alloy coating. Metal strip 12 is directed into electrolytic tank 44 and submerged in electrolyte 46. Metal strip 12 can be directed into electrolytic tank 44 immediately after being unrolled from metal roll 10; after being pretreated by one or more pretreatment processes; and/or after being coated with metal alloy by immersion, spray metal coating, and/or roller coating. As metal strip 12 passes through electrolytic tank 44, an electrical current is directed into electrolyte 46 by electrodes 48. The current through electrodes 48 is supplied by power source 49. The plating of the metal alloy onto the surface of the metal strip is typically effectuated by conventional electroplating processes. The metal alloy can be plated onto the surface of metal strip 12 by one or more plating operations. After the metal strip is plated, the metal strip is moved out of electrolytic tank 44. The average thickness of the plated corrosion resistant alloy is generally at least about 1 micron, and typically less than about 200 microns. Coating thickness of 2–77 microns, and generally 10–77 microns are typical coating thicknesses. After the metal strip exits electrolytic tank 44, the coated metal strip can be further treated by rinsing, pretreating, heating, coating with a metal alloy by a hot dip process, and/or post treatment.

When a heat created intermetallic layer is to be formed between the metal strip and the plated metal alloy coating, the plated metal alloy coating is heated. FIG. 4 illustrates one heating process used to form a heat created intermetallic layer between the metal strip and the plated metal alloy coating. Coated metal strip is continuously moved between two heaters 58. Heaters 58 cause the plated corrosion resistant metal alloy to soften and/or become molten. This process of heating the plated metal alloy is referred to as flow heating and constitutes another type of hot dip process. During the flow heating process, a heat created intermetallic layer is formed between the metal strip and metal alloy coating. The plated metal alloy is subjected to heat for a sufficient time period to form a heat created intermetallic layer having a desired thickness. As can be appreciated, the heating process can occur in a single or in a multiple stage process. Furthermore, the heating process can be designed to heat a part of or the complete coated region on the metal strip. After the metal strip is flow heated, the metal alloy coating can be further modified by a process such as, but not limited to, controlling the coating thicknesses by an air-knife process and/or a coating roller process, and/or coating additional layers of metal alloy by additional coating process such as, but not limited to, a plating process, a metal spray process, a coating roller process, and/or an immersion process.

Figure 8:
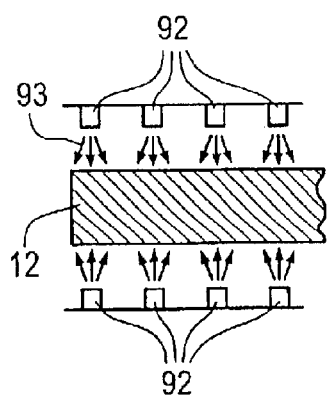
FIG. 8 illustrates a cross-sectional view of an alternative process of cooling the hot dip metal alloy coated base metal by spray jets.
Figure 10:
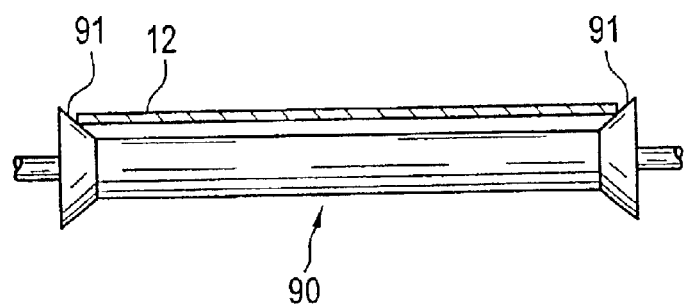
FIG. 10 is a frontal view of a camel-back guide.

After metal strip 12 is coated with a corrosion resistant alloy, the coated metal strip is cooled and/or rinsed. A coated metal strip that is plated as it moves through an electrolyte solution is typically rinsed off to remove electrolyte solution remaining on the surface of the coated metal strip. A coated metal strip that is coated by a hotdip process is typically cooled to reduce the temperature and/or harden the metal alloy coating. Referring to FIGS. 1B, 8 and 10, the coated metal strip is cooled by applying a cooling fluid 93 on the coated metal strip by at least one spray jet 92. Typically, the cooling fluid is, but not limited to, water maintained at about ambient temperature. The velocity of the cooling fluid can be varied to obtain the desired cooling rate and/or rinsing effect of the corrosion resistant metal alloy. As illustrated in FIGS. 1B and 10, metal strip 12 is guided by camel-back guides 90 during the cooling process. Camel-back guide 90 is designed such that it has two receding edges 91 formed by conical surfaces which contact only the edges of metal strip 12 so as to minimize the removal of the metal alloy coating from metal strip 12. Alternatively or in addition to the spray cooling process, the coated metal strip can be cooled in a cooling tank 94 as illustrated in FIG. 5. The coated metal strip is partially or fully immersed in the cooling fluid 96 to cool and/or rinse the coated metal strip. Typically, the cooling fluid is, but not limited to, water maintained at about ambient temperature. The cooling fluid is also typically agitated to increase the rate of cooling of the metal alloy coating, and/or maintain a relatively uniform cooling fluid temperature. The temperature of the cooling water is typically maintained at proper cooling temperatures by recycling the water through heat exchangers and/or replenishing the cooling fluid. The cooling water may not be deoxygenated prior to cooling the coated metal strip coating so as to slightly discolor the metal alloy coating and/or reduce the reflectiveness of the metal alloy coating. Immersion of the coated metal strip in cooling fluid 96 generally results in a faster cooling rate than cooling by spray jets 92. Rapid cooling of the corrosion resistant metal alloy generally produces a metal alloy coating having fine grain size with increased grain density. In addition, cooling of the metal alloy coating in water results in some oxidation of the metal alloy coating surface which forms a less-reflective surface. The cooling period for cooling coated metal strip 12 by cooling jets 92 or by immersion in cooling tank 94 is generally less than about two minutes, and typically about 10–30 seconds.

After the coated metal strip is cooled, the coated metal strip may be rolled into a metal roll, partially or totally formed into various shapes (i.e. roofing materials, building materials, household parts, automotive parts, etc.), oxidized to partially or fully expose the heat created intermetallic layer, and/or passify the heat created intermetallic layer prior to the coated metal strip being rolled, cut into sheets and/or formed.

Figure 15:
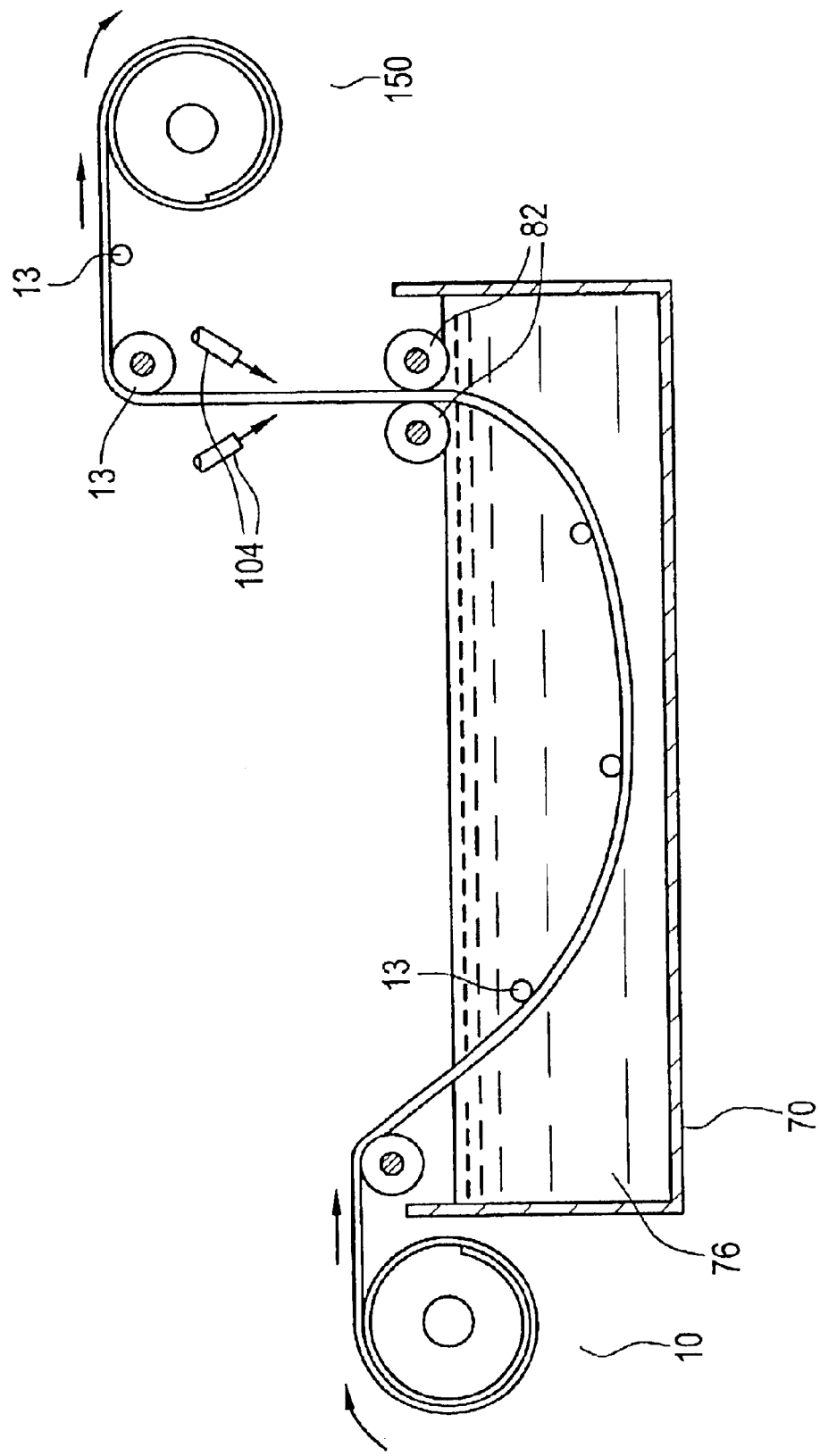
FIG. 15 illustrates a cross-sectional view of an alternative process of coating abase metal by a hot dip process wherein a base metal strip is unrolled and coated by immersing the metal strip in a molten pot of molten alloy and then subjecting the metal strip to coating rollers and an air-knife process and then rolling the coated metal strip into a coil.

As illustrated in FIG. 15, the metal strip is unrolled and immediately directed into a molten bath of metal alloy without any prior pretreatment processes. Upon exiting the molten metal bath, the metal strip passes between coating rollers and is then subjected to an air-knife process to control the coating thickness and coat the uncoated regions on the metal strip surface. The air-knife also cools and hardens the metal alloy coating so that the coated metal strip can be immediately rolled into a metal roll 150.

As illustrated in FIG. 2, the coated metal strip can be further processed prior to being rolled into a metal roll 150 or cut in to sheets 130. This further processing includes, but is not limited to, leveling, shearing, oxidizing the coated corrosion resistant alloy, passifying the metal alloy and/or forming a heat created intermetallic layer, applying weathering agents, applying paints, applying sealants, etc. As shown in FIG. 2, the coated metal strip is subjected to a leveler 100. Leveler 100 includes several rollers 102 which produce a uniform and smooth corrosion resistant alloy coating 142 on metal strip 12. After metal strip 12 exits leveler 100, metal strip 12 is illustrated as being cut into sheets 130 by shear 111. The coated metal sheets or strip can be further processed by applying a paint, sealant or weathering agent on the surface of the coated metal sheets or strip. The paint, sealant or weathering agent 112 can be applied to a portion of or the full surface of the coated metal alloy. The paint, sealant or weathering agent can be applied by coaters 114 and/or by sprayers 116. A reservoir 110 holds the paint, sealant or weathering agent for coaters 114 and/or sprayers 116. After the paint, sealant or weathering agent is applied, it is dried by heat lamp 120 and/or by a dryer 122.

When a weathering agent is applied to the coated metal strip, the weathering agent is used to accelerate the patina formation on the metal alloy coating. This process is generally used to discolor the metal alloy and/or reduce the reflectiveness of the metal alloy. The natural weathering of the metal alloy can take, in some instances, over ten years to weather to the desired degree. The weathering agent is formulated to reduce the time period of weathering. In one formulation, the weathering agent is typically a petroleum based product. Generally, the petroleum based weathering agent is an asphalt based paint containing a suspension of free carbon and a thinner. When this formulation is used, a thin film or coating of weathering agent is applied to the surface of the metal alloy and the ultraviolet light from the atmosphere facilitates in accelerating the weathering of the metal alloy. Generally, the thin layer of weathering agent is a semi-transparent or translucent coating and at least partially allows the metal alloy to be exposed to oxygen, moisture and to the sun's radiation. The weathering agent can include, but is not limited to, asphalt, titanium dioxide, inert silicates and low clay, carbon black (lampblack) or other free carbon and an anti-settling agent The asphalt makeup of the weathering agent is typically about 60% to 80% by weight of the weathering agent, typically about 64% to 78% by weight of the weathering agent, and more typically about 68% by weight of the weathering agent. The amount of titanium oxide in the weathering agent is about 1% to 25% by weight of the weathering agent, and typically about 19% by weight of the weathering agent. Typically, over 50% of the titanium oxide is anatase grade. When carbon black is added to the weathering agent, the carbon black is present in an amount of up to about 2% by weight of the weathering agent, typically about 0.5 to 1% by weight of the weathering agent, and more typically about 0.7% by weight of the weathering agent. The inert silicates and/or low clay, such as, but not limited to calcium borosilicate, when added to the weathering agent, is present in an amount of about 8–11% by weight of the weathering agent. The antisettling agent, when added to the weathering agent, is present in an amount of about 0.4–0.7% by weight of the weathering agent, and typically about 0.5% by weight of the weathering agent. One specific formulation of the weathering agent includes about 60–80 weight percent asphalt, about 1–25 weight percent titanium oxide, about 8–11 weight percent inert silicates and clay, about 0.5–2 weight percent carbon black, about 0.4–0.7 weight percent anti-settling agent, and solvent. Another specific formulation of the weathering agent includes 65–75 weight percent gilsonite, 15–20 weight percent titanium oxide, 8–11 weight percent calcium borosilicate, 0.5–1 weight percent carbon black, 0.4–0.6 weight percent anti-settling agent, and solvent. Still another specific formulation of the weathering agent includes 64–78 weight percent gilsonite, 11.68–20.5 weight percent titanium oxide, 8.4–10.3 weight percent inert silicates and clay, 0.63–0.77 weight percent carbon black, 0.4–0.52 weight percent anti-settling agent, and solvent. Yet another specific formulation of the weathering agent includes 70.86 weight percent gilsonite, 18.65 weight percent titanium oxide, 9.32 weight percent calcium borosilicate, 0.7 weight percent carbon black, 0.47 weight percent anti-settling agent, and solvent. A solvent such as, but not limited to, naphthalene and/or paint thinners, is used to thin the weathering agent so that a thin, translucent or semi-translucent film can be formed on the surface of the metal alloy. The thickness of the weather agent layer is generally less than about 123 mils, more typically about 6–123 microns, even more typically up to about 50 microns, yet even more typically up to about 25 microns, and still more typically about 12–25 microns. The color of the weathering agent is a dull, lackluster color which has low reflective properties. As a result, the weathering agent accelerates the patina formation on the metal alloy coating and reduces the reflective properties of the newly applied or formed metal alloy. Another type of weathering agent which can be used is disclosed in U.S. Pat. No. 5,296,300, which is incorporated herein.

Figure 13:
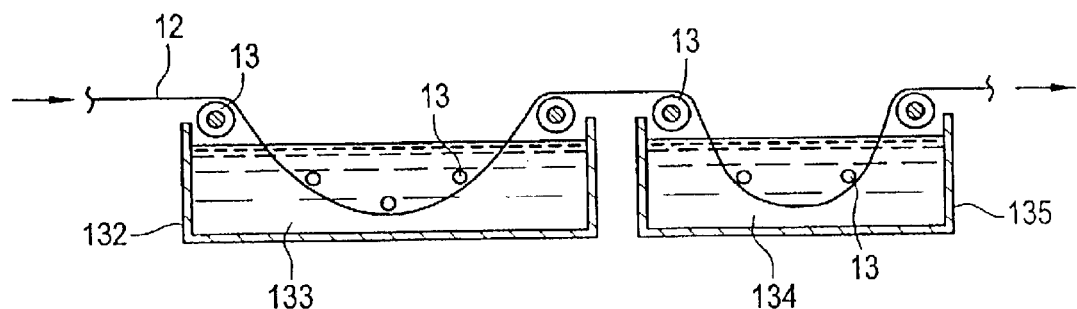
FIG. 13 illustrates a cross-sectional view of an alternative process of using an oxidation process and rinse process to at least partially remove the metal alloy coating from the base metal to at least partially expose the heat created intermetallic layer.

Metal strip 12 can be oxidized to partially or fully expose the heat created intermetallic layer prior to or subsequent to the coated metal strip being rolled into a metal roll, cut into sheets of strip, and/or formed into various shapes. To expose the heat created intermetallic layer, the coated metal alloy can be ground off and/or chemically removed. Typically the metal alloy coating is chemically removed by an oxidizing solution. As shown in FIG. 13, coated metal strip is immersed in oxidizing solution 133 in oxidizing tank 132. The oxidizing solution is formulated to at least partially remove the metal alloy coating from metal strip 12 thereby at least partially exposing heat created intermetallic layer 140. The intermetallic layer has been found to be an excellent corrosion resistant layer. The oxidizing tank 132 typically includes an agitator to prevent or reduce stagnation and/or vast concentration differences of the oxidizing solution in the tank, prevent or reduce gas bubbles from forming on the surface of metal strip 12, and/or maintain a substantially uniform temperature in the oxidizing solution. The oxidizing solution typically includes an acid such as, but not limited to, nitric acid. When nitric acid is included in the oxidation solution, the nitric acid concentration is generally about 5%–60% by volume, typically about 10–25% by volume, more typically about 25% by volume, and even more typically about 20% by volume. Copper sulfate is generally added to the acid in the oxidizing solution to improve the oxidation of the metal alloy coating. Copper sulfate, when present, is generally added in a concentration of less than about 10% by volume, typically about 0.5–2% by volume, and more typically about 1% by volume. The temperature of the oxidizing solution is maintained at a temperature that provides sufficient activity of the oxidizing solution. Generally, the temperature is maintained between about 20–80° C. (68–176° F.), typically about 30–80° C. (86–176° F.), more typically about 40–60° C. (104–140° F.), and more typically about 50° C. (172° F.). By increasing the concentration and/or temperature of the oxidation solution, the time needed to at least partially remove the metal alloy coating 76 is shortened. The amount of time to remove the desired amount of the metal alloy coating is generally less than about ten minutes, typically less than about two minutes, more typically about 0.08–1.5 minutes, and even more typically about 0.33 minutes; however, longer times can be used. The exposed heat created intermetallic layer is typically has a dark grey, non-reflective surface. As can be appreciated, the oxidation solution can be applied to the coated metal strip after or just prior to the metal strip being formed and/or installed. In this instance, the oxidizing solution can be swabbed or sprayed onto the surface of the coated metal strip.

Once the desired amount of metal alloy coating is removed, the exposed heat created intermetallic layer is typically passivated to enhance the corrosion-resistance of the intermetallic layer. The intermetallic layer is generally passivated by a passivating solution. One type of passivating solution includes a nitrogen containing solution and/or a chromium solution such as, but not limited to, nitric acid and/or chromate acid. The passivation solution can be the same as or different from the oxidizing solution. When chromate acid is included in the passivation solution, the concentration of chromate acid is generally about 0.5–5 g/liter. Phosphate can be added to the passivation solution to enhance the passivation of the metal alloy. When the passivation solution and the oxidizing solution are the same, the removal of metal alloy coating and passivation of the heat created intermetallic layer can both be accomplished in a single tank. In a single tank arrangement, the passivation solution and the oxidizing solution are formulated such that when the heat created intermetallic layer is exposed and then passified, the passivated layer is not removed or very slowly removed by the passivation solution and the oxidizing solution, thus making the oxidation and passivation process autocatalytic or semi-autocatalytic. As illustrated in FIG. 13, metal strip 13 is directed into a passivation tank 135 after being oxidized in oxidation tank 132. The passivation tank 132 typically includes an agitator to prevent or reduce stagnation and/or vast concentration differences of the passivation solution in the tank, prevent or reduce gas bubbles from forming on the surface of metal strip 12, and/or maintain a substantially uniform temperature for the passivation solution. The temperature of the passivation solution is maintained at a temperature that provides sufficient activity of the passivation solution. Generally, the temperature of the passivation solution is maintained between about 15–80° C. (59–176° F.), and typically about 40–60° C. (104–140° F.). By increasing the concentration and/or temperature of the passivation solution, the time needed to at least partially passivate the exposed heat created intermetallic layer is shortened. The amount of, time to passivate the heat created intermetallic layer is generally less than about ten minutes, and typically about 0.02–1.5 minutes; however, longer times can be used.

Figure 14:
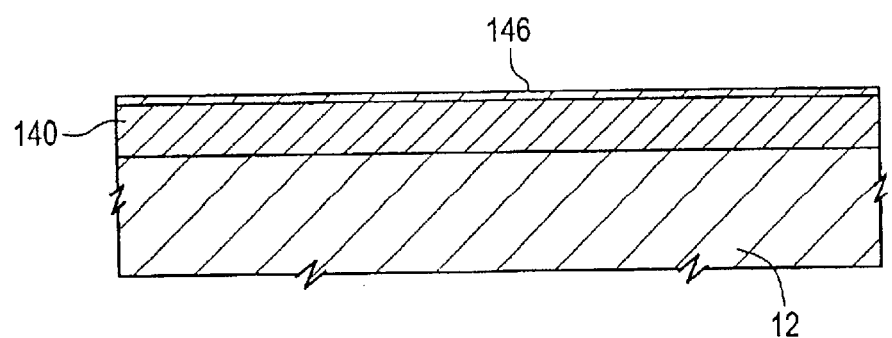
FIG. 14 is a cross-sectional view of a coated metal strip having a heat-created intermetallic layer and passivated surface layer.

Referring now to FIG. 14, passivation layer 146 is a very thin layer. Generally, the thickness of the passivation layer is less than about 13 microns, typically less than about 3 microns, and more typically up to about 1.5 microns. The passivation layer facilitates in inhibiting or preventing oxidation (i.e. white rust) of the outer metal layer. The passivation layer 146 significantly enhances the corrosion-resistance of the intermetallic layer 142. Although it is not entirely known how passivation layer 148 exhibits increased corrosion resistance, it is believed that a unique covalently bonded system is formed when the intermetallic layer is passified. When the intermetallic layer 142 is passified with passivation solution 162, a chemical reaction is believed to occur to modify the atomic structure of passivation layer 146. Other elements such as, but not limited to, nitrogen, hydrogen, oxygen may also be present in passivation layer 146 to enhance the stability of passivation layer 146. The special formulation of the intermetallic layer 142 in combination with the passivation layer 146 provides for superior corrosion resistance for metal strip 12. Passivation layer 146 is also malleable and will not crack when formed into various shapes. Passivation layer 146 is generally a grey, earth tone color non-reflective surface. Passivation layer 146 displays increased corrosion resistance, abrasion resistance, and increased hardness as compared to the heat created intermetallic layer. Heat created intermetallic layer 142 and passivation layer 146 are also resistant to scratching thereby improving the visual quality of metal strip 12 and enhancing the damage resistance of metal strip 12. The relative non-existence of lead in intermetallic layer 142 and passivated layer, especially when low lead metal alloys are used, makes the passivated metal strip a superior substitute to terne coated materials. Not only is the corrosion resistance of the intermetallic layer and passivated layer greater than terne coatings, the intermetallic layer and the passivated layer contain little, if any, lead thereby alleviating any concerns associated with the use of lead materials.

After metal strip 12 is oxidized or passified, metal strip 12 is typically rinsed to remove any oxidation solution or passivation solution remaining of the metal strip. The rinse process can be performed by liquid spray jets and/or immersion of the metal strip in a tank that contains a rinse solution. Typically, the rinse liquid is about ambient temperature. The rinse tank, when used, typically includes an agitator to assist in the removal of the oxidizing solution and/or passivation solution from metal strip 12. Once the rinse process is complete, the metal strip is rolled into strip roll 150, cut into sheets 130, preformed to various articles, and/or painted or sealed.

Referring now to FIGS. 16–18, a fuel tank is formed from coated metal strip 12. Fuel tank 160 is made up of two shell members 162 and 164. The shell members are each shaped in a die by placing the coated metal strip or a section thereof on a die and drawing the coated metal strip over the die. The shells are typically formed in a cylindrical shape and each have a peripheral edge 166; however, other shapes can be formed. The two shells are joined together at the respective peripheral edges to form an inner fuel receiving chamber 168 wherein the fuel is stored within the tank. Fuel tank 160 also contains a spout 170 which communicates with interior chamber 168 of the fuel tank so that the fuel can be inserted into the inner chamber. Typically, the spout is inserted at the top portion of shell 162 for easy insertion of the fuel into the tank; however, the spout can be located in other areas. Fuel tank 160 also contains a drain hole 172 which communicates with the interior of the fuel tank chamber with the fuel system of the motor vehicle. Typically, drain hole 172 is located at the top of the fuel tank on shell 162; however, the drain hole can be located in other areas. A fuel pump can be located in the inner chamber of the fuel tank to pump the fuel through the vehicle's fuel system.

As illustrated in FIG. 18, shell members 162 and 164 are joined together by abutting and connecting together peripheral edges 166 of the respective shell members. Typically, the peripheral edges are connected together a weld or solder 180. Spout 170 and drain hole 172 are also connected to the shell member typically by a weld or solder. Generally, the weld or solder is essentially lead-free so as not to add any lead to the fuel tank. Each shell member includes a corrosion resistant metal alloy coating 186 and an inner corrosion resistant metal alloy coating 188, both of which having substantially the same thickness. When the coated metal strip is drawn over the die, the corrosion resistant metal alloy coating 186,188 becomes elongated about the peripheral edge corner 190. When corrosion resistant metal alloy coating is elongated, the corrosion resistant metal alloy coating reduces in thickness. If the corrosion resistant alloy coating is too thin, the alloy coating will tear or shear and expose the unprotected surface of metal strip 12. Typically, the thickness of the corrosion resistant metal alloy coating is at least about 25 microns so that as the metal alloy coating can be elongated and shaped by the die without shearing and exposing the surface of the metal strip.

Figure 19:
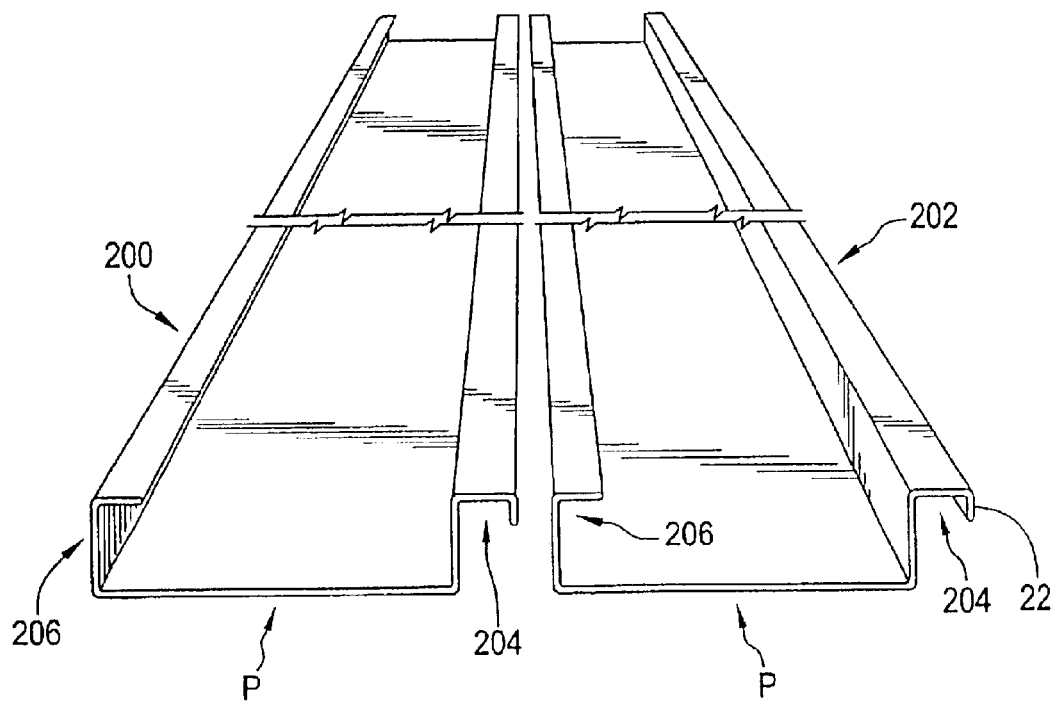
FIG. 19 is a perspective view of a pair of adjacent roofing panels formed from the metal alloy or base metal coated with the alloy of the present invention.
Figure 20:
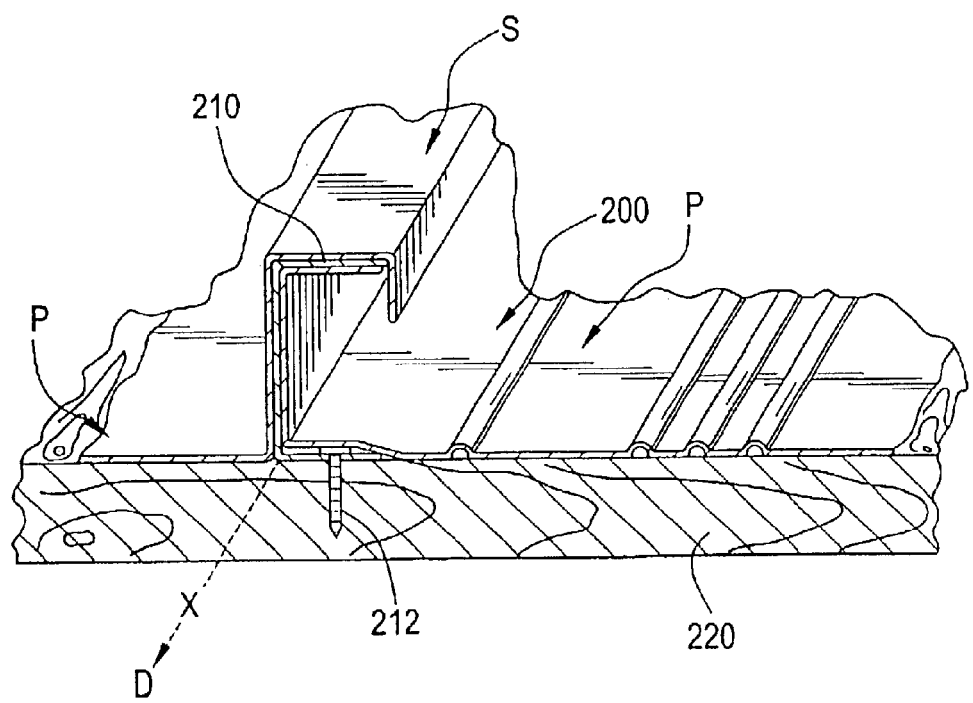
FIG. 20 is a cross-sectional view showing the initial assembly of the roofing panels of FIG. 19.

Referring now to FIGS. 19–20, building materials such as roofing panels are formed from the coated metal strip. Roofing panels P are joined together by an elongated standing seam S. Roofing panels P are formed on site or preformed in the shape of elongated pans as shown in FIG. 19. Pans 200 and 202 have substantially similar features. Both pans have a right edge portion 204 and a left edge portion 206. As shown in FIG. 20, pans 202 and 204 are adjacently positioned together to define the elongated direction D lying along base line X. A cleat 210 is used to form seal S. Nails 212 maintain the pans on roof 220 while seam S is formed. In standing seam applications, the edges of the roofing materials are folded together and then soldered to form a water tight seal. The metal alloy coating inherently includes excellent soldering characteristics. The metal alloy coating can be also welded or soldered. Typical solders contain about 50% tin and about 50% lead. The metal alloy has the added advantage of being solderable with low or no-lead solders. The roofing materials can be used in mechanically joined roofing systems due to the malleability of the metal alloy. Mechanically joined systems form water tight seals by folding adjacent roof material edges together and subsequently applying a compressive force to the seam in excess of about 1,000 psi. Under these high pressures, the metal alloy plastically deforms within the seam and produces a water tight seal. This type of roofing system is disclosed in U.S. Pat. Nos. 4,934,120; 4,982,543; 4,987,716; 4,934,120; 5,001,881; 5,022,203; 5,259,166; and 5,301,474, which are incorporated herein by reference.

Figure 21:
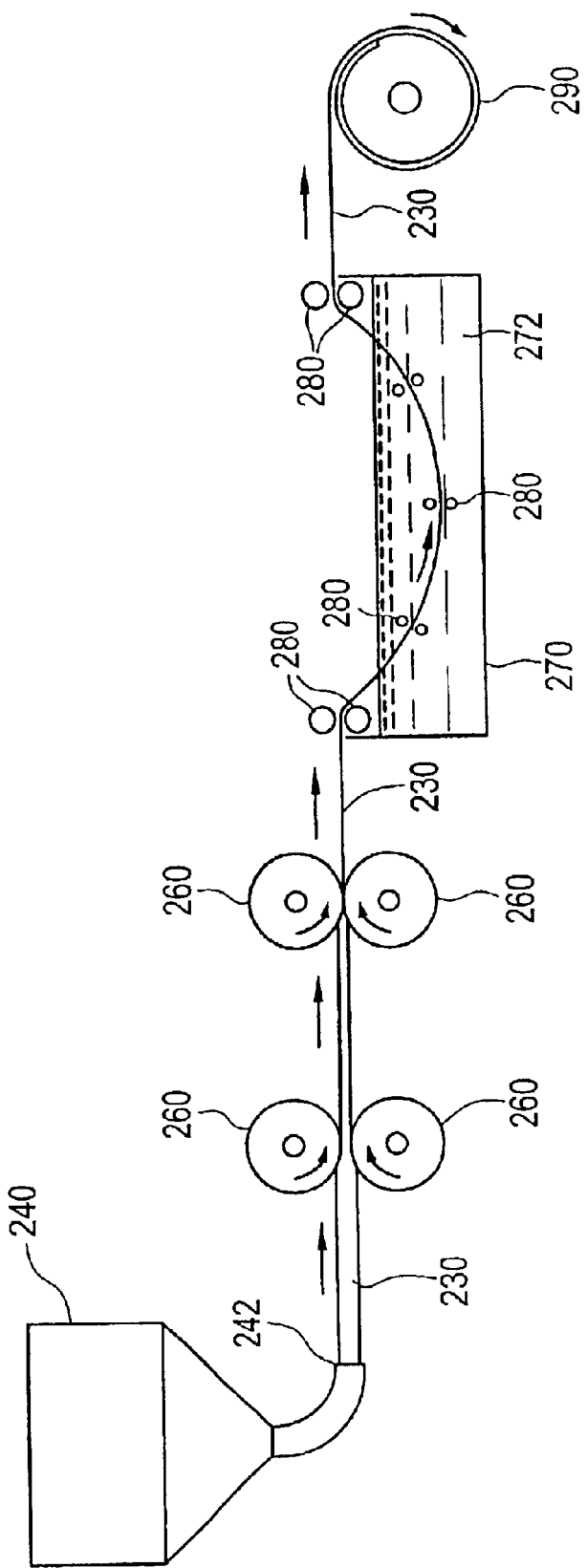
FIG. 21 is a cross-sectional view of the process of roll forming the metal alloy of the present invention into a metal alloy strip.

Referring now to FIG. 21, a corrosion resistant metal alloy is formed into a metal alloy strip 230 by a roll forming process. As can be appreciated, the metal alloy can alternatively be formed into a wire, a tube, or molded or cast into other shapes. Ingots of tin or tin and zinc are placed into the melting pot 240 wherein the tin or the tin and zinc ingots are melted. The molten metal alloy is maintained above its melting point in the melting pot. Other metals such as, but not limited to, iron, nickel, aluminum, titanium, copper, manganese, bismuth, antimony can be added into the melting pot to alter the composition of the metal alloy. The inclusion of these other metals typically alters the melting point of the metal alloy. In order to accommodate for the high melting temperature of the metal alloy, the melting pot is made of materials to withstand these higher temperatures. Once the metal alloy is properly mixed and melted in melting pot 240, the molten alloy is allowed to flow out of the bottom of the melting pot through pot opening 242. The molten metal alloy 230 is then directed through one or more sets of rollers 260 until the desired thickness of the metal alloy sheet or strip is obtained. The process of roll forming metal strip is well known in the art, thus further details as to the forming of the metal alloy strip 230 will not be discussed.

The thickness of the formed metal alloy strip 230 is typically less than about 5080 microns Once metal alloy strip 230 has passed through rollers 260, metal alloy strip 230 may be further processed, such as by a pretreatment processes, a coating process, and/or a post coating process as discussed above.

As shown in FIG. 21, metal alloy strip 230 is directed into a passivation tank 270. Passivation tank 270 includes a passivation solution 272. The passivation solution is typically the same passivation solution as described above. As the metal alloy strip is directed into passivation tank 270, guide rollers 280 guide the metal alloy strip. The passivation solution reacts with the surface of the metal alloy strip to form a passivation layer which is highly corrosion resistant. The passivation solution also causes the surface of the metal strip to change colors. The passivation tank generally includes an agitator to prevent or inhibit stagnation and/or vast concentration differences of the passivation solution in the passivation tank.

After metal alloy strip 230 passes through the passivation tank, the metal alloy strip typically proceeds to a rinsing process, not shown, to remove passivation solution remaining on the metal alloy strip. Generally, the passivation solution is removed by passing the metal alloy strip through a rinse tank and/or by spraying the metal alloy strip with a rinse fluid.

As shown in FIG. 21, after metal alloy strip is passivated, the strip is rolled into a roll 290 of metal alloy strip.

As can be appreciated, the molten metal alloy can be formed into a wire or tube. Such wire or tube can be used for pipes, wire, cable, solder or welding wire. When the metal alloy is formed into a solder or welding wire, the metal alloy is generally not passivated. The solder or welding wire has been found to form a strong bond with the metal materials and has excellent wetting properties to create a high quality bond. The solder also has good conductive properties so that it can be used to form electrical connections. The types of base metals which can be soldered by the metal alloy include, but are not limited to, carbon steel, stainless steel, copper, copper alloys, aluminum, aluminum alloys, nickel alloys, tin, titanium, titanium alloys. Materials coated with tin, tin metal alloys, zinc, zinc alloys, tin and zinc metal alloys, lead, lead and tin alloys, and various other metals can also be soldered or welded by the metal alloy. The metal alloy strip can also be formed into roofing materials and/or gasoline tanks, as described above, or a variety of components.

The corrosion resistant metal alloy is a tin metal alloy or a tin and zinc metal alloy. Both of these metal alloys exhibit excellent bonding and corrosion resistant properties when applied to a metal strip by a hot dip process or by a plating process.

The tin metal alloy is formulated to include at least a majority of tin. Generally, the tin metal alloy includes at least about 75 weight percent tin, typically at least about 90 weight percent tin, more typically at least about 95 weight percent tin, even more typically at least about 98 weight percent tin, and still even more typically at least about 99 weight percent tin. The high percentage of tin in the tin metal alloy is substantially different from standard terne alloy formulations which contain about 80% lead and 20% tin. The high concentration of tin in the tin metal alloy increases the uniformity and strength of the bond between the tin metal alloy and many types of metal strip 12 as compared with standard terne alloy coatings. The superior bonding characteristics of the tin metal alloy makes the tin metal alloy coating ideal for use with many different types of metal strip compositions, and can be formed in a variety of simple and complex shapes. Industrial grade tin typically is used as the tin source for the tin metal alloy; however, other sources of the tin can be used. Industrial grade tin typically contains trace amounts of impurities such as, but not limited to, cobalt, nickel, silver and sulphur. It has been found that these elements in controlled amounts do not adversely affect the corrosive resistive properties of the tin metal alloy. Indeed, elements such as, but not limited to, nickel can enhance some properties of the tin alloy.

The tin and zinc metal alloy is a special combination of tin and zinc. The tin and zinc metal alloy is formulated to include at least about 9–10 weight percent zinc and at least about 15 weight percent tin. It has been found that the addition of zinc in the amount of at least about 9–10 weight percent of the tin and zinc metal alloy produces a metal alloy having enhanced corrosion-resistance in various types of environments. The tin content of the tin and zinc metal alloy is generally about 15–90 weight percent. The zinc content of the alloy is generally about 9 to 10–85 weight percent. The tin plus zinc content of the tin and zinc metal alloy typically constitutes at least a majority of the tin and zinc metal alloy. Typically, the tin plus zinc content of the tin and zinc metal alloy constitutes at least about 75 weight percent tin and zinc, more typically at least about 80 weight percent tin and zinc, even more typically at least about 90 weight percent tin and zinc, still even more typically at least about 95 weight percent tin and zinc, yet still even more typically at least about 98 weight percent tin and zinc, and yet still even more typically at least about 99 weight percent tin and zinc. The tin and zinc formulation oxidizes to form a colored coating which closely resembles the popular grey, earth-tone color of weathered terne. The use of large weight percentages of zinc in the tin and zinc metal alloy does not cause the coating to become too rigid or too brittle. The tin and zinc metal alloy is formable thus can be bent into simple or complex shapes without cracking or breaking. The malleability of tin and zinc metal alloy is believed to be at partially the result of the unique tin and zinc distributions within the tin and zinc metal alloy. The tin and zinc form a two phase matrix wherein zinc globules are surrounded by tin. Zinc facilitates in stabilizing the tin in the tin and zinc metal alloy so as to inhibit or prevent tin crystallization in the tin and zinc alloy. When determining the composition of the tin and zinc metal alloy, the environment the coating is to be used in should be considered. In some situations, a higher tin concentration may be beneficial to limit the amount of zinc rich globules in the tin and zinc metal alloy. In other environments, the reverse may be true.

The tin metal alloy or the tin and zinc metal alloy typically contains one or more additives without adversely affecting the tin metal alloy or the tin and zinc metal alloy. The additives are included and/or added to tin metal alloy or the tin and zinc metal alloy to modify the mechanical properties of the metal alloy, the corrosion-resistance of the metal alloy, the color of the corrosion resistant metal alloy, the stability of the metal alloy, and/or the coating properties of the metal alloy. The additive(s) generally constitute less than about 25 weight percent of the metal alloy. Typically, the additive(s) constitute less than about 10 weight percent of the metal alloy. The content of the additives is controlled so that the additives properly mix with the metal alloy. The proper mixing of the additives in the metal alloy is of greater importance for a tin and zinc metal alloy wherein the tin and zinc form a special two phase matrix. Typically, the additives are added to a tin and zinc alloy in a manner that maintains the two phase matrix of the tin and zinc so as not to form a tin and zinc alloy having more than two phases or which disrupts the tin and zinc matrix.

The tin metal alloy typically includes at least an effective amount of one or more stabilizing additives to inhibit or prevent the tin from crystallizing. Tin and zinc metal alloys can also include stabilizing additives. Tin can begin to crystallize when the temperature drops below about 13° C. (55.4° F.). Crystallization of the tin in the alloy can weaken the bond between the metal strip and the metal alloy and can result in flaking of the metal alloy from the metal strip. The addition of small amounts of stabilizing metals such as, but not limited to, antimony, bismuth, cadmium, copper, zinc and mixtures thereof prevent and/or inhibit the crystallization of the tin in the metal alloy. Only small amounts of antimony, bismuth, cadmium and/or copper are needed to stabilize the tin in the metal alloy and inhibit and/or prevent the tin from crystallizing. Amounts of at least about 0.001–0.01 weight percent of the metal alloy are generally sufficient to inhibit or prevent tin crystallization. Typically, the one or more stabilizers are included in an amount of at least about 0.001–0.005 weight percent of the metal alloy to inhibit crystallization of the tin.

The tin metal alloy or tin and zinc metal alloy can include other additives to alter and/or enhance one or more properties of the metal alloy. The metal alloy can include at least an effective amount of corrosion-resistant agent to enhance the corrosion-resistant properties of the metal alloy. The corrosion-resistant agent includes, but is not limited to, antimony, bismuth, cadmium, chromium, copper, lead, manganese, magnesium, nickel, titanium and/or zinc. The metal alloy can include at least an effective amount of coloring agent to alter the color of the metal alloy. The coloring agent includes, but is not limited to, cadmium, copper, iron, lead, silver and/or titanium. The metal alloy can include at least an effective amount of reflective agent to positively alter the reflectiveness of said metal alloy. The reflective agent includes, but is not limited to, aluminum, cadmium, chromium, copper, silver and/or titanium. A metal alloy which includes a sufficient amount of coloring agents and/or reflective agent may not be required to be weathered prior to use in certain applications. The metal alloy can include at least an effective amount of grain agent to positively alter the grain density of the metal alloy. The grain agent includes, but is not limited to, cadmium manganese and/or titanium. The metal alloy can include at least an effective amount of mechanical agent to positively alter the mechanical properties of the metal alloy. The mechanical properties of the metal alloy include, but are not limited to, the strength of the metal alloy, the hardness of the metal alloy, the pliability of the metal alloy, the elongation of the metal alloy, the tensile strength of the metal alloy, the elasticity of the metal alloy, the rigidity of the metal alloy, the conductivity of the metal alloy, the heat transfer properties of the metal alloy, etc. The mechanical agent includes, but is not limited to, aluminum, antimony, arsenic, bismuth, cadmium, chromium, copper, iron, lead, magnesium, manganese, nickel, silver, titanium and/or zinc. The metal alloy can include at least an effective amount of deoxidizing agent to reduce the amount of oxidation of the metal alloy in a molten state. The deoxidizing agent includes, but is not limited to, aluminum, cadmium, magnesium, manganese and/or titanium. The metal alloy can include at least an effective amount of bonding agent to enhance the bonding properties of the metal alloy to the metal strip and/or intermediate barrier metal layer. The bonding agent includes, but is not limited to, cadmium, lead, manganese, titanium and/or zinc.

Aluminum, if added to and/or included in the metal alloy, is generally present in amounts up to about 5 weight percent of the metal alloy; however, higher weight percentages can be used. In several aspects of the present invention, the aluminum content of the metal alloy is a) up to about 2 weight percent of the metal alloy, b) up to about 1 weight percent of the metal alloy, c) up to about 0.75 weight percent of the metal alloy, d) up to about 0.5 weight percent of the metal alloy, f) up to about 0.4 weight percent of the metal alloy, g) up to about 0.3 weight percent of the metal alloy, h) up to about 0.25 weight percent of the metal alloy, i) at least about 0.05 weight percent of the metal alloy, j) about 0.1–1 weight percent of the metal alloy, k) about 0.1–0.5 weight percent of the metal alloy, l) about 0.1–0.3 weight percent of the metal alloy, m) about 0.01–1 weight percent of the metal alloy, n) about 0.01–0.5 weight percent of the metal alloy, o) about 0.01–0.3 weight percent of the metal alloy, p) about 0.01–0.1 weight percent of the metal alloy, q) about 0.0005–0.75 weight percent of the metal alloy, r) about 0.001–0.5 weight percent of the metal alloy, s) about 0.001–0.4 weight percent of the metal alloy, t) about 0.002–0.4 weight percent of the metal alloy, u) about 0.001–0.4 weight percent of the metal alloy, v) about 0.001–0.01 weight percent of the metal alloy, and w) about 0.0001–0.005 weight percent of the metal alloy, x) about 0.001–0.005 weight percent of the metal alloy, or y) less than about 0.001 weight percent of the metal alloy. When aluminum is added to the metal alloy, the aluminum is typically added in the form of an alloy such as, but not limited to, Al—Cu—Mg alloy.

Antimony, if added to and/or included in the alloy, is generally present in amounts up to about 7.5 weight percent of the metal alloy; however, higher weight percentages can be used. In several aspects of the present invention, the antimony content of the metal alloy is a) up to about 5.5 weight percent of the metal alloy, b) up to about 2.5 weight percent of the metal alloy, c) up to about 2 weight percent of the metal alloy, d) up to about 1 weight percent of the metal alloy, e) up to about 0.75 weight percent of the metal alloy, f) up to about 0.5 weight percent of the metal alloy, g) about 0.001–1 weight percent of the metal alloy, h) about 0.005–0.8 weight percent of the metal alloy, i) about 0.01–0.8 weight percent of the metal alloy, j) about 0.01–0.5 weight percent of the metal alloy, or k) about 0.05–0.5 weight percent of the metal alloy.

Bismuth, if added to and/or included in the metal alloy, is generally present in amounts up to about 1.7 weight percent of the metal alloy; however, higher weight percentages can be used. In several aspects of the present invention, the bismuth content of the metal alloy is a) up to about 1 weight percent of the metal alloy b) up to about 0.5 weight percent of the metal alloy, c) up to about 0.01 weight percent of the metal alloy, d) about 0.0001–0.5 weight percent of the metal alloy, e) about 0.05–0.5 weight percent of the metal alloy, f) about 0.0001–0.2 weight percent of the metal alloy, g) about 0.002–0.1 weight percent of the metal alloy, or h) about 0.001–0.01 weight percent of the metal alloy.

Cadmium, if added and/or included in the metal alloy, is present in amounts of up to about 0.5 weight percent of the metal alloy; however, higher weight percentages can be used. In several aspects of the present invention, the cadmium content of the metal alloy is a) up to about 0.1 weight percent of the metal alloy, or b) less than about 0.05 weight percent of the metal alloy.

Chromium, if added and/or included in the metal alloy, is present in amounts of at least about 0.0001 weight percent. In several aspects of the present invention, the chromium content of the metal alloy is a) less than about 0.1 weight percent of the metal alloy, or b) up to about 0.02 weight percent of the metal alloy.

Copper, if added to and/or included in the metal alloy, is present in amounts up to about 5 weight percent of the metal alloy; however, higher weight percentages can be used. In several aspects of the present invention, the copper content of the metal alloy is a) up to about 2.7 weight percent of the metal alloy, b) up to about 2 weight percent of the metal alloy, c) up to about 1.6 weight percent of the metal alloy, d) up to about 1.5 weight percent of the metal alloy, e) up to about 1 weight percent of the metal alloy, f) up to about 0.05 weight percent of the metal alloy, g) at least about 0.001 weight percent of the metal alloy, h) at least about 0.1 weight percent of the metal alloy, i) about 0.001–2.7 weight percent of the metal alloy, j) about 0.01–2.7 weight percent of the metal alloy, k) about 0.001–1.6 weight percent of the metal alloy, 1) about 0. 1–1.6 weight percent of the metal alloy, m) about 1–1.5 weight percent of the metal alloy, n) about 0.001–1 weight percent of the metal alloy, o) about 0.001–0.5 weight percent of the metal alloy, p) about 0.005–0.6 weight percent of the metal alloy, q) about 0.005–0.1 weight percent of the metal alloy, r) about 0.01–0.1 weight percent of the metal alloy, s) about 0.05–0.1 weight percent of the metal alloy, t) about 0.005–2.7 weight percent of the metal alloy, u) about 0.005–1.6 weight percent of the metal alloy, or v) about 0.1–1.5 weight percent of the metal alloy. When copper is added to the metal alloy, the copper is typically added in the form of brass and/or bronze.

Iron, if added to and/or included in the metal alloy, is added in amounts up to about 1 weight percent of the metal alloy; however, higher weight percentages can be used. In several aspects of the present invention, the iron content of the metal alloy is a) less than about 0.5 weight percent of the metal alloy, b) less than about 0.1 weight percent of the metal alloy, c) up to about 0.02 weight percent of the metal alloy, d) less than about 0.01 weight percent of the metal alloy, e) less than about 0.005 weight percent of the metal alloy, or f) less than about 0.002 weight percent of the metal alloy.

Lead, if added to and/or included in the metal alloy, is present in low levels, generally less than about 10 weight percent of the metal alloy; however, higher weight percentages can be used. In several aspects of the present invention, the lead content of the metal alloy is a) less than about 2 weight percent of the metal alloy, b) less than about 1 weight percent of the alloy, c) less than about 0.5 weight percent of the alloy, d) less than about 0.1 weight percent of the metal alloy, e) less than about 0.075 weight percent of the metal alloy, f) less than about 0.06 weight percent of the metal alloy, g) less than about 0.05 weight percent of the metal alloy, h) less than about 0.02 weight percent of the metal alloy; i) less than about 0.01 weight percent of the metal alloy, j) less than about 0.001 weight percent of the metal alloy, or k) about 0.001–0.1 weight percent.

Magnesium, if added to and/or included in the metal alloy, is present in amounts up to about 5 weight percent of the metal alloy; however, higher weight percentages can be used. In several aspects of the present invention, the magnesium content of the metal alloy is a) up to about 2 weight percent of the metal alloy, b) up to about 1 weight percent of the metal alloy, c) up to about 0.4 weight percent of the metal alloy, d) up to about 0.1 weight percent of the metal alloy, e) about 0.1–0.4 weight percent of the metal alloy, f) about 0.01–0.4 weight percent of the metal alloy, or g) about 0.001–0.1 weight percent of the metal alloy. When magnesium is added to the metal alloy, the magnesium is typically added in the form of pure magnesium.

Manganese, if added to and/or included in the metal alloy, is present in amounts up to about 0.1 weight percent of the metal alloy; however, higher weight percentages can be used. In several aspects of the present invention, the manganese content of the metal alloy is a) at least about 0.0001 weight percent of the metal alloy, b) up to about 0.01 weight percent of the metal alloy, c) about 0.0001–0.1 weight percent of the metal alloy, d) about 0.001–0.1 weight percent of the metal alloy, or e) about 0.0001–0.01 weight percent of the metal alloy.

Nickel, if added to and/or included in the metal alloy, is present in amounts up to about 5 weight percent of the metal alloy; however, higher weight percentages can be used. In several aspects of the present invention, the nickel content of the metal alloy is a) up to about 2 weight percent of the metal alloy, b) up to about 1 weight percent of the metal alloy, c) up to about 0.9 weight percent of the metal alloy, d) up to about 0.7 weight percent of the metal alloy; e) up to about 0.3 weight percent of the metal alloy, f) up to about 0.1 weight percent of the metal alloy, g) up to about 0.005 weight percent of the metal alloy, h) about 0.001–0.1 weight percent of the metal alloy, i) about 0.001–0.9 weight percent of the metal alloy, j) about 0.001–0.3 weight percent of the metal alloy, k) about 0.001–0.05 weight percent of the metal alloy, 1) about 0.001–0.005 weight percent of the metal alloy, or m) about 0.01–0.7 weight percent of the metal alloy.

Titanium, if added to and/or included in the metal alloy, is present in amounts up to about 1 weight percent of the metal alloy; however, higher weight percentages can be used. In several aspects of the present invention, the titanium content of the metal alloy is a) up to about 0.5 weight percent of the metal alloy, b) up to about 0.2 weight percent of the metal alloy, c) up to about 0.18 weight percent of the metal alloy; d) up to about 0.15 weight percent of the metal alloy; e) up to about 0.1 weight percent of the metal alloy, f) up to about 0.075 weight percent of the metal alloy, g) up to about 0.05 weight percent of the metal alloy, h) at least about 0.0005 weight percent of the metal alloy, i) about 0.01–0.5 weight percent of the metal alloy, j) about 0.01–0.15 weight percent of the metal alloy, k) about 0.0001–0.075 weight percent of the metal alloy, 1) about 0.0005–0.05 weight percent of the metal alloy, m) about 0.0005–0.18 weight percent of the metal alloy; n) about 0.001–0.05 weight percent of the metal alloy, or o) about 0.005–0.02 weight percent of the metal alloy. When titanium is added to a tin and zinc metal alloy, the titanium is typically added as an alloy such as, but not limited to, a Zn—Ti alloy.

Zinc, if added to and/or included in the tin metal alloy, is present in amounts up to about 9–10 weight percent of the metal alloy. Higher weight percentages of zinc transforms the metal alloy to a tin and zinc metal alloy. In several aspects of the present invention, the zinc content of the tin metal alloy is a) up to about 7 weight percent of the tin metal alloy, b) up to about 1.5 weight percent of the tin metal alloy, c) less than about 1 weight percent of the tin metal alloy, d) up to about 0.5 weight percent of the tin metal alloy, e) about 0.001–0.5 weight percent of the tin metal alloy, or f) less than about 0.2 weight percent of the tin metal alloy.

A general formulation of the corrosion resistant tin metal alloy by weight percent includes the following:

| | |
|---|---|
| Tin | 75–99.99 |
| Antimony | 0–7.5 |
| Bismuth | 0–1.7 |
| Copper | 0–5 |
| Lead | 0–10 |

A more specific formulation of the corrosion resistant tin metal alloy by weight percent includes the following:

| | |
|---|---|
| Tin | 75–99.99 |
| Aluminum | 0–5 |
| Antimony | 0–7.5 |
| Bismuth | 0–1.7 |
| Copper | 0–5 |
| Lead | 0–10 |
| Nickel | 0–5 |
| Zinc | 0–9 |

Another more specific formulation of the corrosion resistant tin metal alloy by weight percent includes the following:

| | |
|---|---|
| Tin | 90–99.99 |
| Aluminum | 0–2 |
| Antimony | 0–2 |
| Arsenic | 0–0.05 |
| Bismuth | 0–1.5 |
| Boron | 0–0.1 |
| Cadmium | 0–0.5 |
| Carbon | 0–1 |
| Chromium | 0–1 |
| Copper | 0–2 |
| Iron | 0–1 |
| Lead | 0–2 |
| Magnesium | 0–1 |
| Manganese | 0–0.1 |
| Molybdenum | 0–0.1 |
| Nickel | 0–1 |
| Silicon | 0–0.5 |
| Silver | 0–0.1 |
| Tellurium | 0–0.05 |
| Titanium | 0–0.5 |
| Vanadium | 0–0.1 |
| Zinc | 0–7 |

Still another more specific formulation of the tin metal alloy by weight percent includes the following:

| | |
|---|---|
| Tin | 90–99.9 |
| Aluminum | 0–5 |
| Antimony | 0–7.5 |
| Arsenic | 0–0.005 |
| Bismuth | 0–1.7 |
| Boron | 0–0.1 |
| Cadmium | 0–0.1 |
| Carbon | 0–1 |
| Chromium | 0–1 |
| Copper | 0–5 |
| Iron | 0–1 |
| Lead | 0–2 |
| Magnesium | 0–0.1 |
| Manganese | 0–0.1 |
| Molybdenum | 0–0.1 |
| Nickel | 0–5 |
| Silicon | 0–0.5 |
| Silver | 0–0.005 |
| Tellurium | 0–0.05 |
| Titanium | 0–1 |
| Vanadium | 0–0.1 |
| Zinc | 0–9 |

A few examples of the metal alloy composition by weight percent which have exhibited the desired characteristics as mentioned above are set forth as follows:

| Alloy Ingredients | A | B | C | D | E |
|---|---|---|---|---|---|
| Tin | Bal. | Bal. | Bal. | Bal. | Bal. |
| Aluminum | ≦0.01 | ≦0.01 | ≦0.05 | 0 | 0 |
| Antimony | ≦1 | ≦0.1 | ≦0.1 | ≦0.05 | ≦0.05 |
| Bismuth | ≦0.05 | ≦0.05 | ≦0.01 | ≦0.01 | ≦0.01 |
| Copper | ≦0.5 | ≦0.05 | 0 | 1 | 0 |
| Iron | ≦0.1 | ≦0.005 | 0 | 0 | 0 |
| Lead | ≦1 | ≦0.1 | ≦0.1 | ≦0.1 | ≦2 |
| Nickel | ≦0.005 | ≦0.05 | ≦0.05 | ≦0.005 | ≦0.05 |
| Zinc | ≦1 | ≦2 | ≦3 | ≦0.5 | |

| Alloy Ingredients | F | G | H | I |
|---|---|---|---|---|
| Tin | Bal. | Bal. | Bal. | Bal. |
| Aluminum | ≦0.01 | ≦0.01 | 0 | 0 |
| Antimony | ≦0.1 | ≦0.1 | ≦0.05 | ≦0.05 |
| Bismuth | ≦0.05 | ≦0.01 | ≦0.01 | ≦0.01 |
| Copper | ≦0.5 | 0 | 0 | 0 |
| Thon | ≦0.005 | 0 | 0 | 0 |
| Lead | ≦0.1 | ≦0.1 | ≦0.1 | ≦0.05 |
| Nickel | 0 | 0 | 0 | 0 |
| Zinc | ≦1 | ≦1 | ≦1 | |

| Alloy Ingredients | J | K | L | M | N |
|---|---|---|---|---|---|
| Tin | Bal. | Bal. | Bal. | Bal. | Bal. |
| Aluminum | ≦0.01 | ≦0.01 | ≦0.05 | 0.0 | 0.0 |
| Antimony | ≦1.0 | ≦0.1 | ≦0.1 | ≦0.05 | ≦0.05 |
| Bismuth | ≦0.05 | ≦0.05 | ≦0.01 | ≦0.01 | ≦0.01 |
| Copper | ≦0.5 | ≦0.5 | 0.0 | 1.0 | 0.0 |
| Iron | ≦0.1 | ≦0.005 | ≦0.0 | ≦0.0 | <0.0 |
| Lead | ≦1.0 | ≦0.1 | ≦0.1 | ≦0.1 | ≦2.0 |
| Nickel | ≦0.005 | ≦0.0 | ≦0.0 | ≦0.005 | ≦0.0 |
| Zinc | ≦1 | ≦2 | ≦3 | ≦0.5 | ≦1 |

One formulation of the corrosion resistant tin metal alloy includes by weight percent at least 75% tin; 0–1% aluminum; 0–2% antimony; 0–0.02% arsenic; 0–1.5% bismuth; 0–0.1% boron; 0–0.1% cadmium; 0–0.5% carbon; 0–0.5% chromium; 0–2% copper, 0–1% iron; 0–2% lead; 0–0.4% magnesium; 0–0.1% manganese; 0–0.1% molybdenum; 0–1% nickel; 0–0.05% silicon; 0–0.1% silver; 0–0.02% sulfur; 0–0.04% tellurium; 0–0.15% titanium; 0–0.1% vanadium; and 0–9% zinc. Another formulation of the corrosion resistant tin metal alloy includes 90–99.9% tin; 0–0.5% aluminum; 0–2% antimony; 0–0.01% arsenic; 0–1.5% bismuth; 0–0.05% boron; 0–0.1% cadmium; 0–0.5% carbon; 0–0.5% chromium; 0–2% copper; 0–1% iron; 0–1% lead; 0–0.4% magnesium; 0–0.1% manganese; 0–0.1% molybdenum; 0–1% nickel; 0–0.5% silicon; 0–0.1% silver; 0–0.01% sulfur; 0–0.01% tellurium; 0–0.15% titanium; 0–0.1% vanadium; and 0–9% zinc. Still another formulation of the corrosion resistant tin metal alloy includes at least 90% tin; 0–1% aluminum; 0–2% antimony; 0–0.02% arsenic; 0–1.5% bismuth; 0–0.05% boron; 0–0.1% cadmium; 0–0.5% carbon; 0–0.5% chromium; 0–2% copper; 0–1% iron; 0–2% lead; 0–0.4% magnesium; 0–0.1% manganese; 0–0.1% molybdenum; 0–1% nickel; 0–0.05% silicon; 0–0.05% silver; 0–0.02% sulfur; 0–0.04% tellurium; 0–0.15% titanium; 0–0.05% vanadium; and 0–5% zinc. Yet another formulation of the corrosion resistant tin metal alloy includes 95–99.99% tin; 0–0.4% aluminum; 0–0.8% antimony; 0–0.005% arsenic; 0–0.5% bismuth; 0–0.1% boron; 0–0.05% cadmium; 0–0.1% carbon; 0–0.05% chromium; 0–1% copper; 0–1% iron; 0–5% lead; 0–0.01% magnesium; 0–0.01% manganese; 0–0.05% molybdenum; 0–0.9% nickel; 0–0.5% silicon; 0–0.01% silver; 0–0.01% sulfur; 0–0.01% tellurium; 0–0.1% titanium; 0–0.01% vanadium; and 0–2% zinc. Still yet another formulation of the corrosion resistant tin metal alloy includes 95–99.99% tin; 0–0.4% aluminum; 0–0.8% antimony; 0–0.005% arsenic; 0–0.5% bismuth; 0–0.1% boron; 0–0.05% cadmium; 0–0.1% carbon; 0–0.05% chromium; 0–1% copper; 0–0.5% iron; 0–0.5% lead; 0–0.01% magnesium; 0–0.01% manganese; 0–0.05% molybdenum; 0–0.9% nickel; 0–0.01% silicon; 0–0.01% silver; 0–0.01% sulfur; 0–0.01% tellurium; 0–0.1% titanium; 0–0.01% vanadium; and 0–2% zinc. A further formulation of the corrosion resistant tin metal alloy includes 98–99.90% tin; 0–0.01% aluminum; 0–1% antimony and/or bismuth; 0–0.1% copper; 0–0.05% iron; 0–0.5% lead; 0–0.05% magnesium; 0–0.05% manganese; 0–0.1% nickel; and 0–0.1% zinc. Yet a further formulation of the corrosion resistant tin metal alloy includes 98–99.99% tin; 0–0.1% aluminum; 0–1% antimony and/or bismuth; 0–0.001% arsenic; 0–0.001% boron; 0–0.001% cadmium; 0–0.01% carbon; 0–0.01% chromium; 0–0.1% copper; 0–0.05% iron; 0–0.05% lead; 0–0.001% magnesium; 0–0.001% manganese; 0–0.001% molybdenum; 0–0.9% nickel; 0–0.001% silicon; 0–0.001% silver; 0–0.001% sulfur; 0–0.001% tellurium; 0–0.05% titanium; 0–0.001% vanadium; and 0–1% zinc. Still yet a further formulation of the corrosion resistant tin metal alloy includes at least 90% tin and 0.01–0.1% lead. Another formulation of the corrosion resistant tin metal alloy includes 90–99.9% tin and 0.001–0.1% lead. Still another formulation of the corrosion resistant tin metal alloy includes 90–99.9% tin; 0–7.5% antimony; 0–1.7% bismuth; 0–2.7% copper, 0.001–0.1% lead; and 0–1.5% zinc. Yet another formulation of the corrosion resistant tin metal alloy includes 90–99.9% tin; less than 0.001% aluminum; 0–7.5% antimony; 0–1.7% bismuth; less than 0.05% cadmium; 0–2.7% copper; 0.001–0.1% lead; and 0–1.5% zinc. Still yet another formulation of the corrosion resistant tin metal alloy includes 90–99.9% tin; 0–2.5% antimony; 0–0.5% bismuth; 0–2.7% copper; 0–0.1% iron; 0.001–0.10% lead; and 0.5–1.5% zinc. A further formulation of the corrosion resistant tin metal alloy includes 90–99.9% tin; 0–7.5% antimony; 0–1.7% bismuth; 0–2.7% copper; 0–0.1% iron; 0.01–0.1% lead; and 0–1.5% zinc. Yet a further formulation of the corrosion resistant tin metal alloy includes 90–99.95% tin; 0–7.5% antimony; 0–1.7% bismuth; 0–2.7% copper; 0–1% iron; 0–0.5% lead; and 0–0.5% zinc. Still a further formulation of the corrosion resistant tin metal alloy includes 90–99.95% tin; 0–7.5% antimony; 0–1.7% bismuth; 0–5% copper; 0–1% iron; 0–0.5% lead; and 0–7% zinc. Still yet a further formulation of the corrosion resistant tin metal alloy includes 90–99.95% tin; 0–0.5% antimony and/or bismuth; 0–1% copper; 0–1% iron; 0–0.05% lead; and 0–1.5% zinc. Another formulation of the corrosion resistant tin metal alloy includes 90–99.95% tin; 0.005–0.5% antimony; bismuth and/or copper, 0–0.05% lead; and 0–0.5% zinc. Still another formulation of the corrosion resistant tin metal alloy includes 90–99.9% tin; 0–5% aluminum; 0–7.5% antimony; 0–0.005% arsenic; 0–1.7% bismuth; 0–0.1% cadmium; 0–5% copper, 0–1% iron; 0–2% lead; 0–5% magnesium; 0–5% nickel; 0–0.005% silver; 0–1% titanium; and 0–9% zinc. Yet another formulation of the corrosion resistant tin metal alloy includes 95–99.9% tin; 0–0.01% aluminum; 0–0.5% antimony; 0–0.5% bismuth; 0–0.005% iron; 0–0.1% lead; 0–0.1% nickel; and 0–2% zinc. Still yet another formulation of the corrosion resistant tin metal alloy includes 99–99.9% tin; 0–0.4% antimony; 0–0.2% bismuth; 0–0.001% iron; 0–0.05% lead; 0–0.001% nickel; and 0–0.2% zinc. A further formulation of the corrosion resistant tin metal alloy includes 90–99.9% tin; 0–0.01% aluminum; 0–1% antimony, 0–0.05% bismuth; 0–0.5% copper, 0–0.1% iron; 0–1% lead; 0–0.005% nickel; and 0–1% zinc. Yet a further formulation of the corrosion resistant tin metal alloy includes 90–99.9% tin; 0–0.5% aluminum; 0–2% antimony; 0–0.01% arsenic; 0–1.5% bismuth; 0–0.05% boron; 0–0.1% cadmium; 0–0.5% carbon; 0–0.5% chromium; 0–2% copper; up to 1% iron; less than 1% lead; 0–0.4% magnesium; 0–0.1% manganese; 0–0.1% molybdenum; 0–1% nickel; 0–0.5% silicon; 0–0.1% silver; 0–0.01% sulfur; 0–0.01% tellurium; 0–0.15% titanium; 0–0.1% vanadium; and 0–9% zinc. Still a further formulation of the corrosion resistant tin metal alloy includes 98–99.9% tin; 0–0.01% aluminum; 0–1% antimony and/or bismuth; 0–0.1% copper; less than 0.05% iron; less than 0.5% lead; 0–0.05% magnesium; 0–0.05% manganese; 0–0.1% nickel; and 0–0.1% zinc. Still yet a further formulation of the corrosion resistant tin metal alloy includes 99–99.9% tin; 0.001–0.8% antimony and/or bismuth; 0–0.02% copper; 0–0.001% iron; and 0–0.08% lead; 0–0.001% nickel; and 0–0.001% zinc. Another formulation of the corrosion resistant tin metal alloy includes 90–99.9% tin; 0–5% aluminum; 0–7.5% antimony; 0–0.005% arsenic; 0–1.7% bismuth; 0–0.005% cadmium; 0–5% copper; 0–1% iron; 0–2% lead; 0–5% magnesium; 0–5% nickel; 0–0.005% silver; 0–1% titanium; and 0–9% zinc. Yet another formulation of the corrosion resistant tin metal alloy includes 95–99.9% tin; 0–0.05% aluminum; 0–0.2% antimony; 0–0.1% bismuth; 0–0.1% copper; 0–0.1% iron; 0–0.2% lead; 0–0.1% nickel; and 0–9% zinc. Still yet another formulation of the corrosion resistant tin metal alloy includes 75–99.9% tin; 0–5% aluminum; 0–7.5% antimony; 0–1.7% bismuth; 0–5% copper; 0–10% lead; 0–5% nickel; 0–0.5 titanium; and 0–9% zinc. A further formulation of the corrosion resistant tin metal alloy includes 90–99.9% tin; 0–2% aluminum; 0–2% antimony; 0–0.05% arsenic; 0–1.5% bismuth; 0–0.1% boron; 0–0.5% cadmium; 0–1% carbon; 0–1% chromium; 0–2% copper; 0–1% iron; 0–2% lead; 0–1% magnesium; 0–0.1% manganese; 0–0.1% molybdenum; 0–1% nickel; 0–0.5% silicon; 0–0.1% silver; 0–0.05% tellurium; 0–0.5% titanium; 0–0.1% vanadium; and 0–7% zinc. Yet a further formulation of the corrosion resistant tin metal alloy includes at least 90% tin; 0–1% aluminun; 0–2% antimony; 0–0.02% arsenic; 0–1.5% bismuth; 0–0.5% boron; 0–0.1% cadmium; 0–0.5% carbon; 0–0.5% chromium; 0–2% copper; 0–1% iron; 0–2% lead; 0–0.4% magnesium; 0–0.1% manganese; 0–0.1% molybdenum; 0–1% nickel; 0–0.05% silicon; 0–0.05% silver; 0–0.02% sulfur; 0–0.04% tellurium; 0–0.15% titanium; 0–0.05% vanadium; and 0–5% zinc. Still a further formulation of the corrosion resistant tin metal alloy includes 95–99.99% tin; 0–0.4% aluminum; 0–0.8% antimony; 0–0.005% arsenic; 0–0.5% bismuth; 0–0.1% boron; 0–0.05% cadmium; 0–0.1% carbon; 0–0.05% chromium; 0–1% copper; 0–0.5% iron; 0–0.5% lead; 0–0.01% magnesium; 0–0.01% manganese; 0–0.05% molybdenum; 0–0.3% nickel; 0–0.01% silicon; 0–0.01% silver; 0–0.01% sulfur; 0–0.01% tellurium; 0–0.1% titanium; 0–0.01% vanadium; and 0–2% zinc. Still yet a further formulation of the corrosion resistant tin metal alloy includes 98–99.99% tin; 0–0.1% aluminum; 0–1% antimony and/or bismuth; 0–0.001% arsenic; 0–0.001% boron; 0–0.001% cadmium; 0–0.01% carbon; 0–0.01% chromium; 0–0.1% copper; 0–0.05% iron; 0–0.05% lead; 0–0.001% magnesium; 0–0.001% manganese; 0–0.001% molybdenum; 0–0.1% nickel; 0–0.001% silicon; 0–0.001% silver; 0–0.001% sulfur, 0–0.001% tellurium; 0–0.05% titanium; 0–0.001% vanadium; and 0–1% zinc. Another formulation of the corrosion resistant tin metal alloy includes at least 75% tin; 0–1% aluminum; 0–2% antimony; 0–0.02% arsenic; 0–1.5% bismuth; 0–0.05% boron; 0–0.1% cadmium; 0–0.5% carbon; 0–0.5% chromium; 0–2% copper; 0–1% iron; 0–2% lead; 0–0.4% magnesium; 0–0.1% manganese; 0–0.1% molybdenum; 0–1% nickel; 0–0.05% silicon; 0–0.1% silver; 0–0.02% sulfur; 0–0.04% tellurium; 0–0.15% titanium; 0–0.1% vanadium; and 0–9% zinc. Yet another formulation of the corrosion resistant tin metal alloy includes 95–99.99% tin; 0–0.4% aluminum; 0–0.8% antimony; 0–0.005% arsenic; 0–0.5% bismuth; 0–0.1% boron; 0–0.05% cadmium; 0–0.1% carbon; 0–0.05% chromium; 0–1% copper; 0–1% iron; 0–5% lead; 0–0.01% magnesium; 0–0.01% manganese; 0–0.05% molybdenum; 0–0.9% nickel; 0–0.5% silicon; 0–0.01% silver; 0–0.01% sulfur; 0–0.01% tellurium; 0–0.1% titanium; 0–0.01% vanadium; and 0–2% zinc. Still another formulation of the corrosion resistant tin metal alloy includes 98–99.99% tin; 0–0.1% aluminum; 0–1% antimony and/or bismuth; 0–0.001% arsenic; 0–0.001% boron; 0–0.001% cadmium; 0–0.01% carbon; 0–0.01% chromium; 0–0.1% copper; 0–0.05% iron; 0–0.05% lead; 0–0.001% magnesium; 0–0.001% manganese; 0–0.001% molybdenum; 0–0.9% nickel; 0–0.001% silicon; 0–0.001% silver; 0–0.001% sulfur; 0–0.001% tellurium; 0–0.05% titanium; 0–0.001% vanadium; and 0–1% zinc. Still yet another formulation of the corrosion resistant tin metal alloy includes 90–99.9% tin; 0–0.5% antimony, 0–1.5% bismuth; 0.00–1% lead; and 0–0.001% zinc. A further formulation of the corrosion resistant tin metal alloy includes 90–99.9% tin; 0–0.75% antimony; 0–0.5% bismuth; 0–0.1% iron; 0–1% lead; and 0–0.5% zinc. Yet a further formulation of the corrosion resistant tin metal alloy includes 90–99.9% tin; 0–7.5% antimony; 0–2.7% copper; and 0–1% lead. Still a further formulation of the corrosion resistant tin metal alloy includes 90–99.9% tin; 0–2.5% antimony; 0–2% copper; 0–1% lead; and 0–0.5% zinc. Still yet a further formulation of the corrosion resistant tin metal alloy includes 90–99.9% tin; 0–0.75% antimony; 0–0.5% bismuth; 0–0.1% iron; 0–1% lead; and 0–0.5% zinc. Another formulation of the corrosion resistant tin metal alloy includes 90–99.9% tin; 0–1% antimony; 0–0.5% bismuth; 0–0.1% iron; and 0–1% lead. Still another of the corrosion resistant tin metal alloy includes 90–99.9% tin; 0–0.5% bismuth; 0–0.1% iron; and 0–1% lead. Yet another formulation of the corrosion resistant tin metal alloy includes 90–99.9% tin; 0–0.75% antimony; 0–0.5% bismuth; 0–0.01% iron; 0.001–0.05% lead; and 0–0.5% zinc. Still yet another formulation of the corrosion resistant tin metal alloy includes 90–99.9% tin; 0–0.5% antimony; 0–1.7% bismuth; 0–0.02% lead; and 0–0.001% zinc. A further formulation of the corrosion resistant tin metal alloy includes 90–99.9% tin; 0–0.75% antimony; 0–0.5% bismuth; 0–0.005% cobalt; 0–2.7% copper; 0–0.1% iron; 0–0.05% lead; 0–0.005% nickel; 0–0.001% silver; 0–0.001% sulfur; and 0–0.5% zinc. Still a further formulation of the corrosion resistant tin metal alloy includes 90–99.9% tin; 0–7.5% antimony; and 0–2.7% copper. Yet a further formulation of the corrosion resistant tin metal alloy includes 90–99.9% tin; 0–2.5% antimony; 0–2% copper; and 0–0.5% zinc. Still yet a further formulation of the corrosion resistant tin metal alloy includes 90–99.9% tin; 0–0.5% antimony; 0–1.5% bismuth; 0–0.005% cobalt; 0–0.02% lead; 0–0.005% nickel; 0–0.001% silver; 0–0.001% sulfur; and 0–0.001% zinc. Another formulation of the corrosion resistant tin metal alloy includes 90–99.9% tin and 0–0.1% lead. Still another formulation of the corrosion resistant tin metal alloy includes 90–99.9% tin and 0–0.01% lead. Yet another formulation of the corrosion resistant tin metal alloy includes 90–99.9% tin; 0–5.5% antimony; 0–0.5% aluminum; 0–1.7% bismuth; 0–2.7% copper; 0–0.4% magnesium; 0–1% nickel; and 0–0.15% titanium. Still yet another formulation of the corrosion resistant tin metal alloy includes 90–99.9% tin; 0–0.75% antimony; 0–0.5% bismuth; 0–0.005% cobalt; 0–2.7% copper, 0–0.1% iron; 0–0.05% lead; 0–0.005% nickel; 0–0.001% silver; 0–0.001% sulfur; and 0–0.5% zinc. A further formulation of the corrosion resistant tin metal alloy includes 90–95% tin; 0–0.25% aluminum; 0–1.5% copper, 0–0.02% chromium; 0–0.01% iron; 0–0.01% lead; 0–0.01% manganese; 0–0.018% titanium; and 0–9% zinc. Still a further formulation of the corrosion resistant tin metal alloy includes 0–2.5% antimony, 0–0.5% bismuth, 0–2.7% copper, 0–0.1% iron, 0.001–0.1% lead, 0.5–1.5% zinc and the remainder tin. Another formulation of the corrosion resistant tin metal alloy includes 90–99.9% tin; 0–7.2% antimony; 0–1.7% bismuth; 0–2.7% copper; 0–0.1% iron; 0.001–0.1% lead; and 0–1.5% zinc. Still another formulation of the corrosion resistant tin metal alloy includes at least about 95% tin; 0.001–0.1% lead, and at least about 0.5% stabilizer. Yet another formulation of the corrosion resistant tin metal alloy includes 0–2.5% antimony, 0–0.5% bismuth, 0–2.7% copper, 0–0.1% iron, 0.001–0.1% lead, 0–1.5% zinc and the remainder tin. Still yet another formulation of the corrosion resistant tin metal alloy includes 90–99.95% tin; 0–7.2% antimony; 0–1.7% bismuth; 0–2.7% copper; 0–0.1% iron; 0.001–0.1% lead; and 0–0.5% zinc. A further formulation of the corrosion resistant tin metal alloy includes 90–99.95% tin; 0–7.2% antimony; 0–1.7% bismuth; and 0.001–0.05% lead. Still a further formulation of the corrosion resistant tin metal alloy includes 95–99.9% tin; 0–0.1% aluminum; 0–1% antimony; 0–0.5% bismuth; 0–0.5% copper, 0–0.1% iron; 0–0.5% lead; 0–0.1% nickel; and 0–0.2% zinc. Still yet a further formulation of the corrosion resistant tin metal alloy includes 98–99.9% tin; 0–0.4% antimony; 0–0.2% bismuth; 0–0.1% copper; 0–0.01% iron; 0–0.05% lead; 0–0.01% nickel; and 0–0.05% zinc. Another formulation of the corrosion resistant tin metal alloy includes 75–99.990% tin; 0–5% aluminum; 0–7.5% antimony; 0–1.7% bismuth; 0–5% copper; 0–10% lead; 0–5% nickel; 0–0.5% titanium; and 0–9% zinc. Still another formulation of the corrosion resistant tin metal alloy includes 98–99% tin; 0–0.1% aluminum; 0–1% antimony and/or bismuth; 0–0.001% arsenic; 0–0.001% boron; 0–0.001% cadmium; 0–0.01% carbon; 0–0.01% chromium; 0–0.1% copper; 0–0.05% iron; 0–0.05% lead; 0–0.001% magnesium; 0–0.001% manganese; 0–0.001% molybdenum; 0–0.1% nickel; 0–0.001% silicon; 0–0.001% silver; 0–0.001% sulfur; 0–0.001% tellurium; 0–0.05% titanium; 0–0.001% vanadium; and 0–1% zinc. Yet another formulation of the corrosion resistant tin metal alloy includes 50–99.999% tin; 0–7.5% aluminum; 0–2% antimony; 0–0.05% arsenic; 0–0.1% boron; 0–1.7% bismuth; 0–0.5% cadmium; 0–1% carbon; 0–1% chromium; 0–5% copper; 0–1% iron; 0–10% lead; 0–1% magnesium; 0–0.1manganese; 0–0.1% molybdenum; 0–5% nickel; 0–0.5% silicon; 0–0. 1% silver; 0–0.05% tellurium; 0–0.5% titanium; 0–0.1% vanadium; and 0–9% zinc. Yet another formulation of the corrosion resistant tin metal alloy includes 90–99.999% tin; 0–7.5% aluminun; 0–2% antimony; 0–0.05% arsenic; 0–0.1% boron; 0–1.7% bismuth; 0–0.5% cadmium; 0–1% carbon; 0–1% chromium; 0–5% copper; 0–1% iron; 0–10% lead; 0–1% magnesium; 0–0.1% manganese; 0–0.1% molybdenum; 0–5% nickel; 0–0.5% silicon; 0–0.1% silver; 0–0.05% tellurium; 0–0.5% titanium; 0–0.1% vanadium; and 0–9% zinc. Still another formulation of the corrosion resistant tin metal alloy includes 75–99.999% tin; 0–7.5% aluminum; 0–2% antimony; 0–0.05% arsenic; 0–0.1% boron; 0–1.7% bismuth; 0–0.5% cadmium; 0–1% carbon; 0–1% chromium; 0–5% copper; 0–1% iron; 0–10% lead; 0–1% magnesium; 0–0.1% manganese; 0–0.1% molybdenum; 0–5% nickel; 0–0.5% silicon; 0–0.1% silver; 0–0.05% tellurium; 0–0.5% titanium; 0–0.1% vanadium; and 0–10% zinc. Yet another formulation of the corrosion resistant tin metal alloy includes 75–99.999% tin; 0–7.5% aluminum; 0.001–5% antimony, bismuth, cadmium and/or copper; 0–2% lead; 0–1% nickel; and 0–10% zinc. Still yet another formulation of the corrosion resistant tin metal alloy includes 95–99.999% tin; 0–2% aluminum; 0.001–2% antimony, bismuth, cadmium and/or copper; 0–1% lead; 0–1% nickel; and 0–2% zinc. Still another formulation of the corrosion resistant tin metal alloy includes 98–99% tin; 0–0.1% aluminum; 0–1% antimony and/or bismuth; 0–0.001% arsenic; 0–0.001% boron; 0–0.001% cadmium; 0–0.01% carbon; 0–0.01% chromium; 0–0.1% copper; 0–0.05% iron; 0–0.05% lead; 0–0.001% magnesium; 0–0.001% manganese; 0–0.001% molybdenum; 0–0.9% nickel; 0–0.001% silicon; 0–0.001% silver; 0–0.001% sulfur; 0–0.001% tellurium; 0–0.05% titanium; 0–0.001% vanadium; and 0–1% zinc.

A general formulation of the corrosion resistant tin and zinc metal alloy by weight percent includes the following:

| | |
|---|---|
| Tin | 15–90 |
| Zinc | 9 to 10–85 |
| Antimony | 0–7.5 |
| Bismuth | 0–5 |
| Copper | 0–5 |

One more specific formulation of the corrosion resistant tin and zinc metal alloy by weight percent includes the following:

| | |
|---|---|
| Tin | 15–90 |
| Zinc | 9 to 10–85 |
| Aluminum | 0–5 |
| Antimony | 0–7.5 |
| Bismuth | 0–5 |
| Cadmium | 0–1 |
| Copper | 0–5 |
| Nickel | 0–5 |

Another specific formulation of the corrosion resistant tin and zinc metal alloy by weight percent includes the following:

| | |
|---|---|
| Tin | 20–80 |
| Zinc | 20–80 |
| Aluminum | 0–2 |
| Antimony | 0–1 |
| Arsenic | 0–0.05 |
| Bismuth | 0–1 |
| Boron | 0–0.1 |
| Cadmium | 0–0.1 |
| Carbon | 0–0.5 |
| Chromium | 0–0.5 |
| Copper | 0–2 |
| Iron | 0–1 |
| Lead | 0–1 |
| Magnesium | 0–1 |
| Manganese | 0–0.1 |
| Molybdenum | 0–0.1 |
| Nickel | 0–1 |
| Silicon | 0–0.5 |
| Silver | 0–0.1 |
| Tellurium | 0–0.05 |
| Titanium | 0–0.5 |
| Vanadium | 0–0.1 |

Still another specific formulation of the corrosion resistant tin and zinc metal alloy by weight percent includes the following:

| | |
|---|---|
| Tin | 30–85 |
| Zinc | 15–70 |
| Aluminum | 0–1 |
| Antimony | 0–1 |
| Arsenic | 0–0.01 |
| Bismuth | 0–1 |
| Boron | 0–0.1 |
| Cadmium | 0–0.1 |
| Carbon | 0–0.5 |
| Chromium | 0–0.1 |
| Copper | 0–1 |
| Iron | 0–0.1 |
| Lead | 0–0.1 |
| Magnesium | 0–1 |
| Manganese | 0–0.01 |
| Molybdenum | 0–0.1 |
| Nickel | 0–0.1 |
| Silicon | 0–0.5 |
| Silver | 0–0.01 |
| Tellurium | 0–0.05 |
| Titanium | 0–0.05 |
| Vanadium | 0–0.1 |

Yet another specific formulation of the corrosion-resistant tin and zinc metal alloy by weight percent includes the following:

| | |
|---|---|
| Tin | 70–90 |
| Zinc | 9 to 10–30 |
| Aluminum | 0.001–0.01 |
| Antimony | 0.001–0.8 |
| Copper | 0.001–0.02 |
| Bismuth | 0.001–0.005 |
| Boron | 0–0.05 |
| Silver | 0–0.005 |
| Carbon | 0–0.05 |
| Chromium | 0–0.05 |
| Iron | 0–0.005 |
| Magnesium | 0–0.05 |
| Manganese | 0–0.01 |
| Molybdenum | 0–0.05 |
| Silicon | 0–0.05 |
| Tellurium | 0–0.01 |
| Titanium | 0–0.05 |
| Vanadium | 0–0.05 |
| Arsenic | 0–0.005 |
| Cadmium | 0–0.01 |
| Nickel | 0–0.005 |
| Lead | 0.01–0.1 |

Still yet another specific formulation of the corrosion-resistant tin and zinc metal alloy by weight percent includes the following:

| | |
|---|---|
| Tin | 79.5–81.5 |
| Zinc | 18.5–20.5 |
| Aluminum | 0.002–0.008 |
| Antimony | 0.6–0.7 |
| Arsenic | 0–0.001 |
| Bismuth | 0.002–0.005 |
| Cadmium | 0–0.001 |
| Copper | 0.005–0.02 |
| Iron | 0–0.001 |
| Lead | 0.02–0.08 |
| Nickel | 0–0.001 |
| Silver | 0–0.001 |

Examples of the tin and zinc metal alloy composition by weight percent include:

| Ingredients | A | B | C | D | E | F | G | H | I | J | K | L | M | N | O | E |
|---|---|---|---|---|---|---|---|---|---|---|---|---|---|---|---|---|
| Zinc | 10 | 15 | 20 | 25 | 30 | 35 | 40 | 45 | 50 | 55 | 60 | 65 | 70 | 75 | 80 | 85 |
| Tin | 90 | 85 | 80 | 75 | 70 | 65 | 60 | 55 | 50 | 45 | 40 | 35 | 30 | 25 | 20 | 15 |
| Aluminum | ≦0.5 | <0.5 | ≦0.5 | ≦0.5 | ≦0.5 | <0.5 | ≦0.5 | ≦0.5 | <0.5 | ≦0.5 | <0.5 | ≦0.5 | ≦0.5 | ≦0.5 | ≦0.5 | ≦0.5 |
| Antimony | ≦0.5 | <0.5 | ≦0.5 | ≦0.5 | ≦0.5 | <0.5 | ≦0.5 | ≦0.5 | <0.5 | ≦0.5 | <0.5 | ≦0.5 | ≦0.5 | ≦0.5 | ≦0.5 | ≦0.5 |
| Bismuth | ≦0.5 | <0.5 | ≦0.5 | ≦0.5 | ≦0.5 | <0.5 | ≦0.5 | ≦0.5 | <0.5 | ≦0.5 | <0.5 | ≦0.5 | ≦0.5 | ≦0.5 | ≦0.5 | ≦0.5 |
| Copper | ≦0.5 | <0.5 | ≦0.5 | ≦0.5 | ≦0.5 | <0.5 | ≦0.5 | ≦0.5 | <0.5 | ≦0.5 | <0.05 | ≦0.5 | ≦0.5 | ≦0.5 | ≦0.5 | ≦0.5 |
| Lead | ≦0.1 | ≦0.1 | ≦0.1 | ≦0.1 | ≦0.1 | ≦0.1 | ≦0.1 | ≦0.1 | ≦0.1 | ≦0.1 | ≦0.1 | ≦0.1 | ≦0.1 | ≦0.1 | ≦0.1 | ≦0.1 |

One formulation of the corrosion resistant tin and zinc metal alloy includes by weight percent 20–80% tin; 20–80% zinc; 0–1% aluminum; 0–2% antimony; 0–0.02% arsenic; 0–1.5% bismuth; 0–0.1% boron; 0–0.1% cadmium; 0–0.5% carbon; 0–0.5% chromium; 0–2% copper, 0–1% iron; 0–1% lead; 0–0.4% magnesium; 0–0.1% manganese; 0–0.1% molybdenum; 0–1% nickel; 0–0.5% silicon; 0–0.05% silver; 0–0.02% sulfur; 0–0.04% tellurium; 0–0.15% titanium; and 0–0.05% vanadium. Another formulation of the corrosion resistant tin and zinc metal alloy includes 30–70% tin; 30–70% zinc; 0–0.4% aluminum; 0–0.8% antimony; 0–0.005% arsenic; 0–0.5% bismuth; 0–0.05% boron; 0–0.05% cadmium; 0–0.1% carbon; 0–0.1% chromium; 0–1% copper; 0–0.6% iron; 0–0.5% lead; 0–0.1% magnesium; 0–0.1% manganese; 0–0.05% molybdenum; 0–0.9% nickel; 0–0.01% silicon; 0–0.01% silver; 0–0.01% sulfur; 0–0.01% tellurium; 0–0.1% titanium; and 0–0.01% vanadium; and the tin plus zinc content is at least 90 weight percent of the alloy. Still another formulation of the corrosion resistant tin and zinc metal alloy includes 40–60% tin; 40–60% zinc; 0–0.4% aluminum; 0–1% antimony and/or bismuth; 0–0.001% arsenic; 0–0.01% boron; 0–0.005% cadmium; 0–0.05% carbon; 0–0.05% chromium; 0–0.1% copper; 0–0.05% iron; 0–0.1% lead; 0–0.01% magnesium; 0–0.01% manganese; 0–0.01% molybdenum; 0–0.9% nickel; 0–0.001% silicon; 0–0.001% silver; 0–0.001% sulfur; 0–0.001% tellurium; 0–0.05% titanium; and 0–0.001% vanadium; and the tin plus zinc content is at least 95 weight percent of the alloy. Yet another formulation of the corrosion resistant tin and zinc metal alloy includes 45–55% zinc; 45–55% tin; 0–0.4% aluminum; 0–0.8% antimony and/or bismuth; 0–0.001% arsenic; 0–0.001% boron; 0–0.001% cadmium; 0–0.01% carbon; 0–0.05% copper; 0–0.001 iron; 0–0.08% lead; 0–0.001% magnesium; 0–0.001% manganese; 0–0.001% molybdenum; 0–0.9% nickel; 0–0.001% silicon; 0–0.005% silver; 0–0.001% sulfur; 0–0.001% tellurium; 0–0.05% titanium and 0–0.001% vanadium; and the tin content plus the zinc content is at least 99% of the alloy. Still yet another formulation of the corrosion resistant tin and zinc metal alloy includes 30–85% tin; 15–70% zinc; 0–0.5% aluminum; 0–2% antimony; 0–0.01% arsenic; 0–1.5% bismuth; 0–0.05% boron; 0–0.1% cadmium; 0–0.1% carbon; 0–0.1% chromium; 0–2% copper, 0–1% iron; 0–0.5% lead; 0–0.4% magnesium; 0–0.1% manganese; 0–0.05% molybdenum; 0–1% nickel; 0–0.5% silicon; 0–0.05% silver, 0–0.01% sulfur; 0–0.01% tellurium; 0–0.15% titanium; and 0–0.05% vanadium. A further formulation of the corrosion resistant tin and zinc metal alloy includes 30–65% tin; 35–70% zinc; 0–0.1% aluminum; 0–1% antimony and/or bismuth; 0–0.05% arsenic; 0–0.01% cadmium; 0–0.5% copper; less than 0.05% iron; less than 0.1% lead; 0–0.1% magnesium; 0–0.1% manganese; 0–10 0.5% nickel; 0–0.05% silver; 0–0.05% titanium; and the tin plus zinc content is at least 98% of the metal alloy. Still a further formulation of the corrosion resistant tin and zinc metal alloy includes 40–60% tin; 40–60% zinc; 0–0.4% aluminum; 0–0.8% antimony and/or bismuth; 0–0.005% arsenic; 0–0.005% cadmium; 0–0.2% copper; 0–0.05% iron; 0–0.1% lead; 0–0.001% magnesium; 0–0.001% manganese; 0–0.05% nickel; 0–0.005% silver; 0–0.05% titanium; and the tin plus zinc content is at least 99% of the metal alloy. Yet a further formulation of the corrosion resistant tin and zinc metal alloy includes 60–90% tin; 9 to 10–40% zinc; 0–0.5% aluminum; 0–2% antimony; 0–0.01% arsenic; 0–1.5% bismuth; 0–0.05% boron; 0–0.1% cadmium; 0–0.5% carbon; 0–0.5% chromium; 0–2% copper; up to 1% iron; less than 0.5% lead; 0–0.4% magnesium; 0–0.1% manganese; 0–0.1% molybdenum; 0–1% nickel; 0–0.5% silicon; 0–0.01% silver; 0–0.01% sulfur; 0–0.01% tellurium;

0–0.15% titanium; and 0–0.1% vanadium. Still yet a further formulation of the corrosion resistant tin and zinc metal alloy includes 70–90% tin; 9 to 10–30% zinc; 0–0.1% aluminum; 0–1% antimony and/or bismuth; 0–0.05% arsenic; 0–0.01% cadmium; 0–0.5% copper; less than 0.05% iron; less than 0.1% lead; 0–0.1% magnesium; 0–0.1% manganese; 0–0.5% nickel; 0–0.05% silver, 0–0.05% titanium; and the tin plus zinc content is at least 95% of the metal alloy. Yet a further formulation of the corrosion resistant tin and zinc metal alloy includes 75–85% tin; 15–25% zinc; 0.001–0.01% aluminum; 0.001–0.8% antimony and/or bismuth; 0–0.005% arsenic; 0–0.001% cadmium; 0.005–0.02% copper; 0–0.001 iron; 0.01–0.08% lead; 0–0.001% magnesium; 0–0.001% manganese; 0–0.001% nickel; 0–0.01 silver; 0–0.001% titanium; and the tin plus zinc content is at least 98% of the metal alloy coating. Another formulation of the corrosion resistant tin and zinc metal alloy includes 15–35% tin; 65–85% zinc; 0–7.5% antimony; 0–1.7% bismuth. Yet another formulation of the corrosion resistant tin and zinc metal alloy includes 15–35% tin; 65–85% zinc; and 0.01–0.5% antimony and/or bismuth. Still another formulation of the corrosion resistant tin and zinc metal alloy includes 15–35% tin; 65–85% zinc; 0.01–0.5% antimony and/or bismuth; and less than 2% copper and/or iron. Still yet another formulation of the corrosion resistant tin and zinc metal alloy includes 15–35% tin; 65–85% zinc; 0–0.5% antimony; 0–0.5% bismuth; and less than 0.01% lead. A further formulation of the corrosion resistant tin and zinc metal alloy includes 15–35% tin; 65–85% zinc; 0–0.5% antimony; 0–0.5% bismuth; less than 2% copper and/or iron; and less than 0.01% lead. Yet a further formulation of the corrosion resistant tin and zinc metal alloy includes 15–35% tin; 65–85% zinc; 0–7.5% antimony; 0–1.7% bismuth; 0–2% copper; 0–0.1% iron; and 0–0.05% lead. Another formulation of the corrosion resistant tin and zinc metal alloy includes 70–90% tin; 9 to 10–30% zinc; 0–7.5% antimony, 0–1.7% bismuth; 0–2% copper; 0–0.1% iron; and 0–0.05% lead. Still another formulation of the corrosion resistant tin and zinc metal alloy includes 80–90% tin; 9 to 10–20% zinc; 0–7.5% antimony; 0–1.7% bismuth; 0–2% copper; 0–0.1% iron; and 0–0.05% lead. Yet another formulation of the corrosion resistant tin and zinc metal alloy includes 70–90% tin; 9 to 10–30% zinc; 0–2.5% antimony; 0–0.5% bismuth; 0–2% copper; 0–0.1% iron; and 0–0.05% lead. Still yet another formulation of the corrosion resistant tin and zinc metal alloy includes 70–90% tin; 9 to 10–30% zinc; 0.5–7.5% antimony, 0.5–1.7% bismuth; 0–2% copper; 0–0.1% iron; and 0–0.05% lead. A further formulation of the corrosion resistant tin and zinc metal alloy includes 80–90% tin; 9 to 10–20% zinc; 0–7.5% antimony; 0–1.7% bismuth; 0–2% copper; 0–0.1% iron; and 0–0.01% lead. A further formulation of the corrosion resistant tin and zinc metal alloy includes 15–70% tin; 30–85% zinc; 0–7.5% antimony; 0–1.7% bismuth; 0–5% copper; 0–0.1% iron; 0–0.05% lead; and 0–5% nickel. Yet a further formulation of the corrosion resistant tin and zinc metal alloy includes 15–70% tin; 30–85% zinc; 0–0.5% antimony; 0–0.5% bismuth; 0–2% copper; 0–0.1% iron; 0–0.01% lead; and 0–1% nickel. Still a further formulation of the corrosion resistant tin and zinc metal alloy includes 35–70% tin; 30–65% zinc; 0–0.5% antimony; 0–0.5% bismuth; 0–2% copper; 0–0.1% iron; 0–0.05% lead; and 0–1% nickel. Still yet a further formulation of the corrosion resistant tin and zinc metal alloy includes 45–55% tin; 45–55% zinc; 0–0.5% antimony and/or bismuth; 1–1.5% copper; 0–0.1% iron; 0–0.01% lead; 0.3–0.9% nickel; and the tin content plus zinc content at least 95% of the metal alloy. Another formulation of the corrosion resistant tin and zinc metal alloy includes 20–90% tin; 9 to 10–80% zinc; 0–0.5% aluminum; 0–1% antimony; 0–2.7% copper; and 0–0.15% titanium. Still another formulation of the corrosion resistant tin and zinc metal alloy includes 20–90% tin; 9 to 10–80% zinc; 0–0.3% aluminum; 0–5.5% antimony; and 0–1% copper. Yet another formulation of the corrosion resistant tin and zinc metal alloy includes 20–90% tin; 9 to 10–80% zinc; 0–5% aluminun; 0–5.5% antimony; 0–1.7% bismuth; 0–5% copper; 0–0.1% iron; 0–0.05% lead; 0–5% magnesium; 0–5% nickel; and 0–1% titanium. Still another formulation of the corrosion resistant tin and zinc metal alloy includes 20–75% tin; 25–80% zinc; 0–1% aluminum; 0–5.5% antimony; 0–1.7% bismuth; 0–2.7% copper; 0–0.1% iron; 0–0.05% lead; 0–1% magnesium; 0–1% nickel; and 0–0.5% titanium. Still yet another formulation of the corrosion resistant tin and zinc metal alloy includes 20–80% tin; 20–80% zinc; 0–0.5% aluminum; 0–5.5% antimony; 0–1.5% bismuth; 0–2.7% copper; 0–0.1% iron; 0–0.01% lead; 0–0.4% magnesium; 0–1% nickel; and 0–0.15% titanium. A further formulation of the corrosion resistant tin and zinc metal alloy includes 35–70% tin; 30–65% zinc; 0–0.3% aluminum; 0.05–1% antimony and/or bismuth; 0–1% copper; 0–0.1% iron; 0–0.01% lead; 0–0.4% magnesium; 0–0.7% nickel; 0–0.15% titanium; and the tin plus zinc content is at least 90% of the metal alloy. Yet a further formulation of the corrosion resistant tin and zinc metal alloy includes 15–90% tin; 9 to 10–85% zinc; 0–5% aluminum; 0–7.5% antimony; 0–1.7% bismuth; 0–5% copper; 0–1% iron; 0–1% lead; 0–5% magnesium; 0–5% nickel; and 0–1% titanium. Still yet a further formulation of the corrosion resistant tin and zinc metal alloy includes 10–70% tin; 30–90% zinc; 0–0.25% aluminum; 0–0.02% chromium; 0–1.5% copper; 0–0.01% iron; 0–0.01% lead; 0–0.01% magnesium; and 0–0.18% titanium. Another formulation of the corrosion resistant tin and zinc metal alloy includes 10–70% tin; 30–90% zinc; 0–0.25% aluminum; 0–0.02% chromium; 0–1.5% copper; 0–0.01% iron; 0–0.01% lead; 0–0.01% magnesium; and 0–0.18% titanium. Still another formulation of the corrosion resistant tin and zinc metal alloy includes 15–90% tin; 9 to 10–80% zinc; 0–0.01% aluminum; 0–1% antimony; 0–0.005% arsenic; 0–0.01% bismuth; 0–0.05% cadmium; 0–0.05% copper; 0–0.005% iron; 0–0.1% lead; 0–0.005% nickel; and 0–0.005% silver. Yet another formulation of the corrosion resistant tin and zinc metal alloy includes 70–90% tin; 9 to 10–30% zinc; 0–0.01% aluminum; 0.001–0.8% antimony, 0–0.005% arsenic; 0.001–0.005% bismuth; 0–0.01% cadmium; 0–0.02% copper; 0–0.005% iron; 0–0.1% lead; 0–0.005% nickel; and 0–0.005% silver. Still yet another formulation of the corrosion resistant tin and zinc metal alloy includes 79.5–81.5% tin; 18.5–20.5% zinc; 0.002–0.008% aluminum; 0.6–0.7% antimony; 0–0.001% arsenic; 0.002–0.005% bismuth; 0–0.001% cadmium; 0.005–0.02% copper; 0–0.001% iron; 0.02–0.08% lead; 0–0.001% nickel; and 0–0.001% silver. A further formulation of the corrosion resistant tin and zinc metal alloy includes 70–90% tin; 9 to 10–30% zinc; 0–0.01% aluminum; 0–1% antimony; 0–0.005% arsenic; 0–0.01% bismuth; 0–0.01% cadmium; 0–0.5% copper, 0–0.005% iron; 0–0.1% lead; 0–0.005% nickel; and 0–0.005% silver. Yet further formulation of the corrosion resistant tin and zinc metal alloy includes 60–90% tin; 9 to 10–40% zinc; 0–0.5% aluminum; 0–2% antimony; 0–0.01% arsenic; 0–1.5% bismuth; 0–0.05% boron; 0–0.1% cadmium; 0–0.5% carbon; 0.0–0.5% chromium; 0–2% copper; up to 1% iron; less than 0.5% lead; 0–0.4% magnesium; 0–0.1% manganese; 0–0.1% molybdenum; 0–1% nickel;

0–0.5% silicon; 0–0.01% silver; 0–0.01% sulfur; 0–0.01% tellurium; 0–0.15% titanium; and 0–0.1% vanadium. Still a further formulation of the corrosion resistant tin and zinc metal alloy includes 70–90% tin; 9 to 10–30% zinc; 0–0.1% aluminum; 0–1% antimony and/or bismuth; 0–0.05% arsenic; 0–0.01% cadmium; 0–0.5% copper; less than 0.05% iron; less than 0.1% lead; 0–0.1% magnesium; 0–0.1% manganese; 0–0.5% nickel; 0–0.5% silicon; 0–0.05% silver; 0–0.05% titanium; and the tin plus zinc content is at least 95% of the metal alloy. Still yet a further formulation of the corrosion resistant tin and zinc metal alloy includes 75–85% tin; 15–25% zinc; 0.001–0.01% aluminum; 0.001–0.8% antimony and/or bismuth; 0–0.005% arsenic; 0–0.001% cadmium; 0.005–0.02% copper; 0–0.0015% iron; 0.01–0.08% lead; 0–0.001% magnesium; 0–0.001% manganese; 0–0.001% nickel; 0–0.5% silicon; 0–0.01% silver; 0–0.001% titanium; and the tin plus zinc content is at least 98% of the metal alloy. Another formulation of the corrosion resistant tin and zinc metal alloy includes 15–90% tin; 9 to 10–85% zinc; 0–2% aluminum; 0–2% antimony; 0–1.7% bismuth; 0–2% copper; 0–1% iron; 0–0.5% lead; 0–2% magnesium; 0–2% nickel; and 0–1% titanium. Still another formulation of the corrosion resistant tin and zinc metal alloy includes 15–90% tin; 9 to 10–85% zinc; 0–1% aluminum; 0–2% antimony; 0–1.7% bismuth; 0–2% copper; 0–1% iron; 0–0.5% lead; 0–1% magnesium; 0–1% nickel; and 0–0.5% titanium. Yet another formulation of the corrosion resistant tin and zinc metal alloy includes 20–90% tin; 9 to 10–80% zinc; 0–0.51% aluminun; 0–2% antimony; 0–1.5% bismuth; 0–0.01% boron; 0–0.1% cadmium; 0–0.5% carbon; 0–0.5% chromium; 0–2% copper, 0–1% iron; 0–0.5% lead; 0–0.4% magnesium; 0–0.1% manganese; 0–0.1% molybdenum; 0–1% nickel; 0–0.5% silicon; and 0–0.15% titanium; and 0–0.1% vanadium. Still another formulation of the corrosion resistant tin and zinc metal alloy includes 20–65% tin; 30–80% zinc; 0–0.3% aluminum; 0–1% antimony and/or bismuth; 0–1% copper, 0–0.6% iron; 0–0.5% lead; 0–0.4% magnesium; 0–0.1% manganese; 0–0.7% nickel; 0–0.15% titanium; and the tin plus zinc content is at least 95% of the metal alloy. Still yet another formulation of the corrosion resistant tin and zinc metal alloy includes 20–50% tin; 50–80% zinc; 0–0.3% aluminum; 0.005–0.5% antimony and/or bismuth; 0–0.05% cadmium; 0–0.2% copper; 0–0.6% iron; 0–0.4% lead; 0–0.1% magnesium; 0–0.05% manganese; 0–0.1% nickel; 0–0.1% silicon; 0–0.15% titanium; and the tin plus zinc content is at least 95% of the metal alloy. A further formulation of the corrosion resistant tin and zinc metal alloy includes 20–70% tin; 30–75% zinc; 0.0005–2% aluminum; 0.001–2% antimony; 0.0001–1% bismuth; 0–2% copper; 0–0.5% lead; and 0.0001–0.1% titanium. Yet a further formulation of the corrosion resistant tin and zinc metal alloy includes 40–60% tin; 40–60% zinc; 0.0005–0.75% aluminum; 0.001–1% antimony; 0–0.01% arsenic; 0.0001–0.2% bismuth; 0–0.01% cadmium; 0.001–1% copper; 0–0.01% chromium; 0–0.1% iron; 0–0.1% lead; 0–0.01% manganese; 0–0.2% nickel; 0–0.01% silver; and 0.0005–0.05% titanium. Still yet a further formulation of the corrosion resistant tin and zinc metal alloy includes 25–70% tin; 30–75% zinc; 0–0.5% aluminum; 0–0.5% copper; 0–0.1% lead; and 0–0.05% titanium. Another formulation of the corrosion resistant tin and zinc metal alloy includes 30–70% tin; 30–70% zinc; 0.0001–0.5% aluminum; 0.001–2% antimony; 0–0.01% arsenic; 0.0001–1% bismuth; 0–0.01% boron; 0–0.01% cadmium; 0–0.05% carbon; 0–0.05% chromium; 0–2% copper, 0–0.1% iron; 0–0.5% lead; 0–0.01% magnesium; 0–0.01% manganese; 0–0.01% molybdenum; 0–1% nickel; 0–0.01% silicon; 0–0.01% silver; 0–0.01% sulfur; 0–0.01% tellurium; 0.0001–0.1% titanium; and 0–0.01% vanadium. Still another formulation of the corrosion resistant tin and zinc metal alloy includes 40–60% tin; 40–60% zinc; 0.0005–0.4% aluminum; 0.01–0.8% antimony; 0–0.005% arsenic; 0.001–0.05% bismuth; 0–0.005% cadmium; 0.005–0.5% copper; 0–0.05% iron; 0–0.1% lead; 0–0.05% nickel; 0–0.005% silver; and 0.0005–0.05% titanium. Yet another formulation of the corrosion resistant tin and zinc metal alloy includes 48–52% tin; 48–52% zinc; 0.005–0.24% aluminum; 0.05–0.64% antimony; 0–0.001% arsenic; 0.002–0.005% bismuth; 0–0.001% cadmium; 0.01–0.3% copper; 0–0.016% iron; 0–0.08% lead; 0–0.001% nickel; 0–0.001 silver; and 0.001–0.02% titanium. Yet another formulation of the corrosion resistant tin and zinc metal alloy includes 15–90% tin; 9 to 10–85% zinc; 0–5% aluminum; 0–5% antimony; 0–5% bismuth; 0–1% cadmium; 0–5% copper; 0–1% iron; 0–1% lead; and 0–1% nickel. Still another formulation of the corrosion resistant tin and zinc metal alloy includes 30–85% tin; 15–70% zinc; 0–1% antimony; 0–0.1% arsenic; 0–1% bismuth; 0–0.1% cadmium; 0–1% copper; 0–0.1% iron; 0–0.1% lead; 0–0.1% manganese; 0–0.1% nickel; 0–0.1% silver; and 0–0.05% titanium. Still yet another formulation of the corrosion resistant tin and zinc metal alloy includes 30–80% tin; 20–70% zinc; 0–0.5% aluminum; 0–0.5% antimony; 0–0.5% bismuth; 0–0.5% copper; and 0–0.1% lead. A further formulation of the corrosion resistant tin and zinc metal alloy includes 30–85% tin; 15–70% zinc; 0–0.5% aluminum; 0–2 antimony; 0–0.01% arsenic; 0–1.5% bismuth; 0–0.05% boron; 0–0.1% cadmium; 0–0.1% carbon; 0–0.1% chromium; 0–2% copper, 0–1% iron; 0–0.5% lead; 0–0.4% magnesium; 0–0.1% manganese; 0–0.05% molybdenum; 0–1% nickel; 0–0.5% silicon; 0–0.05% silver; 0–0.01% tellurium; 0–0.15% titanium; and 0–0.05% vanadium. Yet a further formulation of the corrosion resistant tin and zinc metal alloy includes 30–65% tin; 35–70% zinc; 0–0.1% aluminum; 0–1% antimony and/or bismuth; 0–0.05% arsenic; 0–0.01% cadmium; 0–0.5% copper; 0–0.05% iron; 0–0.1% lead; 0–0.1% magnesium; 0–0.1% manganese; 0–0.5% nickel; 0–0.05% silver; 0–0.05% titanium; and the tin plus zinc content is at least 98% of the metal alloy. Still yet a further formulation of the corrosion resistant tin and zinc metal alloy includes 40–60% tin; 40–60% zinc; 0–0.4% aluminum; 0–0.8% antimony and/or bismuth; 0–0.005% arsenic; 0–0.005% cadmium; 0–0.2% copper; 0–0.001% iron; 0.01–0.08% lead; 0–0.001% magnesium; 0–0.001% manganese; 0–0.05% nickel; 0–0.005% silver; 0–0.05% titanium; and the tin plus zinc content is at least 99% of the metal alloy. Another formulation of the corrosion resistant tin and zinc metal alloy includes 15–90% tin; 9 to 10–85% zinc; 0–5% aluminum; 0–7.5% antimony; 0–5% bismuth; 0–1% cadmium; 0–5% copper; 0–5% nickel; and 0–0.5% titanium. Still another formulation of the corrosion resistant tin and zinc metal alloy includes 20–80% tin; 20–80% zinc; 0–2% aluminum; 0–1% antimony; 0–0.05% arsenic; 0–1% bismuth; 0–0.1% boron; 0–0.1% cadmium; 0–0.5% carbon; 0–0.5% chromium; 0–2% copper; 0–1% iron; 0–1% lead; 0–1% magnesium; 0–0.1% manganese; 0–0.1% molybdenum; 0–1% nickel; 0–0.5% silicon; 0–0.1% silver; 0–0.05% tellurium; 0–0.5% titanium; and 0–0.1% vanadium. Yet another formulation of the corrosion resistant tin and zinc metal alloy includes 20–80% tin; 20–80% zinc; 0–1% aluminum; 0–2% antimony; 0–0.02% arsenic; 0–1.5% bismuth; 0–0.5% boron; 0–0.1% cadmium; 0–0.5% carbon; 0–0.5% chromium; 0–2% copper; 0–1% iron; 0–1% lead; 0–0.4% magnesium; 0–0.1% manganese; 0–0.1% molybdenum; 0–1% nickel; 0–0.05% silicon; 0–0.05% silver; 0–0.02% sulfur; 0–0.04% tellurium; 0–0.15% titanium; and 0–0.05% vanadium. Still yet another formulation of the corrosion resistant tin and zinc metal alloy includes 30–70% tin; 30–70% zinc; 0–0.4% aluminum; 0–0.8% antimony; 0–0.005% arsenic; 0–0.5% bismuth; 0–0.1% boron; 0–0.05% cadmium; 0–0.1% carbon; 0–0.1% chromium; 0–1% copper; 0–0.6% iron; 0–0.5% lead; 0–0.1% magnesium; 0–0.1% manganese; 0–0.05% molybdenum; 0–0.7% nickel; 0–0.01% silicon; 0–0.01% silver; 0–0.01% sulfur; 0–0.01% tellurium; 0–0.1% titanium; 0–0.01% vanadium; and the tin plus zinc content is at least 90 weight percent of the metal alloy. A further formulation of the corrosion resistant tin and zinc metal alloy includes 40–60% tin; 40–60% zinc; 0–0.4% aluminum; 0–1% antimony and/or bismuth; 0–0.001% arsenic; 0–0.01% boron; 0–0.005% cadmium; 0–0.05% carbon; 0–0.05% chromium; 0–0.1% copper; 0–0.05% iron; 0–0.1% lead; 0–0.01% magnesium; 0–0.01% manganese; 0–0.01% molybdenum; 0–0.3% nickel; 0–0.001% silicon; 0–0.001% silver; 0–0.001% sulfur; 0–0.001% tellurium; 0–0.05% titanium; 0–0.001% vanadium; and the tin plus zinc content is at least 95 weight percent of the metal alloy. Yet a further formulation of the corrosion resistant tin and zinc metal alloy includes 45–55% zinc; 45–55% tin; 0–0.4% aluminum; 0–0.8% antimony and/or bismuth; 0–0.001% arsenic; 0–0.001% boron; 0–0.001% cadmium; 0–0.01% carbon; 0–0.05% copper; 0–0.001 iron; 0–0.08% lead; 0–0.001% magnesium; 0–0.001% manganese; 0–0.001% molybdenum; 0–0.1% nickel; 0–0.001% silicon; 0–0.005% silver; 0–0.001% sulfur; 0–0.001% tellurium; 0–0.05% titanium; 0–0.001% vanadium; and the tin content plus the zinc content is at least 99% of the metal alloy. Another formulation of the corrosion resistant tin and zinc metal alloy includes 20–80% tin; 20–80% zinc; 0–1% aluminum; 0–2% antimony; 0–0.02% arsenic; 0–1.5% bismuth; 0–0.05% boron; 0–0.1% cadmium; 0–0.5% carbon; 0–0.5% chromium; 0–2% copper; 0–1% iron; 0–1% lead; 0–0.4% magnesium; 0–0.1% manganese; 0–0.1% molybdenum; 0–1% nickel; 0–0.5% silicon; 0–0.05% silver, 0–0.02% sulfur; 0–0.04% tellurium; 0–0.15% titanium; and 0–0.05% vanadium. Yet another formulation of the corrosion resistant tin and zinc metal alloy includes 30–70% tin; 30–70% zinc; 0–0.4% aluminum; 0–0.8% antimony; 0–0.005% arsenic; 0–0.5% bismuth; 0–0.1% boron; 0–0.05% cadmium; 0–0.1% carbon; 0–0.1% chromium; 0–1% copper, 0–0.6% iron; 0–0.5% lead; 0–0.1% magnesium; 0–0.1% manganese; 0–0.05% molybdenum; 0–0.9% nickel; 0–0.01% silicon; 0–0.01% silver; 0–0.01% sulfur; 0–0.01% tellurium; 0–0.1% titanium; 0–0.01% vanadium; and the tin plus zinc content is at least 90 weight percent of the metal alloy. Still another formulation of the corrosion resistant tin and zinc metal alloy includes 40–60% tin; 40–60% zinc; 0–0.4% aluminun; 0–1% antimony and/or bismuth; 0–0.001% arsenic; 0–0.01% boron; 0–0.005% cadmium; 0–0.05% carbon; 0–0.05% chromium; 0–0.1% copper; 0–0.05% iron; 0–0.1% lead; 0–0.01% magnesium; 0–0.01% manganese; 0–0.01% molybdenum; 0–0.9% nickel; 0–0.001% silicon; 0–0.001% silver; 0–0.001% sulfur; 0–0.001% tellurium; 0–0.05% titanium; 0–0.001% vanadium; and the tin plus zinc content is at least 95 weight percent of the metal alloy. Still yet another formulation of the corrosion resistant tin and zinc metal alloy includes 45–55% zinc; 45–55% tin; 0–0.4% aluminum; 0–0.8% antimony and/or bismuth; 0–0.001% arsenic; 0–0.001% boron; 0–0.001% cadmium; 0–0.01% carbon; 0–0.05% copper; 0–0.001% iron; 0–0.08% lead; 0–0.001% magnesium; 0–0.001% manganese; 0–0.001% molybdenum; 0–0.9% nickel; 0–0.001% silicon; 0–0.005% silver; 0–0.001% sulfur; 0–0.001% tellurium; 0–0.05% titanium; 0–0.001% vanadium; and the tin content plus the zinc content is at least 99% of the metal alloy. A further formulation of the corrosion resistant tin and zinc metal alloy includes 15–90% tin; 9 to 10–85% zinc; 0–0.5% aluminum; 0–5.5% antimony; 0–1.7% bismuth; 0–2.7% copper; 0–0.4% magnesium; 0–1% nickel; 0–0.15% titanium. Yet a further formulation of the corrosion resistant tin and zinc metal alloy includes 15–90% tin; 9 to 10–85% zinc; 0–0.3% aluminum; 0–1% antimony; 0–1.7% bismuth; 0–1% copper, 0–0.4% magnesium; 0–1% nickel; 0–0.15% titanium. Still a further formulation of the corrosion resistant tin and zinc metal alloy includes 15–80% tin; 20–85% zinc; 0–0.3% aluminum; 0–1% antimony; 0–1.7% bismuth; 0–1% copper; 0–0.4% magnesium; 0–1% nickel; 0–0.15% titanium. Still yet further formulation of the corrosion resistant tin and zinc metal alloy includes 15–80% tin; 20–85% zinc; 0–0.5% aluminum; 0–5.5% antimony; 0–1.7% bismuth; 0–2.7% copper; 0–0.4% magnesium; 0–1% nickel; and 0–0.15% titanium. Another formulation of the corrosion resistant tin and zinc metal alloy includes 15–70% tin; 30–85% zinc; 0–0.25% aluminum; 0–1.5% copper; 0–0.02% chromium; 0–0.01% iron; 0–0.01% lead; 0–0.01% manganese; and 0–0.18% titanium. Still another formulation of the corrosion resistant tin and zinc metal alloy includes 49.75–50.25% tin; 49.75–50.25% zinc; 0–0.02% aluminum; 0–0.2% antimony; 0–0.2% arsenic; 0–0.2% copper; 0–0.025% iron; 0–0.002% palladium; and 0–0.015% titanium. Yet another formulation of the corrosion resistant tin and zinc metal alloy includes 49.5–50.5% tin; 49.5–50.5% zinc; 0.005–0.21% aluminum; 0.05–0.64% antimony, 0–0.001% arsenic; 0–0.004% bismuth; 0–0.001% cadmium; 0.01–0.3% copper; 0–0.001% iron; 0–0.001% nickel; 0–0.001% silver; 0.001–0.02% titanium. Still yet another formulation of the corrosion resistant tin and zinc metal alloy includes 49.75–50.25% tin; 49.75–50.25% zinc; 0–0.25% aluminum; 0–0.35% antimony; 0–0.02% arsenic; 0–0.001% cadmium; 0–0.02% copper; 0–0.025% iron; 0–0.08% lead; and 0–0.0175% titanium. A further formulation of the corrosion resistant tin and zinc metal alloy includes 35–70% tin; 30–65% zinc; 0–5% copper; and 0–5% nickel. Yet a further formulation of the corrosion resistant tin and zinc metal alloy includes 20–80% tin; 20–85% zinc; 0–0.1% lead. Still a further formulation of the corrosion resistant tin and zinc metal alloy includes 15–30% tin; 70–85% zinc; and 0–0.1% lead. Yet a further formulation of the corrosion resistant tin and zinc metal alloy includes 15–90% tin; 9 to 10–85% zinc; and 0–2% magnesium. Still yet a further formulation of the corrosion resistant tin and zinc metal alloy includes 10–75% tin; 25–90% zinc; 0–0.25% aluminum; 0–1.5% copper; 0–0.02% chromium; 0–0.01% iron; 0–0.01% lead; 0–0.01% manganese; and 0–0.18% titanium. Another formulation of the corrosion resistant tin and zinc metal alloy includes 15–35% tin; 65–85% zinc; 0–7.5% antimony; 0–1.7% bismuth; 0–0.1% iron; and 0–0.05% lead. Yet another formulation of the corrosion resistant tin and zinc metal alloy includes 15–70% tin; 30–85% zinc; 0–7.5% antimony; 0–1.7% bismuth; 0–5% copper; 0–0.1% iron; 0–0.05% lead; and 0.3–5% nickel. Still another formulation of the corrosion resistant tin and zinc metal alloy includes 15–70% tin; 30–85% zinc; 0–7.5% antimony; 0–1.7% bismuth; 0–2% copper; 0–0.1% iron; 0–0.05% lead; and 0.3–1% nickel. Still yet another formulation of the corrosion resistant tin and zinc metal alloy includes 15–70% tin; 30–85% zinc; 0.1–5% copper; and 0.3–5% nickel. A further formulation of the corrosion resistant tin and zinc metal alloy includes 35–70% tin; 30–65% zinc; 0.1–2% copper; and 0.3–1% nickel. Still a further formulation of the corrosion resistant tin and zinc metal alloy includes 3 5–70% tin; 30–65% zinc; 0.1–1.5% copper; and 0.3–0.9% nickel. A further formulation of the corrosion resistant tin and zinc metal alloy includes at least 15% tin; zinc; and at least 0.05% antimony, bismuth and/or copper. Still a further formulation of the corrosion resistant tin and zinc metal alloy includes 9 to 10–20% zinc; 0–2.5% antimony; 0–0.5% bismuth; and the remainder tin. Still a further formulation of the corrosion resistant tin and zinc metal alloy includes 80–90% tin; 9 to 10–20% zinc; 0.5–1.7% bismuth; 0–2% copper, 0–0.1% iron; and 0–0.05% lead. Still yet a further formulation of the corrosion resistant tin and zinc metal alloy includes 80–90% tin; 9 to 10–20% zinc; 0.5–7.5% antimony; 0–2% copper; 0–0.1% iron; and 0–0.05% lead. Another formulation of the corrosion resistant tin and zinc metal alloy includes 80–90% tin; 9 to 10–20% zinc; 0–0.5% antimony; 0–2% copper; 0–0.1% iron; and 0–0.05% lead. Still another formulation of the corrosion resistant tin and zinc metal alloy includes 80–90% tin; 9 to 10–20% zinc; 0–0.5% bismuth; 0–2% copper; 0–0. 1% iron; and 0–0.05% lead. Yet another formulation of the corrosion resistant tin and zinc metal alloy includes 70–90% tin; 9 to 10–30% zinc; at least 0.01% antimony. Still yet another formulation of the corrosion resistant tin and zinc metal alloy includes 70–90% tin; 9 to 10–30% zinc; 0.01–1.7% bismuth. Still another formulation of the corrosion resistant tin and zinc metal alloy includes 70–90% tin; 9 to 10–30% zinc; 0.1–2% iron. Yet another formulation of the corrosion resistant tin and zinc metal alloy includes 70–90% tin; 9 to 10–30% zinc; 0.1–2% copper. Still yet another formulation of the corrosion resistant tin and zinc metal alloy includes a majority of tin and zinc, 0–0.5% aluminum; 0–5.5% antimony; 0–2.7% copper; and 0–0.15% titanium. A further formulation of the corrosion resistant tin and zinc metal alloy includes a majority of tin and zinc, 0–0.3% aluminum; 0–1% antimony; and 0–1% copper. Yet a further formulation of the corrosion resistant tin and zinc metal alloy includes 20–90% tin; 9 to 10–80% zinc; 0–1% aluminum; 0–5.5% antimony; 0–1.7% bismuth; 0–2.7% copper; 0–0.1% iron; 0–0.05% lead; 0–1% magnesium; 0–1% nickel; and 0–0.5% titanium. Still a further formulation of the corrosion resistant tin and zinc metal alloy includes 20–80% tin; 20–80% zinc; 0–5% aluminum; 0–5.5% antimony; 0–1.5% bismuth; 0–5% copper; 0–5% magnesium; 0–5% nickel; and 0–1% titanium. Still yet a further formulation of the corrosion resistant tin and zinc metal alloy includes 20–80% tin; 20–80% zinc; 0–0.5% aluminum; 0–5.5% antimony; 0–1.7% bismuth; 0–2.7% copper; 0–0.4% magnesium; 0–1% nickel; and 0–0.15% titanium. Still a further formulation of the corrosion resistant tin and zinc metal alloy includes 20–80% tin; 20–80% zinc; 0–0.3% aluminum; 0–1% antimony; 0–1.7% bismuth; 0–1% copper; 0–0.4% magnesium; 0–0.7% nickel; and 0–0.15% titanium. Another formulation of the corrosion resistant tin and zinc metal alloy includes a majority of tin and zinc, 0–0.5% aluminum; 0–2% antimony; 0–2% copper; and 0–0.15% titanium. Still another formulation of the corrosion resistant tin and zinc metal alloy includes a majority of tin and zinc, 0–0.3% aluminum; 0–1% antimony; and 0–1% copper. Yet another formulation of the corrosion resistant tin and zinc metal alloy includes 20–90% tin; 9 to 10–80% zinc; 0–2% aluminum; 0–2% antimony and/or bismuth; 0–2% copper; 0–1% iron; 0–0.5% lead; 0–0.4% magnesium; 0–0.1% manganese; 0–1% nickel; and 0–0.15% titanium. Still yet another formulation of the corrosion resistant tin and zinc metal alloy includes 20–65% tin; 35–80% zinc; 0–2% aluminum; 0–1% antimony and/or bismuth; 0–1% copper; 0–0.6% iron; 0–0.5% lead; 0–0.4% magnesium; 0–0.1% manganese; 0–0.7% nickel; and 0–0.15% titanium. Yet another formulation of the corrosion resistant tin and zinc metal alloy includes 20–50% tin; 50–80% zinc; 0–0.3% aluminum; 0.005–0.5% antimony and/or bismuth; 0–0.2% copper; 0–0.6% iron; 0–0.4% lead; 0–0.4% magnesium; 0–0.05% manganese; 0–0.1% nickel; and 0–0.15% titanium. A further formulation of the corrosion resistant tin and zinc metal alloy includes 15–90% tin; 9 to 10–85% zinc; 0–2% aluminum; 0–2% antimony; 0–1.7% bismuth; 0–2% copper; 0–1% iron; 0–1% lead; 0–2% magnesium; 0–2% nickel; and 0–1% titanium. Still a further formulation of the corrosion resistant tin and zinc metal alloy includes 30–85% tin; 15–70% zinc; 0–1% aluminum; 0–1% antimony; 0–0.01% arsenic; 0–1% bismuth; 0–0.1% cadmium; 0–0.1% chromium; 0–1% copper; 0–0.1% iron; 0–0.1% lead; 0–0.01% manganese; 0–0.1% nickel; 0–0.01% silver; and 0–0.05% titanium. Still yet a further formulation of the corrosion resistant tin and zinc metal alloy includes 50–85% tin; 15–50% zinc; 0–7.5% aluminum; 0–2% antimony; 0–0.05% arsenic; 0–0.1% boron; 0–1.7% bismuth; 0–0.5% cadmium; 0–1% carbon; 0–1% chromium; 0–5% copper; 0–1% iron; 0–10% lead; 0–1% magnesium; 0–0.1% manganese; 0–0.1% molybdenum; 0–5% nickel; 0–0.5% silicon; 0–0.1% silver; 0–0.05% tellurium; 0–0.5% titanium; and 0–0.1% vanadium. Yet a further formulation of the corrosion resistant tin and zinc metal alloy includes 15–50% tin; 50–85% zinc; 0–7.5% aluminum; 0–2% antimony; 0–0.05% arsenic; 0–0.1% boron; 0–1.7% bismuth; 0–0.5% cadmium; 0–1% carbon; 0–1% chromium; 0–5% copper, 0–1% iron; 0–10% lead; 0–1% magnesium; 0–0.1% manganese; 0–0.1% molybdenum; 0–5% nickel; 0–0.5% silicon; 0–0.1% silver, 0–0.05% tellurium; 0–0.5% titanium; and 0–0.1% vanadium. Still a further formulation of the corrosion resistant tin and zinc metal alloy includes 20–80% tin; 20–80% zinc; 0–5% aluminum; 0–7.5% antimony; 0–5% bismuth; 0–1% cadmium; 0–5% copper; 0–5% nickel; and 0–0.5% titanium. Still yet a further formulation of the corrosion resistant tin and zinc metal alloy includes 15–90% tin; 9 to 10–85% zinc; 0–7.5% aluminum; 0–2% antimony; 0–0.05% arsenic; 0–0.1% boron; 0–1.7% bismuth; 0–0.5% cadmium; 0–1% carbon; 0–1% chromium; 0–5% copper; 0–1% iron; 0–10% lead; 0–1% magnesium; 0–0.1% manganese; 0–0.1% molybdenum; 0–5% nickel; 0–0.5% silicon; 0–0.1% silver; 0–0.05% tellurium; 0–0.5% titanium; and 0–0.1% vanadium. Another formulation of the corrosion resistant tin and zinc metal alloy includes 30–70% tin; 30–70% zinc; 0–7.5% aluminum; 0–2% antimony; 0–1.7% bismuth; 0–0.5% cadmium; 0–5% copper; 0–10% lead; and 0–5% nickel. Still another formulation of the corrosion resistant tin and zinc metal alloy includes 40–60% tin; 40–60% zinc; 0–2% aluminum; 0–2% antimony, bismuth, cadmium and/or copper; 0–2% lead; and 0–1% nickel.

The following are several examples of tin or tin and zinc metal alloy being applied by various processes to various types of metal strip. The following examples also illustrate various ways the coated metal strip can be formed in various types of products. The following examples further illustrate the formation of the metal alloy into various types of materials. The following examples only illustrate a few, not all, aspects of the present invention.

EXAMPLE A

A metal strip is unwound from a roll of metal strip. The metal strip has a thickness of less than about 762 microns. The metal strip is continuously passed through an electrolytic tank to plate nickel on the strip surface. The nickel plated layer has a thickness of about 1–3 microns. The metal alloy includes at least about 85% tin, at least about 9–10% zinc and less than about 0.5% lead. The metal alloy in the melting pot is at a temperature of about 301–455° C. The metal strip is passed through the melting pot having a length of about 16 feet at a speed of about 100 ft/min. The metal strip has a resident time in the melting pot of less than about 10 seconds. The coated metal strip is passed through coating rollers and/or an air-knife to achieve a coating thickness of about 7–77 microns. The coated metal strip is rewound into a roll of coated metal strip.

EXAMPLE B

A metal strip is unwound from a roll of metal strip. The metal strip has a thickness of less than about 762 microns. The metal strip is plated with chromium of a thickness of less than about 3 microns. A metal alloy having a composition of at least about 45% tin, at least about 45% zinc, less than about 1% of a metal additive, and less than about 0.1% lead is coated onto the metal strip. The metal alloy is heated in a melting pot at a temperature of about 301–482° C. The strip is passed through the melting pot having a length of about 16 feet at a speed of about 100 ft/min. The metal strip has a resident time in the melting pot of less than about 10 seconds. The coated metal strip is passed through coating rollers and/or an air-knife to achieve a coating thickness of about 7–77 microns. The coated metal strip is rewound into a roll of coated metal strip.

EXAMPLE C

A metal strip is unwound from a roll of metal strip. The metal strip has a thickness of less than about 762 microns. The metal strip is continuously plated with a tin layer of about 1–3 microns thick. A metal alloy having a composition of at least about 45% tin and at least about 45% zinc is coated onto the metal strip. The metal alloy is heated in a melting pot at a temperature of about 301–482° C. The metal strip is passed through the melting pot having a length of about 16 feet at a speed of about 100 ft./min. The metal strip has a resident time in the melting pot of less than about 10 seconds. The coated metal strip is passed through coating rollers and/or an air-knife to achieve a coating thickness of about 7–77 microns. The coated metal strip is rewound into a roll of coated metal strip.

EXAMPLE D

A metal strip is unwound from a roll of metal strip and continuously plated with a tin layer of a thickness of less than about 3 microns. The metal strip has a thickness of less than about 762 microns. A metal alloy having a composition of at least about 45% tin, at least about 45% zinc, and less than about 0.1% lead is coated onto the metal strip. The metal alloy is heated in a melting pot at a temperature of about 301–427° C. The metal strip is passed through the melting pot having a length of about 16 feet at a speed of about 100 ft/min. The metal strip has a resident time in the melting pot of less than about 10 seconds. The coated metal strip is passed through coating rollers and/or an air-knife to achieve a coating thickness of about 7–77 microns. The coated metal strip is rewound into a roll of coated metal strip.

EXAMPLE E

A metal strip is unwound from a roll of metal strip. The metal strip is continuously plated with a tin layer of about 1–3 microns thick. The metal strip has a thickness of less than about 762 microns. A metal alloy having a composition of at least about 20% tin, and at least about 75% zinc and is heated in a melting pot at a temperature of about 301–427° C. The metal strip is passed through the melting pot having a length of about 16 feet at a speed of about 100 ft/min. The metal strip has a resident time in the melting pot of less than about 10 seconds. The coated metal strip is passed through coating rollers and/or an air-knife to achieve a coating thickness of about 7–77 microns. The coated metal strip is rewound into a roll of coated metal strip.

EXAMPLE F

A metal strip is unwound from a roll of metal strip and is pickled with a hydrochloric acid solution and a copper sulfate solution. Copper is plated onto the metal strip surface during the pickling process forming a copper layer of about 1–3 microns thick. The metal strip has a thickness of less than about 762 microns. The metal alloy includes at least about 70% tin, at least about 25% zinc, and less than about 0.2% lead. The metal alloy in the melting pot is heated to a temperature of about 301–482° C. The metal strip is passed through the melting pot having a length of about 16 feet at a speed of about 100 ft/min. The metal strip has a resident time in the melting pot of less than about 10 seconds. The coated metal strip is passed through coating rollers and/or an air-knife to achieve a coating thickness of about 7–77 microns. The coated metal strip is rewound into a roll of coated metal strip.

EXAMPLE G

A metal strip is unwound from a roll of metal strip and is pickled with a hydrochloric acid solution and chemically activated with a zinc chloride solution prior to coating the metal alloy. The metal strip has a thickness of less than about 762 microns. The metal strip is not pre-heated prior to coating. A tin metal alloy having a composition of about 90–99% tin and less than about 2% lead is coated onto the metal strip. The tin metal alloy in the melting pot is heated to at least above 238–246° C. The metal strip is passed through the melting pot at a speed of about 100 ft/min. The metal strip has a resident time in the melting pot of less than about 10 seconds. The coated metal strip is passed through coating rollers and/or an air knife to achieve a coating thickness of about 7–51 microns. The coated metal strip is then cooled. The coated metal strip is then oxidized to remove the coated tin metal alloy and to expose and passify the heat created intermetallic layer. The metal strip is then wound into a roll of the metal strip.

EXAMPLE H

A metal strip is unwound from a roll of metal strip and is pickled with a hydrochloric acid solution and chemically activated with a zinc chloride solution prior to coating. The metal strip has a thickness of less than about 762 microns. The metal strip is plated with nickel having a thickness of less than about 3 microns. The metal strip is preheated prior to coating. A tin metal alloy having a composition of above 90–99% tin and less than about 2% lead is coated onto the metal strip. The metal alloy is heated in a melting pot to a temperature of about 238–482° C. The metal strip is passed through the melting pot at a speed of about 100 ft/min. The metal strip has a resident time in the melting pot of less than about 10 seconds. The coated metal strip is passed through coating rollers and/or an air-knife to achieve a coating thickness of about 7–51 microns. The coated metal strip is cooled and then oxidized to remove the tin metal alloy to expose and passify the heat created intermetallic layer. The metal strip is then wound into a roll of metal strip.

EXAMPLE I

A metal strip is unwound from a roll of metal strip. The metal strip has a thickness of less than about 762 microns. The metal strip is not pre-heated prior to coating with a metal alloy. A tin metal alloy having a composition of about 90–99% tin, and less than about 0–5% lead is coated onto the metal strip. The tin metal alloy is applied to the metal strip by an electroplating process. The plated metal strip is then flow heated for less than about 5 minutes. The coated metal strip is then passed through coating rollers and/or an air-knife to achieve a coating thickness of about 7–51 microns. The coated metal strip is then cooled. The coated metal strip is then oxidized to remove the tin metal alloy and to expose and passify the heat created intermetallic layer. The metal strip is then wound into a roll of metal strip.

EXAMPLE J

A metal strip is unwound from a roll of metal strip and plated with a zinc layer having a thickness of less than about 3 microns. The metal strip has a thickness of less than about 762 microns. The metal strip is pre-heated prior to coating with a metal alloy. A tin metal alloy having a composition of about 90–99% tin and less than about 0–1% lead is coated onto the metal strip. The metal strip is passed through a metal spaying process at a speed of up to about 100 ft/min to coat the metal strip. The coated metal strip is then passed through coating rollers and/or an air-knife to achieve a coating thickness of about 7–51 microns. The coated metal strip is cooled and then oxidized to remove the tin metal alloy and to expose and passify the heat created intermetallic layer. The metal strip is then cut into metal sheets.

EXAMPLE K

A metal strip is unwound from a roll of metal strip and is pickled with an acid solution and then chemically activated with a chemical activation solution. The metal strip is then plated with a metal layer of about 1–3 microns thick. The metal strip is not pre-heated prior to coating with a metal alloy. A tin metal alloy having a composition of about 90–99% tin is coated onto the metal strip. The tin metal alloy is plated onto the metal strip and then flow heated. The metal strip is then coated again by a spray metal process. The coated metal strip is then passed through coating rollers and/or an air-knife to achieve a coating thickness of about 7–51 microns. The coated metal strip is then cooled and wound into a roll of coated metal strip. The roll of coated metal strip is formed into roofing materials and installed on a building. The formed coated metal strip is then exposed to an oxidizing solution on site to remove the tin metal alloy and expose and passify the heat created intermetallic layer.

EXAMPLE L

A carbon steel strip is unwound from a roll of carbon steel strip. The carbon steel strip has a thickness of less than about 762 microns. The carbon steel strip is continuously passed through an electrolytic tank to plate nickel on the carbon steel strip surface. The nickel plated layer has a thickness of about 1–3 microns. A metal alloy having a composition of at least about 95% tin and zinc, and less than about 0.5% lead is coated onto the carbon steel strip. The metal alloy in the melting pot is at a temperature of about 301–455° C. The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve a coating thickness of about 7–77 microns. The coated carbon steel strip is rewound into a roll of coated carbon steel strip.

EXAMPLE M

A carbon steel strip is unwound from a roll of carbon steel strip. The carbon steel strip has a thickness of less than about 762 microns. The carbon steel strip is plated with chromium of a thickness of less than about 3 microns. A metal alloy having a composition of at least about 98% tin and zinc, less than about 1% of a metal additive, less than about 0.1% lead is coated onto the carbon steel strip. The metal alloy is heated in a melting pot at a temperature of about 301–482° C. The carbon steel strip is passed through the melting pot having a length of about 16 feet at a speed of about 100 ft/min. The carbon steel strip has a resident time in the melting pot of less than about seconds. The coated carbon steel strip is passed through coating rollers and/or an air-knife to achieve a coating thickness of about 7–77 microns. The coated carbon steel strip is rewound into a roll of coated carbon steel strip.

EXAMPLE N

A copper strip is unwound from a roll of copper strip. The copper strip has a thickness of less than about 762 microns. The copper strip is continuously plated with a tin layer of about 1–3 microns thick. A metal alloy having a composition of at least about 99% tin and zinc is coated onto the copper strip. The metal alloy is heated in a melting pot at a temperature of about 301–482° C. The coated strip is passed through the melting pot having a length of about 16 feet at a speed of about 100 ft./min. The copper strip has a resident time in the melting pot of less than about 10 seconds. The coated copper strip is passed through coating rollers and/or an air-knife to achieve a coating thickness of about 7–77 microns. The coated copper strip is rewound into a roll of coated copper strip.

EXAMPLE O

A carbon steel strip is unwound from a roll of carbon steel strip and continuously plated with a tin layer of a thickness of less than about 3 microns. The carbon steel strip has a thickness of less than about 762 microns. A metal alloy having a composition of at least about 98% tin and zinc, and less than about 0.1% lead is coated onto the carbon steel strip. The metal alloy is heated in a melting pot at a temperature of about 301–427° C. The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve a coating thickness of about 7–77 microns. The coated carbon steel strip is rewound into a roll of coated carbon steel strip.

EXAMPLE P

A stainless steel strip is unwound from a roll of stainless steel strip. The stainless steel strip is continuously plated with a tin layer of about 1–3 microns thick. The stainless steel strip has a thickness of less than about 762 microns. A metal alloy having a composition of at least about 98–99% tin and zinc is heated in a melting pot at a temperature of about 301–427° C. The stainless steel strip is passed through the melting pot having a length of about 16 feet at a speed of about 100 ft/min. The stainless steel strip has a resident time in the melting pot of less than about 10 seconds. The coated stainless steel strip is passed through coating rollers and/or an air-knife to achieve a coating thickness of about 7–77 microns. The coated stainless steel strip is rewound into a roll of coated stainless steel strip.

EXAMPLE Q

A carbon steel strip is unwound from a roll of carbon steel strip and is pickled with a hydrochloric acid solution and a copper sulfate solution. Copper is plated onto the carbon steel strip surface during the pickling process to form a copper layer of about 1–3 microns thick. The carbon steel strip has a thickness of less than about 762 microns. A metal alloy having a composition of at least about 95–99% tin and zinc, and less than about 0.2% lead is coated onto the carbon steel strip. The metal in a melting pot is heated to a temperature of about 301–482° C. The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve a coating thickness of about 7–77 microns. The coated carbon steel strip is rewound into a roll of coated carbon steel strip.

EXAMPLE R

A carbon steel strip is unwound from a roll of carbon steel strip and is pickled with a hydrochloric acid solution and chemically activated with a zinc chloride solution prior to coating. The carbon steel strip has a thickness of less than about 762 microns. The carbon steel strip is not pre-heated prior to coating. A metal alloy having a composition of about 90–95% tin, and less than about 0.5% lead is coated onto the carbon steel strip. The metal alloy in the melting pot is heated to a temperature of about 238–246° C. The melting pot is heated by four external gas torches directed to the outer sides of the melting pot. The carbon steel strip is passed through the melting pot having a length of about 16 feet at a speed of about 100 ft/min. The carbon steel strip has a resident time in the melting pot of less than about 10 seconds. The coated carbon steel is passed through coating rollers and/or an air-knife to achieve a coating thickness of about 7–51 microns. The coated carbon steel strip is then cooled and rewound into a roll of coated carbon steel strip.

EXAMPLE S

A carbon steel strip is unwound from a roll of carbon steel strip and is pickled with a hydrochloric acid solution and chemically activated with a zinc chloride solution prior to coating. The carbon steel strip has a thickness of less than about 762 microns. The carbon steel strip is plated with chromium of a thickness of less than about 3 microns. The carbon steel strip is not pre-heated prior to coating. A metal alloy having a composition of about 90–99% tin, about 0.01–1% metallic stabilizer selected from antimony, bismuth and/or copper, and less than about 0.5% lead is coated onto the carbon steel strip. The metal alloy is heated in a melting pot at a temperature of about 238–482° C. The melting pot is heated by four external gas torches directed to the outer sides of the melting pot. The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve a coating thickness of about 7–51 microns. The coated carbon steel strip is then cooled and rewound into a roll of coated carbon steel strip.

EXAMPLE T

A copper strip is unwound from a roll of copper strip and is pickled with a hydrochloric acid solution and chemically activated with a zinc chloride solution prior to coating. The copper strip has a thickness of less than about 762 microns. The copper strip is not pre-heated prior to coating. A metal alloy having a composition of about 90–99% tin, 0–1% metallic stabilizer, and less than about 0.1% lead is coated onto the copper strip. The metal alloy is heated in a melting pot at a temperature of about 238–246° C. The melting pot is heated by four external gas torches directed to the outer sides of the melting pot. The copper strip is passed through the melting pot having a length of about 16 feet at a speed of about 100 ft./min. The copper strip has a resident time in the melting pot of less than about 10 seconds. The coated copper strip is passed through coating rollers and/or an air-knife to achieve a coating thickness of about 7–51 microns. The coated copper strip is then cooled and rewound into a roll of coated copper strip.

EXAMPLE U

A carbon steel strip is unwound from a roll of carbon steel strip and plated with a nickel layer of a thickness of less than about 3 microns. The carbon steel strip has a thickness of less than about 762 microns. The carbon steel strip is not pre-heated prior to coating. A metal alloy having a composition of about 90–99% tin, and less than about 0.1% lead is coated onto the carbon steel strip. The metal alloy is heated in a melting pot at a temperature of about 238–255° C. The melting pot is heated by four external gas torches directed to the outer sides of the melting pot. The carbon steel strip is passed through the coating tank having a length of about 16 feet at a speed of about 100 ft/min. The carbon steel strip has a resident time in the melting pot of less than about 10 seconds. The coated carbon steel strip is passed through coating rollers and/or an air-knife to achieve a coating thickness of 7–51 microns. The coated carbon steel strip is then cooled and rewound into a roll of coated carbon steel strip.

EXAMPLE V

A stainless steel strip is unwound from a roll of stainless steel strip and is aggressively pickled with a dual acid solution of hydrochloric acid and nitric acid and chemically activated with a zinc chloride solution. The stainless steel strip is plated with a nickel layer of about 1–3 microns thick. The stainless steel strip has a thickness of less than about 762 microns. The stainless steel strip is not pre-heated prior to coating. A metal alloy having a composition of about 90–99% tin and is heated in a melting pot at a temperature of about 238–260° C. The melting pot is heated by four external gas torches directed to the outer sides of the melting pot. The stainless steel strip is passed through the melting pot having a length of about 16 feet at a speed of about 100 ft/min. The stainless steel strip has a resident time in the melting pot of less than about 10 seconds. The coated stainless steel strip is passed through coating rollers and/or an air-knife to achieve a coating thickness of about 7–51 microns. The coated stainless steel strip is then cooled and rewound into a roll of coated stainless steel strip.

EXAMPLE W

A carbon steel strip is unwound from a roll of carbon steel strip and is pickled with a hydrochloric acid solution and a copper sulfate solution and chemically activated with a zinc chloride solution prior to coating. Copper is plated onto the carbon steel strip surface during the pickling process to form a copper layer of about 1–3 microns thick. The carbon steel strip has a thickness of less than about 762 microns. The carbon steel strip is not pre-heated prior to coating. A metal alloy having a composition of about 90–95% tin and less than about 0.5% lead is coated onto the carbon steel strip. The metal alloy is heated in a melting pot at a temperature of about 238–250° C. The melting pot is heated by four external gas torches directed to the outer sides of the melting pot. The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve a coating thickness of about 7–51 microns. The coated carbon steel strip is then cooled and rewound into a roll of coated carbon steel strip.

EXAMPLE X

A carbon steel strip is unwound from a roll of carbon steel strip and is pickled with a hydrochloric acid solution and chemically activated with a zinc chloride solution prior to coating. The carbon steel strip has a thickness of more than about 762 microns. The carbon steel strip is pre-heated prior to coating. A metal alloy having a composition of about 90–99% tin and less than about 0.1% lead is coated onto the carbon steel strip. The metal alloy is heated in a melting pot at a temperature of about 237–246° C. The melting pot is heated by four external gas torches directed to the outer sides of the melting pot The carbon steel strip is passed through the melting pot having a length of about 16 feet at a speed of about 100 ft/min. The carbon steel strip has a resident time in the melting pot of less than about 10 seconds. The coated carbon steel strip is passed through coating rollers and/or an air-knife to achieve a coating thickness of about 7–51 microns. The coated carbon steel strip is then cooled and rewound into a roll of coated carbon steel strip.

EXAMPLE Y

A thin strip of carbon steel uncoiled from a roll of carbon steel is passed through an electroplating bath to deposit an ultra thin layer of tin on the carbon steel strip. The carbon steel strip had a thickness of less than about 762 microns. The carbon steel strip is then coated with a two-phase zinc-tin coating to produce an intermetallic layer between the metal alloy and the carbon steel strip. The tin-zinc metal alloy has a coating of tin and zinc content at least about 75 weight percent.

EXAMPLE Z

The process of Example Y was performed with the addition of a heating furnace to flow heat the thin tin plating and, thus, form a heat created intermetallic layer including iron and tin prior to the metal alloy coating process.

EXAMPLE AA

The process of Example Y was performed with copper being plated on the carbon steel strip by an electrolytic bath.

EXAMPLE BB

A copper strip is unwound from a roll of copper strip. The copper strip has a thickness of less than about 762 microns. The copper strip is pickled with an acid to clean the surface of the copper strip. The copper strip is continuously passed through an electrolytic tank to plate nickel on the copper strip surface. The nickel plated layer has a thickness of about 1–3 microns. The copper strip is no preheated. A metal alloy having a composition of at least about 95% tin and zinc, and less than about 0.5% lead is coated onto the copper strip. The metal alloy is in a melting pot at a temperature of about 301–454° C. The copper strip is passed through the melting pot having a length of about 16 feet at a speed of about 100 ft/min. The copper strip has a resident time in the melting pot of less than about 10 seconds. The coated copper strip is passed through coating rollers and/or an air-knife to achieve a coating thickness of about 7–77 microns. The coated copper strip is rewound into a roll of coated copper strip.

EXAMPLE CC

A brass strip is unwound from a roll of brass strip. The brass strip has a thickness of less than about 762 microns. The brass strip is pickled to remove surface oxides. The brass strip is plated with chromium having a thickness of less than about 3 microns. The brass strip is not preheated. A metal alloy having a composition of at least about 98% tin and zinc, less than about 1% of a metal additive, and less than about 0.1% lead is coated onto the brass strip. The metal alloy is heated in a melting pot at a temperature of about 301–482° C. The brass strip is passed through the melting pot having a length of about 16 feet at a speed of about 100 ft/min. The brass strip has a resident time in the melting pot of less than about 10 seconds. The coated brass strip is passed through coating rollers and/or an air-knife to achieve a coating thickness of about 7–77 microns. The coated brass strip is rewound into a roll of coated brass strip.

EXAMPLE DD

A bronze strip is unwound from a roll of bronze strip. The bronze strip has a thickness of less than about 762 microns. The copper strip is continuously plated with a tin layer of about 1–3 microns thick. A metal alloy having a composition of at least about 99% tin and zinc is coated onto the bronze strip. The metal alloy is heated in a melting pot at a temperature of about 301–482° C. The bronze strip is passed through the melting pot having a length of about 16 feet at a speed of about 100 ft./min. The bronze strip has a resident time in the melting pot of less than about 10 seconds. The coated bronze strip is passed through coating rollers and/or an air-knife to achieve a coating thickness of about 7–77 microns. The coated bronze strip is rewound into a roll of coated bronze strip.

EXAMPLE EE

A carbon steel strip is unwound from a roll of carbon steel strip and continuously plated with a tin layer of a thickness of less than about 3 microns. The carbon steel strip has a thickness of less than 762 microns. A metal alloy having a composition of at least about 98% tin and zinc, and less than about 0.1% lead is coated onto the carbon steel strip. The metal alloy is plated and subsequently flow heated onto the surface of the carbon steel strip. The coated carbon steel strip is passed through an air-knife to achieve a coating thickness of about 7–77 microns. The coated carbon steel strip is oxidized to expose the heat created intermetallic layer. The oxidized carbon steel strip is rewound into a roll of oxidized carbon steel strip.

EXAMPLE FF

A stainless steel strip is unwound from a roll of stainless steel strip. The stainless steel strip is aggressively pickled and chemically activated to clean the stainless steel strip surface. The stainless steel strip is continuously plated with a tin layer of about 1–3 microns thick. The stainless steel strip has a thickness of less than about 762 microns. The stainless steel strip is preheated. A metal alloy having a composition of at least about 98–99% tin and zinc is heated in a melting pot at a temperature of about 301–427° C. The stainless steel strip is passed through the melting pot having a length of about 16 feet at a speed of about 100 ft/min. The stainless steel strip has a resident time in the melting pot of less than about 10 seconds. The coated stainless steel strip is passed through coating rollers and/or an air-knife to achieve a coating thickness of about 7–77 microns. The coated stainless steel strip is oxidized to expose the heat created intermetallic layer. The oxidized stainless steel strip is rewound into a roll of oxidized stainless steel strip.

EXAMPLE GG

A carbon steel strip is unwound from a roll of carbon steel strip and is pickled with a hydrochloric acid solution and a copper sulfate solution. Copper is plated onto the carbon steel strip surface during pickling to form a copper layer of about 1–3 microns thick. The carbon steel strip has a thickness of less than about 762 microns. A metal alloy having a composition of at least about 95–99% tin and zinc, and less than about 0.2% lead is coated onto the carbon steel strip. The metal alloy is plated and subsequently flow heated onto the carbon steel strip. The coated carbon steel strip is passed through coating rollers and/or an air-knife to achieve a coating thickness of about 7–77 microns. The coated carbon steel strip is rewound into a roll of coated carbon steel strip.

EXAMPLE HH

A brass strip is unwound from a roll of brass strip. The brass strip has a thickness of less than about 762 microns. The brass is continuously passed through an electrolytic tank to plate nickel on the brass strip surface. The nickel plated layer has a thickness of about 1–3 microns. A metal alloy having a composition of 95–98% tin and zinc, and less than about 0.5% lead is coated onto the brass strip. The metal alloy in a melting pot is heated to a temperature of about 301–455° C. The carbon steel strip is passed through the melting pot having a length of about 16 feet at a speed of about 100 ft/min. The brass strip has a resident time in the melting pot of less than about 10 seconds. The coated brass strip is passed through coating rollers and/or an air-knife to achieve a coating thickness of about 7–77 microns. The coated brass strip is rewound into a roll of coated brass strip.

EXAMPLE II

A tin strip is unwound from a roll of tin strip. The tin strip has a thickness of less than about 762 microns. The tin strip is plated with chromium of a thickness of less than about 3 microns. A metal alloy having a composition of about 95–98% tin and zinc, less than about 2% of a metal additive, and less than about 0.5% lead is coated onto the tin strip. The metal alloy is heated in a melting pot at a temperature of about 301–482° C. The tin strip is passed through the melting pot having a length of about 16 feet at a speed of about 100 ft/min. The tin strip has a resident time in the melting pot of less than about 10 seconds. The coated tin strip is passed through coating rollers and/or an air-knife to achieve a coating thickness of about 7–77 microns. The coated tin strip is rewound into a roll of coated tin strip.

EXAMPLE JJ

A copper strip is unwound from a roll of copper strip. The copper strip has a thickness of less than about 762 microns. The copper strip is continuously plated with a tin layer of about 1–3 microns thick. A metal alloy having a composition of about 90–99% tin and 0–5% lead is coated onto the copper strip. The metal alloy is heated in a melting pot at a temperature of about 301–482° C. The copper strip is passed through the melting pot having a length of about 16 feet at a speed of about 100 ft./min. The copper strip has a resident time in the melting pot of less than about 10 seconds. The coated copper strip is passed through coating rollers and/or an air-knife to achieve a coating thickness of about 7–77 microns. The coated copper strip is rewound into a roll of coated copper strip.

EXAMPLE KK

A carbon steel strip is unwound from a roll of carbon steel strip and continuously plated with a tin layer of a thickness of less than about 3 microns. The carbon steel strip has a thickness of less than about 762 microns. A metal alloy having a composition of about 90–99% tin and zinc, and less than about 0.5% lead is coated onto the carbon steel strip. The metal alloy is heated in a melting pot at a temperature of about 301–482° C. The carbon steel strip is passed through the melting pot having a length of about 16 feet at a speed of about 100 ft/min. The carbon steel has a resident time in the melting pot of less than about 10 seconds. The coated carbon steel strip is passed through coating rollers and/or an air-knife to achieve a coating thickness of about 7–77 microns. The coated carbon steel strip is rewound into a roll of coated carbon steel strip.

EXAMPLE LL

A stainless steel strip is unwound from a roll of stainless steel strip. The stainless steel strip is continuously plated with a tin layer of about 1–3 microns thick. The stainless steel strip has a thickness of less than about 762 microns. A metal alloy having a composition of about 90–99% tin and zinc is heated in a melting pot at a temperature of about 301–482° C. The stainless steel strip is passed through the melting pot having a length of about 16 feet at a speed of about 100 ft/min. The stainless steel strip has a resident time in the melting pot of less than about 10 seconds. The coated stainless steel strip is passed through coating rollers and/or an air-knife to achieve a coating thickness of about 7–77 microns. The coated stainless steel strip is rewound into a roll of coated stainless steel strip.

EXAMPLE MM

A brass strip is unwound from a roll of brass strip and is pickled with a hydrochloric acid solution and a copper sulfate solution. Copper is plated onto the carbon steel strip surface during pickling to form a copper layer of about 1–3 microns thick. The brass strip has a thickness of less than about 762 microns. A metal alloy having a composition of about 90–95% tin, and less than about 0.5% lead is heated in a melting pot at a temperature of about 301–482° C. The brass strip is passed through the melting pot having a length of about 16 feet at a speed of about 100 ft/min. The brass strip has a resident time in the melting pot of less than about 10 seconds. The coated brass strip is passed through coating rollers and/or an air-knife to achieve a coating thickness of about 7–77 microns. The coated brass strip is rewound into a roll of coated brass strip.

EXAMPLE NN

A copper strip is unwound from a roll of copper strip and is pickled with a hydrochloric acid solution and chemically activated with a zinc chloride solution prior to coating. The copper strip has a thickness of less than about 762 microns. The copper strip is not pre-heated prior to coating. A tin alloy having a composition of about 90–99% tin, and less than about 2% lead is heated in a melting pot at a temperature of about 237–246° C. The copper strip is passed through the melting pot at a speed of about 100 ft/min. The copper strip has a resident time in the coating tank of less than about seconds. The coated copper strip is passed through coating rollers and/or an air knife to achieve a coating thickness of about 7–51 microns. The coated copper strip is then cooled. The coated copper strip is then oxidized to remove the coated tin alloy and to expose and pacify the heat created intermetallic layer. The copper strip is then wound into a roll of copper strip.

EXAMPLE OO

A copper strip is unwound from a roll of copper strip and is pickled with a hydrochloric acid solution and chemically activated with a zinc chloride solution prior to coating. The copper strip has a thickness of less than about 762 microns. The copper strip is plated with nickel having a thickness of less than about 3 microns. The copper strip is preheated prior to coating. A tin alloy having a composition of about 90–99% tin, and less than about 2% lead is heated in a melting pot at a temperature of about 237–482° C. The copper strip is passed through the melting pot at a speed of about 100 ft/min. The copper strip has a resident time in the melting pot of less than about 10 seconds. The coated copper strip is passed through coating rollers and/or an air-knife to achieve a coating thickness of 7–51 microns. The coated copper strip is cooled and then oxidized to remove the tin alloy and to expose and pacify the heat created intermetallic layer. The copper strip is then wound into a roll of copper strip.

EXAMPLE PP

A copper strip is unwound from a roll of copper strip. The copper strip has a thickness of less than about 762 microns. The strip is not pre-heated prior to coating. A tin alloy having a composition of about 99% tin, and less than about 0–5% lead is applied to the copper strip by an electroplating process. The plated copper strip is then flow heated for less than about 5 minutes. The coated copper strip is passed through coating rollers and/or an air-knife to achieve a coating thickness of about 7–51 microns. The coated copper strip is then cooled. The coated copper strip is then oxidized to remove the tin alloy and to expose and pacify the heat created intermetallic layer. The copper strip is then wound into a roll of copper strip.

EXAMPLE QQ

A copper steel strip is unwound from a roll of copper strip and plated with a chromium layer having a thickness of less than about 3 microns. The copper strip has a thickness of less than about 762 microns. The copper strip is pre-heated prior to coating. A tin alloy having a composition of about 90–99% tin, and less than about 0–1% lead is coated onto the copper strip. The copper strip is passed through a metal spaying process at a speed of up to about 100 ft/min. The coated copper strip is then passed through coating rollers and/or an air-knife to achieve a coating thickness of about 7–51 microns. The coated copper strip is cooled and then oxidized to remove the tin alloy to expose and pacify the heat created intermetallic layer. The copper strip is then cut into sheets.

EXAMPLE RR

A copper strip is unwound from a roll of copper strip and is pickled with an acid solution and then chemically activated with a chemical activation solution. The copper strip is plated with a metal layer of about 1–3 microns thick. The copper strip is not pre-heated prior to coating. A tin alloy having a composition of about 90–99% tin is metal sprayed onto the copper strip. The coated copper strip is then passed through coating rollers and/or an air-knife to achieve a coating thickness of about 7–51 microns. The coated copper strip is then cooled and wound into a roll of copper strip. The roll of coated copper strip is later formed into roofing materials and installed on a building. The formed coated copper strip is then exposed on site to an oxidizing solution to remove the tin alloy and expose and pacify the intermetallic layer.

EXAMPLE SS

A tin strip is unwound from a roll of tin strip. The tin strip has a thickness of less than about 762 microns. The tin strip is continuously passed through an electrolytic tank to plate nickel on the tin strip surface. The nickel plated layer has a thickness of about 1–3 microns. A metal alloy having a composition of at least about 85% tin, at least about 9–10% zinc, and less than about 0.5% lead is heated in a melting pot at a temperature of about 301–455° C. The tin strip is passed through the melting pot having a length of about 16 feet at a speed of about 100 ft/min. The tin strip has a resident time in the melting pot of less than about 10 seconds. The coated tin strip is passed through coating rollers and/or an air-knife to achieve a coating thickness of about 7–77 microns. The coated tin strip is rewound into a roll of coated tin strip.

EXAMPLE TT

A bronze strip is unwound from a roll of bronze strip. The bronze strip has a thickness of less than about 762 microns. The bronze strip is plated with chromium of a thickness of less than about 3 microns. A metal alloy having a composition of at least about 45% tin, at least about 45% zinc, less than about 1% of a metal additive, and less than about 0.1% lead is heated in a melting pot at a temperature of about 301–482° C. The bronze strip is passed through the melting pot having a length of about 16 feet at a speed of about 100 ft/min. The bronze strip has a resident time in the melting pot of less than about 10 seconds. The coated bronze strip is passed through coating rollers and/or an air-knife to achieve a coating thickness of about 7–77 microns. The coated bronze strip is rewound into a roll of coated bronze strip.

EXAMPLE UU

A aluminum strip is unwound from a roll of aluminum strip. The aluminum strip has a thickness of less than about 762 microns. The aluminum strip is continuously plated with a tin layer of about 1–3 microns thick. A metal alloy having a composition of at least about 45% tin and at least about 45% zinc is heated in a melting pot at a temperature of about 301–482° C. The aluminum strip is passed through the melting pot having a length of about 16 feet at a speed of about 100 ft./min. The aluminum strip has a resident time in the melting pot of less than about 10 seconds. The coated aluminum strip is passed through coating rollers and/or an air-knife to achieve a coating thickness of about 7–77 microns. The coated aluminum strip is rewound into a roll of coated aluminum strip.

EXAMPLE VV

A tin strip is unwound from a roll of tin strip and continuously plated with a tin layer of a thickness of less than about 3 microns. The tin strip has a thickness of less than about 762 microns. A metal alloy having a composition of at least about 45% tin, at least about 45% zinc, and less than about 0.1% lead is heated in a melting pot at a temperature of about 301–427° C. The tin strip is passed through the melting pot having a length of about 16 feet at a speed of about 100 ft/min. The tin has a resident time in the melting pot of less than about 10 seconds. The coated tin strip is passed through coating rollers and/or an air-knife to achieve a coating thickness of about 7–77 microns. The coated tin strip is rewound into a roll of coated tin strip.

EXAMPLE WW

A brass strip is unwound from a roll of brass strip. The brass strip is continuously plated with a tin layer of about 1–3 microns thick. The brass strip has a thickness of less than about 762 microns. A metal alloy having a composition of at least about 20% tin, and at least about 75% zinc is heated in a melting pot at a temperature of about 301–427° C. The brass strip is passed through the melting pot having a length of about 16 feet at a speed of about 100 ft/min. The brass strip has a resident time in the melting pot of less than about 10 seconds. The coated brass strip is passed through coating rollers and/or an air-knife to achieve a coating thickness of about 7–77 microns. The coated brass strip is rewound into a roll of coated brass strip.

EXAMPLE XX

A brass strip is unwound from a roll of brass strip and is pickled with a hydrochloric acid solution and a copper sulfate solution. Copper is plated onto the brass strip surface during pickling to form a copper layer of about 1–3 microns thick. The brass strip has a thickness of less than about 762 microns. A metal alloy having a composition of at least about 70% tin, at least about 25% zinc, and less than about 0.2% lead is heated in a melting pot at a temperature of about 301–482° C. The brass strip is coated by metal strap jets. The coated brass strip is passed through coating rollers and/or an air-knife to achieve a coating thickness of about 7–77 microns. The coated brass strip is rewound into a roll of coated brass strip.

EXAMPLE YY

A brass strip is unwound from a roll of brass strip and is pickled with a hydrochloric acid solution and chemically activated with a zinc chloride solution prior to coating. The brass strip has a thickness of less than about 762 microns. The brass strip is not pre-heated prior to coating. A tin alloy having a composition of about 90–99% tin, and less than about 2% lead is heated in a melting pot at a temperature of about 237–246° C. The brass strip is passed through the melting pot at a speed of about 100 ft/min. The brass strip has a resident time in the melting pot of less than about 10 seconds. The coated brass strip is passed through coating rollers and/or an air knife to achieve a coating thickness of about 7–51 microns. The coated brass strip is then cooled. The coated brass strip is then oxidized to remove the coated tin alloy to expose and pacify the heat created intermetallic layer. The brass strip is then wound into a roll of brass strip.

EXAMPLE ZZ

A brass strip is unwound from a roll of brass strip and is pickled with a hydrochloric acid solution and chemically activated with a zinc chloride solution prior to coating. The brass strip has a thickness of less than about 762 microns. The brass strip is plated with nickel having a thickness of less than about 3 microns. The brass strip is preheated prior to coating. A tin alloy having a composition of about 90–99% tin, and less than about 2% lead is heated in a melting pot at a temperature of about 237–482° C. The brass strip is passed through the melting pot at a speed of about 100 ft/min. The brass strip has a resident time in the melting pot of less than about 10 seconds. The coated brass strip is passed through coating rollers and/or an air-knife to achieve a coating thickness of about 7–51 microns. The coated brass strip is cooled and then oxidized to remove the tin alloy to expose and pacify the heat created intermetallic layer. The brass strip is then wound into a roll of brass strip.

EXAMPLE AAA

A brass strip is unwound from a roll of brass strip. The brass strip has a thickness of less than about 762 microns. The brass strip is pickled to clean the brass strip surface. The brass strip is not pre-heated prior to coating. A tin alloy having a composition of about 99% tin, and less than about 0–5% lead is applied to the brass strip by an electroplating process. The plated brass strip is then flow heated for less than about 5 minutes. The coated brass strip is passed through coating rollers and/or an air-knife to achieve a coating thickness of about 7–51 microns. The coated brass strip is then cooled. The coated brass strip is then oxidized to remove the tin alloy and to expose and pacify the heat created intermetallic layer. The brass strip is then wound into a roll of brass strip.

EXAMPLE BBB

A brass strip is unwound from a roll of brass strip and plated with a zinc layer having a thickness of less than about 3 microns. The brass strip has a thickness of less than about 762 microns. The brass strip is pre-heated prior to coating. A tin alloy having a composition of about 90–99% tin, and less than about 0–1% lead is passed through a metal spaying process at a speed of up to 100 ft/min. The coated brass strip is then passed through coating rollers and/or an air-knife to achieve a coating thickness of about 7–51 microns. The coated brass strip is cooled and then oxidized to remove the tin alloy and to expose and pacify the heat created intermetallic layer. The brass strip is then cut into sheets.

EXAMPLE CCC

A brass strip is unwound from a roll of brass strip and is pickled with an acid solution and then chemically activated with a chemical activation solution. The brass strip is plated with a metal layer of about 1–3 microns thick. The brass strip is not pre-heated prior to coating. A tin alloy having a composition of about 90–99% tin is plated onto the brass strip and then flow heated. The brass strip is then coated again by a spray metal process. The coated brass strip is then passed through coating rollers and/or an air-knife to achieve a coating thickness of about 7–51 microns. The coated brass strip is then cooled and wound into a roll of brass strip. The roll of coated brass strip is formed into roofing materials and installed on a building. The formed coated strip is then exposed on site to an oxidizing solution to remove the tin alloy and to expose and to pacify the intermetallic layer.

EXAMPLE DDD

A metal alloy is formed into a metal strip to be formed to various types of materials, or into a solder or a welding wire for connecting two or more metal materials together. One general composition of the metal strip, solder or welding wire is 20–70% tin, 30–75% zinc, 0.0005–2% aluminum, 0.001–2% antimony, 0.0001–1% bismuth, 0–2% copper, 0–0.5% lead, 0.0001–0.1% titanium. Another formulation of the metal strip, solder or welding wire is 40–60% tin, 40–60% zinc, 0.0005–0.75% aluminum, 0.001–1% antimony, 0.0001–0.2% bismuth, 0–0.01% arsenic, 0–0.01% cadmium, 0–0.01% chromium, 0.001–1% copper, 0–0.1% iron, 0–0.1% lead, 0–0.01% manganese, 0–0.2% nickel, 0–0.01% silver, 0.0005–0.05% titanium. Still another formulation of the metal strip, solder or welding wire includes 30–70% tin; 30–70% zinc; 0.0001–0.5% aluminum; 0.001–2% antimony; 0–0.01% arsenic; 0.0001–1% bismuth; 0–0.01% boron; 0–0.01% cadmium; 0–0.05% carbon; 0–0.05% chromium; 0–2% copper; 0–0.1% iron; 0–0.5% lead; 0–0.01% magnesium; 0–0.01% manganese; 0–0.01% molybdenum; 0–1% nickel; 0–0.01% silicon; 0–0.01% silver, 0–0.01% sulfur; 0–0.01% tellurium; 0.0001–0.1% titanium; and 0–0.01% vanadium. Yet another formulation of the metal strip, solder or welding wire is 40–60% tin; 40–60% zinc; 0.0005–0.4% aluminum; 0.01–0.8% antimony; 0–0.005% arsenic; 0.001–0.05% bismuth; 0–0.005% cadmium; 0.005–0.5% copper; 0–0.05% iron; 0–0.1% lead; 0–0.05% nickel; 0–0.005% silver; and 0.0005–0.05% titanium. Still yet a further formulation of the metal strip, solder or welding wire is 48–52% tin; 48–52% zinc; 0.005–0.24% aluminum; 0.05–0.64% antimony; 0–0.001% arsenic; 0.002–0.005% bismuth; 0–0.001% cadmium; 0.01–0.3% copper; 0–0.016% iron; 0–0.08% lead; 0–0.001% nickel; 0–0.001% silver; 0.001–0.02% titanium. Another formulation of the metal strip, solder or welding wire is 5–70% tin; 30–95% zinc; 0–0.25% aluminum; 0–0.02% chromium; 0–1.5% copper; 0–0.01% iron; 0–0.01% lead; 0–0.01% manganese; and 0–0.18% titanium. When the metal alloy is used as a solder metal or electrode, the metal alloy is formed into a thin wire or thin strip by common known processes. The wire or thin strip is typically rolled for later processing or use. The metal alloy made for solder typically includes aluminum and/or titanium since these two metal additives positively affect the surface tension of the metal alloy in the molten state so that the molten metal alloy has the desired wetting characteristics. The higher the concentration of titanium and/or aluminum, the more the solder will bead when applied to a workpiece. The addition of titanium and/or aluminum to the metal alloy also causes the metal alloy to resist flowing at temperatures near the melting point of the metal alloy. This resistance imparts excellent soldering characteristics. The titanium and/or aluminum are believed to cause oxide formation on the surface of the molten solder to form a dull greyish, earth tone colored solder. The titanium and aluminum are also believe to assist in forming an intermetallic layer with the tin and zinc in the metal alloy and the workpiece before solidification of the solder to thereby form a strong bond with the workpiece. The solder typically includes little, if any, lead additions, and such, any lead in the solder is typically due to impurities. The solder composition is particularly useful in soldering carbon steel, stainless steel, copper, copper alloys, tin, tin metal alloys, zinc and zinc alloys. However, the solder can be used on other types of metals. If the solder is to be used to connect copper or copper alloys, copper is typically added to the metal alloy composition. The addition of copper reduces the reactivity of the solder with the copper or copper alloy materials. The solder may be used with a wide variety of fluxes. If the solder is to be used in ultrasonic welding, a flux is typically not used.

EXAMPLE EEE

The metal alloy is used for standing seam and press fit (mechanical joining such as shown in U.S. Pat. No. 4,987,716) applications for roofing. In standing seam applications, the edges of the roofing materials are folded together and then soldered to form a water tight seal. The metal alloy inherently includes excellent soldering characteristics. When the metal alloy is heated, it has the necessary wetting properties to produce a tight water resistant seal. As a result, the metal alloy acts as both a corrosive resistive coating and a soldering agent for standing seam roofing systems. The metal alloy coated can be also welded with standard solders. Typical solders contain about 50% tin and about 50% lead. The metal alloy has the added advantage of being able to be soldered with low or no-lead solders. The metal alloy coated roofing materials also can be used in mechanically joined roofing systems due to the malleability of the metal alloy. Mechanically joined systems form water tight seals by folding adjacent roof material edges together and subsequently applying a compressive force to the seam in excess of about 1,000 psi. Under these high pressures, the metal alloy plastically deforms within the seam and produces a water tight seal.

The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention.

We claim:

1. A corrosion-resistant petroleum receptacle comprising at least one shell member that includes a seal to maintain fluid within an interior of said petroleum receptacle, said seal including a weld, a solder, bonding, and combinations thereof, said at least one shell member including a carbon steel metal strip having a top and bottom surface coated with a corrosion-resistant metal alloy which resists corrosion by petroleum products, said carbon steel strip having a thickness of less than about 0.2 inch, said corrosion-resistant carbon steel metal strip including a hot dipped coating of said corrosion-resistant metal alloy, said corrosion-resistant metal alloy comprising tin, zinc and at least an effective amount of at least one metal additive to positively affect the mechanical properties of said corrosion-resistant metal alloy, the chemical properties of said corrosion-resistant alloy and combinations thereof, at least about 99 weight percent of said corrosion-resistant metal alloy comprised of tin and zinc, said zinc content of said corrosion-resistant metal alloy being up to about 30 weight percent, said corrosion-resistant metal alloy forming a multi-phase alloy when solidified and said tin and said zinc forming a phase in said corrosion-resistant metal alloy, said metal additive including copper, magnesium, manganese, nickel, silicon, titanium and mixtures thereof, said corrosion-resistant metal alloy having a coating thickness of up to about 0.003 inch.

2. The corrosion-resistant petroleum receptacle as defined in claim 1, including a plated nickel layer on said top and bottom surface of said carbon steel metal strip prior to said corrosion-resistant metal alloy being applied to said carbon steel metal strip, said nickel layer having a thickness of up to about 3 microns, said coating thickness of said corrosion-resistant metal alloy being greater than the thickness of said plated nickel layer.

3. The corrosion-resistant petroleum receptacle as defined in claim 1, wherein said corrosion-resistant metal alloy includes lead.

4. The corrosion-resistant petroleum receptacle as defined in claim 2, wherein said corrosion-resistant metal alloy includes lead.

5. The corrosion-resistant petroleum receptacle as defined in claim 3, wherein said lead has a content of less than about 0.05 weight percent.

6. The corrosion-resistant petroleum receptacle as defined in claim 1, wherein said metal additive includes copper.

7. The corrosion-resistant petroleum receptacle as defined in claim 1, wherein said metal additive includes silicon.

8. The corrosion-resistant petroleum receptacle as defined in claim 1, wherein said metal additive includes magnesium.

9. The corrosion-resistant petroleum receptacle as defined in claim 1, wherein said metal additive includes manganese.

10. The corrosion-resistant petroleum receptacle as defined in claim 1, wherein said metal additive includes nickel.

11. The corrosion-resistant petroleum receptacle as defined in claim 1, wherein said metal additive includes titanium.

12. The corrosion-resistant petroleum receptacle as defined in claim 1, wherein said zinc content is at least about 10 weight percent.

13. The corrosion-resistant petroleum receptacle as defined in claim 4, wherein said zinc content is at least about 10 weight percent.

14. Corrosion-resistant petroleum receptacle comprising at least one shell member, said at least one shell member including a metal strip having a top and bottom surface coated with a corrosion-resistant metal alloy which resists corrosion by petroleum products, said strip having an average thickness of less than about 0.2 inch, said corrosion-resistant metal strip including a coating of said corrosion-resistant metal alloy, said corrosion-resistant metal alloy comprising tin, zinc and at least an effective amount of at least one metal additive to positively affect the mechanical properties of said corrosion-resistant metal alloy, the chemical properties of said corrosion-resistant alloy and combinations thereof, at least about 95 weight percent of said corrosion-resistant metal alloy comprised of tin and zinc, said zinc content of said corrosion-resistant metal alloy being up to about 30 weight percent, said corrosion-resistant metal alloy forming a multi-phase alloy when solidified and said tin and said zinc forming a phase in said corrosion-resistant metal alloy, said metal additive including chromium, copper, magnesium, manganese, molybdenum, nickel, silicon, titanium and mixtures thereof, said corrosion-resistant metal alloy having an average coating thickness of up to about 0.003 inch.

15. The corrosion-resistant petroleum receptacle as defined in claim 14, including a plated nickel layer on said top and bottom surface of said metal strip prior to said corrosion-resistant metal alloy being applied to said metal strip, said nickel layer having an average thickness of up to about 3 microns, said coating thickness of said corrosion-resistant metal alloy being greater than the thickness of said plated nickel layer.

16. The corrosion-resistant petroleum receptacle as defined in claim 14, wherein said corrosion-resistant metal alloy includes lead.

17. The corrosion-resistant petroleum receptacle as defined in claim 15, wherein said corrosion-resistant metal alloy includes lead.

18. The corrosion-resistant petroleum receptacle as defined in claim 14, wherein said metal additive includes copper.

19. The corrosion-resistant petroleum receptacle as defined in claim 15, wherein said metal additive includes copper.

20. The corrosion-resistant petroleum receptacle as defined in claim 17, wherein said metal additive includes copper.

21. The corrosion-resistant petroleum receptacle as defined in claim 14, wherein said metal additive includes silicon.

22. The corrosion-resistant petroleum receptacle as defined in claim 15, wherein said metal additive includes silicon.

23. The corrosion-resistant petroleum receptacle as defined in claim 20, wherein said metal additive includes silicon.

24. The corrosion-resistant petroleum receptacle as defined in claim 14, wherein said metal additive includes manganese.

25. The corrosion-resistant petroleum receptacle as defined in claim 15, wherein said metal additive includes manganese.

26. The corrosion-resistant petroleum receptacle as defined in claim 23, wherein said metal additive includes manganese.

27. The corrosion-resistant petroleum receptacle as defined in claim 14, wherein said metal additive includes magnesium.

28. The corrosion-resistant petroleum receptacle as defined in claim 15, wherein said metal additive includes magnesium.

29. The corrosion-resistant petroleum receptacle as defined in claim 26, wherein said metal additive includes magnesium.

30. The corrosion-resistant petroleum receptacle as defined in claim 14, wherein said metal additive includes nickel.

31. The corrosion-resistant petroleum receptacle as defined in claim 15, wherein said metal additive includes nickel.

32. The corrosion-resistant petroleum receptacle as defined in claim 29, wherein said metal additive includes nickel.

33. The corrosion-resistant petroleum receptacle as defined in claim 14, wherein said metal additive includes titanium.

34. The corrosion-resistant petroleum receptacle as defined in claim 15, wherein said metal additive includes titanium.

35. The corrosion-resistant petroleum receptacle as defined in claim 32, wherein said metal additive includes titanium.

36. A corrosion-resistant petroleum receptacle including a metal strip having a top surface coated with a corrosion-resistant metal alloy which resists corrosion, said strip having an average thickness of less than about 0.2 inch, said corrosion-resistant metal alloy comprising tin, zinc and at least an effective amount of at least one metal component to positively affect the mechanical properties of said corrosion-resistant metal alloy, the chemical properties of said corrosion-resistant alloy and combinations thereof, at least about 95 weight percent of said corrosion-resistant metal alloy comprised of tin and zinc, said zinc content of said corrosion-resistant metal alloy being up to about 30 weight percent, said corrosion-resistant metal alloy forming a multi-phase alloy when solidified and said tin and said zinc forming a phase in said corrosion-resistant metal alloy, said metal component including chromium, copper, magnesium, manganese, molybdenum, nickel, silicon, titanium and mixtures thereof, said corrosion-resistant metal alloy having an average coating thickness of up to about 0.003 inch.

37. The corrosion-resistant petroleum receptacle as defined in claim 36, including a plated nickel layer on said top and bottom surface of said metal strip prior to said corrosion-resistant metal alloy being applied to said metal strip, said nickel layer having an average thickness of up to about 3 microns, said coating thickness of said corrosion-resistant metal alloy being greater than the thickness of said plated nickel layer.

* * * * *